(12) United States Patent
Bundock

(10) Patent No.: US 10,928,412 B2
(45) Date of Patent: Feb. 23, 2021

(54) SYSTEM AND METHOD FOR MEASURING SPEED, SPIN RATE, AND ACCURACY OF A SPORTING DEVICE

(71) Applicant: James Joseph Bundock, Pelham, NH (US)

(72) Inventor: James Joseph Bundock, Pelham, NH (US)

( * ) Notice: Subject to any disclaimer, the term of this patent is extended or adjusted under 35 U.S.C. 154(b) by 539 days.

(21) Appl. No.: 15/709,472

(22) Filed: Sep. 20, 2017

(65) Prior Publication Data

US 2018/0078820 A1 Mar. 22, 2018

Related U.S. Application Data

(60) Provisional application No. 62/396,830, filed on Sep. 20, 2016.

(51) Int. Cl.
| | | |
|---|---|---|
| G01P 3/50 | (2006.01) | |
| G01P 3/66 | (2006.01) | |
| A63B 60/46 | (2015.01) | |
| A63B 24/00 | (2006.01) | |
| G01P 3/44 | (2006.01) | |

(Continued)

(52) U.S. Cl.
CPC ............ *G01P 3/50* (2013.01); *A63B 24/0062* (2013.01); *A63B 37/0054* (2013.01); *A63B 43/002* (2013.01); *A63B 43/004* (2013.01); *A63B 60/46* (2015.10); *A63B 67/14* (2013.01); *A63B 69/0026* (2013.01); *G01P 3/44* (2013.01); *G01P 3/66* (2013.01); *A63B 69/002* (2013.01); *A63B 69/0002* (2013.01); *A63B 69/0046* (2013.01); *A63B 2102/14* (2015.10); *A63B 2102/32* (2015.10); *A63B 2209/08* (2013.01); *A63B 2220/30* (2013.01); *A63B 2220/35* (2013.01)

(58) Field of Classification Search
CPC ............ A63B 69/0024; A63B 69/0026; A63B 43/004; A63B 60/46; G01P 3/50; G01P 13/0053; G01P 3/505; G01P 3/665; G01P 3/66; G10P 3/52
See application file for complete search history.

(56) References Cited

U.S. PATENT DOCUMENTS 3,824,463 A * 7/1974 Oehler .................... G01P 3/665
324/179
5,114,150 A * 5/1992 Matsumura ........ A63B 69/3614
473/222

FOREIGN PATENT DOCUMENTS

| JP | 08224332 A | * | 9/1996 |
| JP | 11290496 A | * | 10/1999 |

* cited by examiner

*Primary Examiner* — Daniel J Colilla

(57) ABSTRACT

A system and method for measuring motion properties of a movable object, such as a sporting device, wherein the movable object has an embedded magnetized unit creating a magnetic field. A measurement device, having a first magnetic field sensor positioned a known distance away from a second magnetic field sensor, is positioned in the vicinity of the movable object's trajectory, whereby the first and second magnetic field sensors output signals when the movable object passes within their respective proximities. A control module, that is responsive to the output signals created by the magnetic field sensors, is configured to record the times of output signal events. The control module is further configured to calculate motion properties, such as the speed and rate of spin, of the movable object based upon the recorded times of various sensor output events and the known distance between the first and second magnetic field sensors.

17 Claims, 51 Drawing Sheets

(51) Int. Cl.
*A63B 69/00* (2006.01)
*A63B 67/14* (2006.01)
*A63B 43/00* (2006.01)
*A63B 37/00* (2006.01)
*A63B 102/14* (2015.01)
*A63B 102/32* (2015.01)

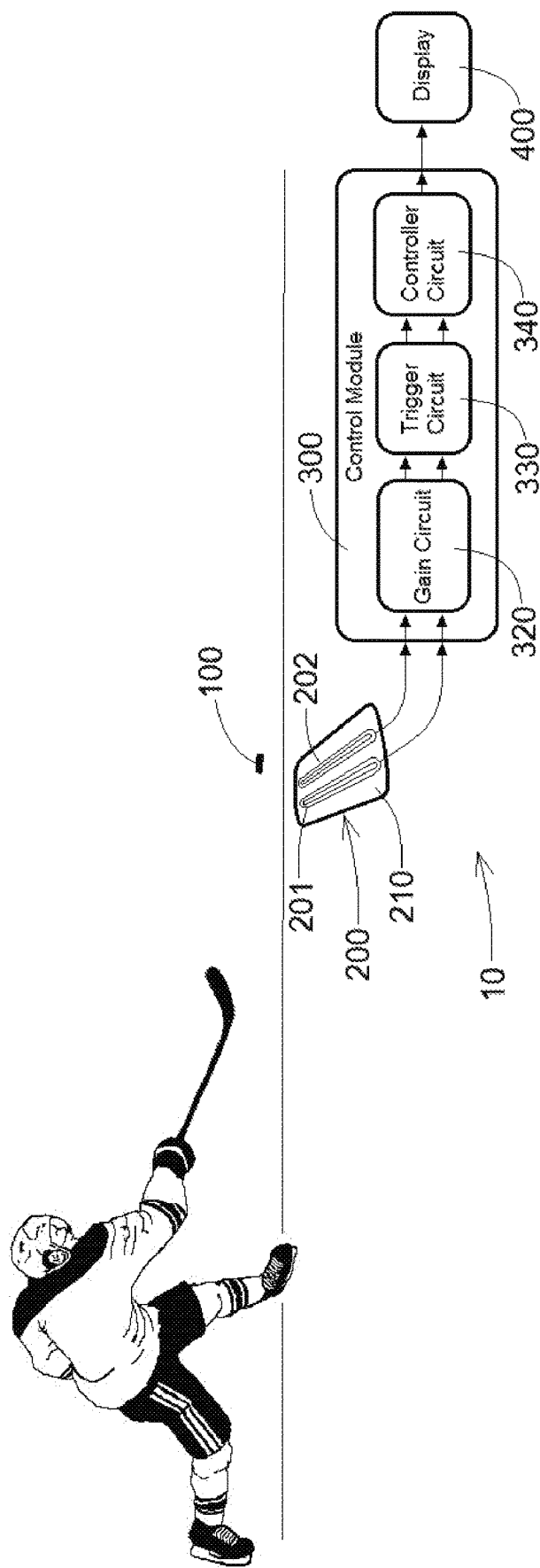
FIG. 1-A

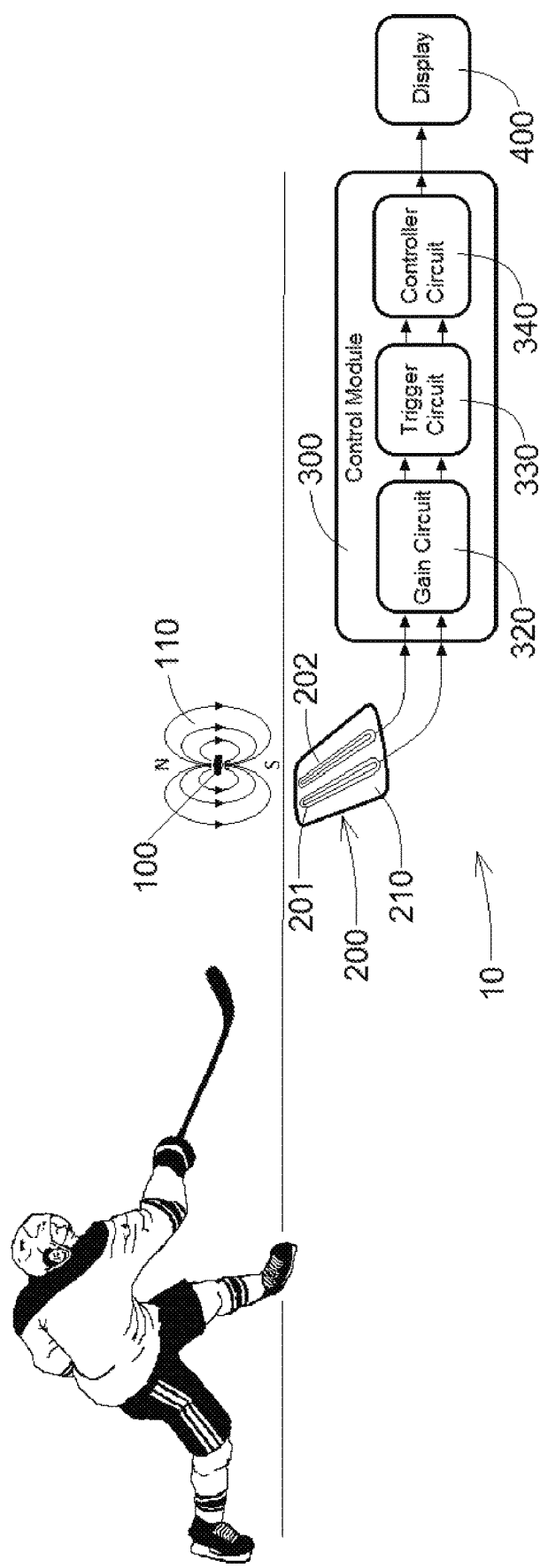
FIG. 1-B

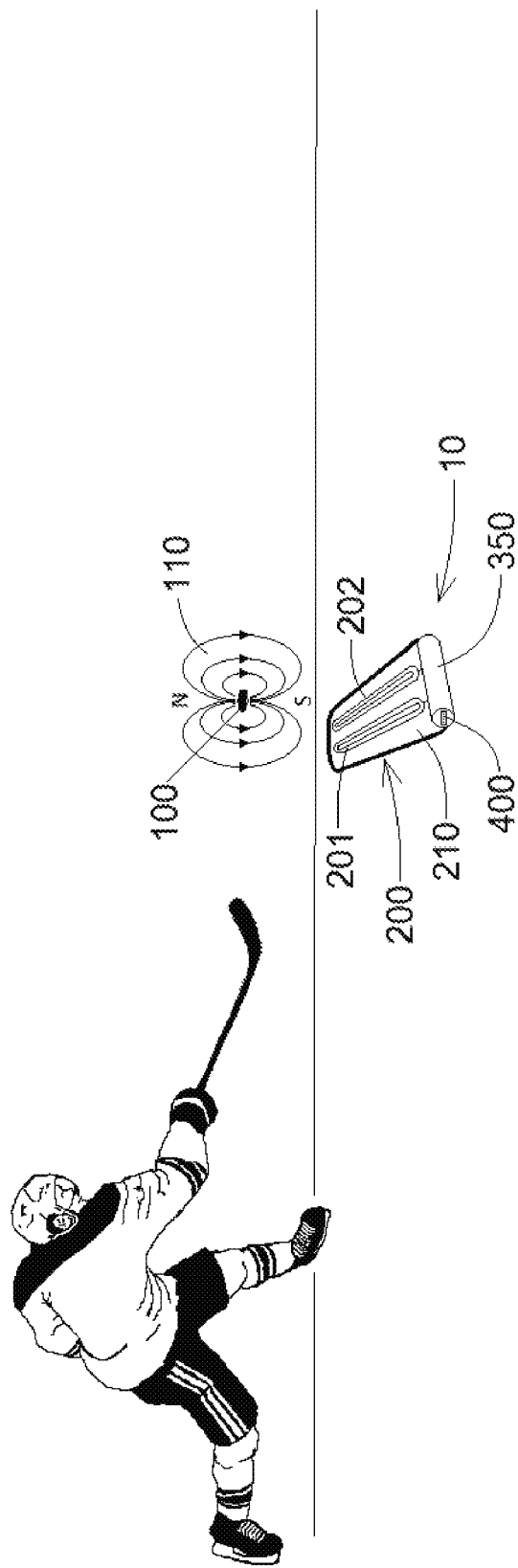

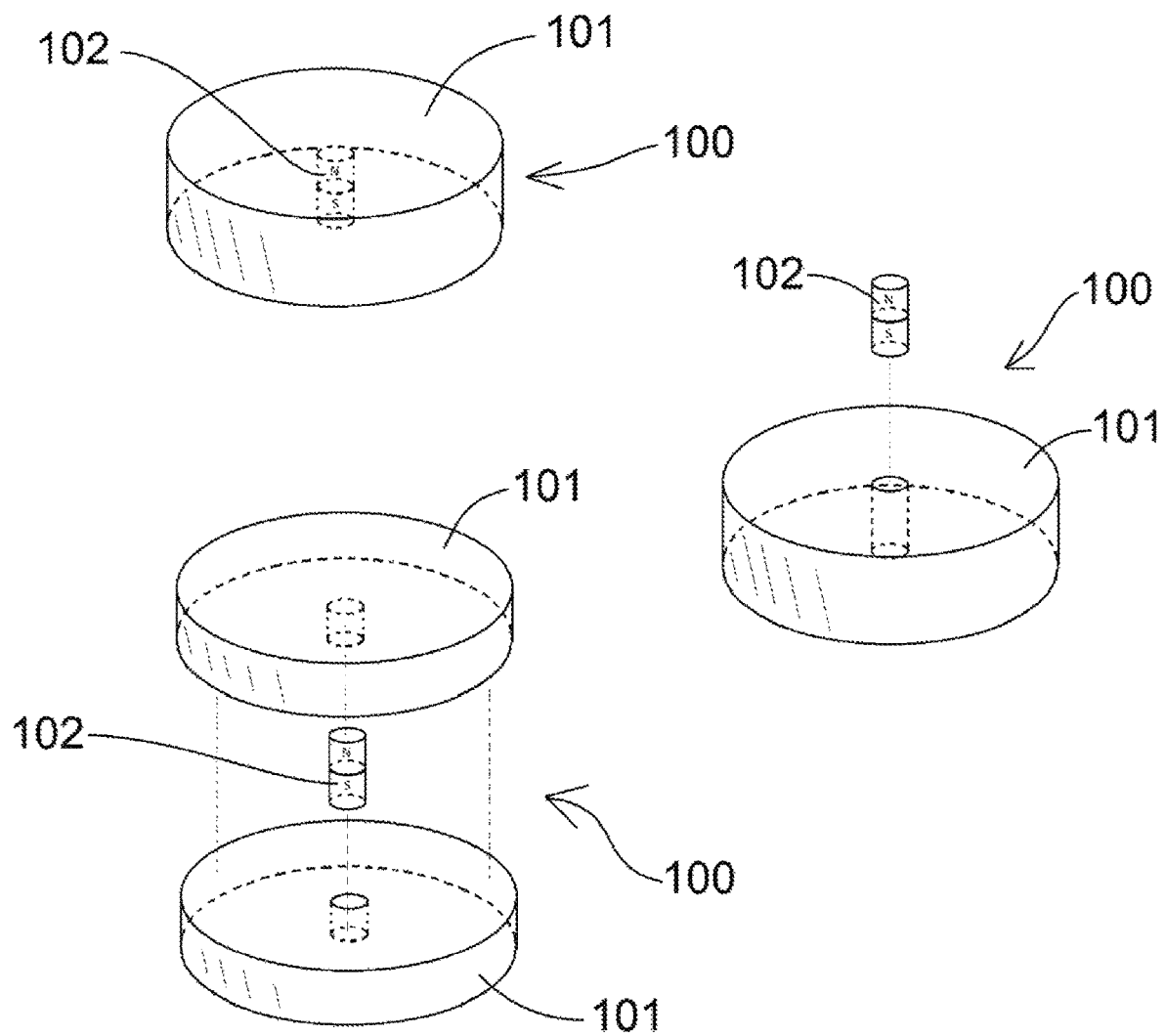
FIG. 3-A

FIG. 4-A
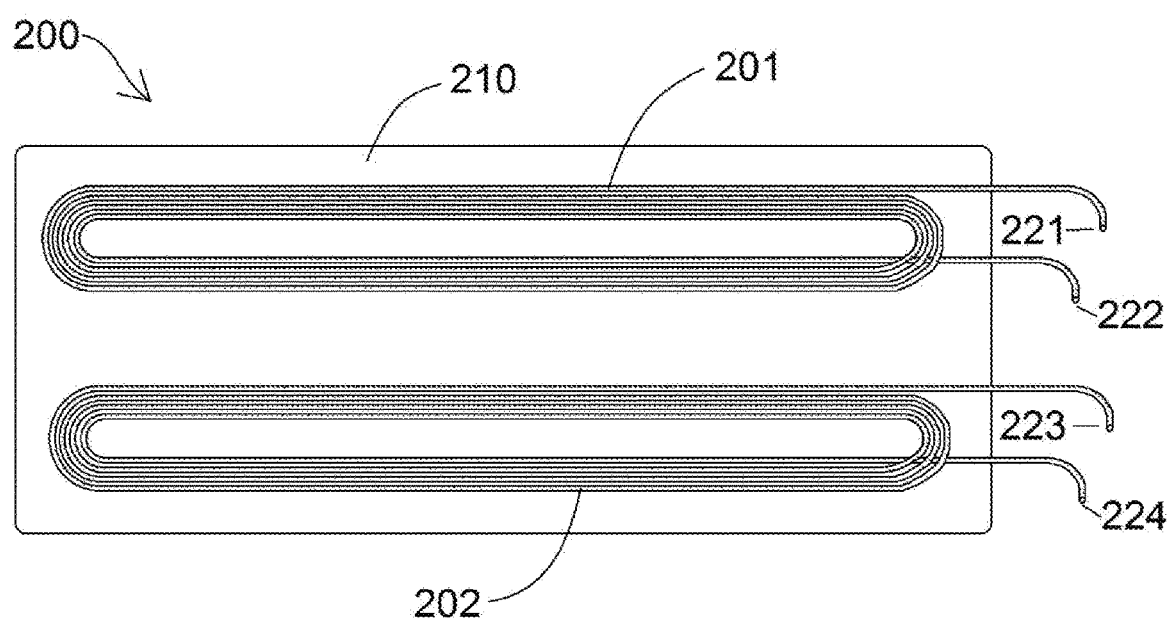
FIG. 4-B

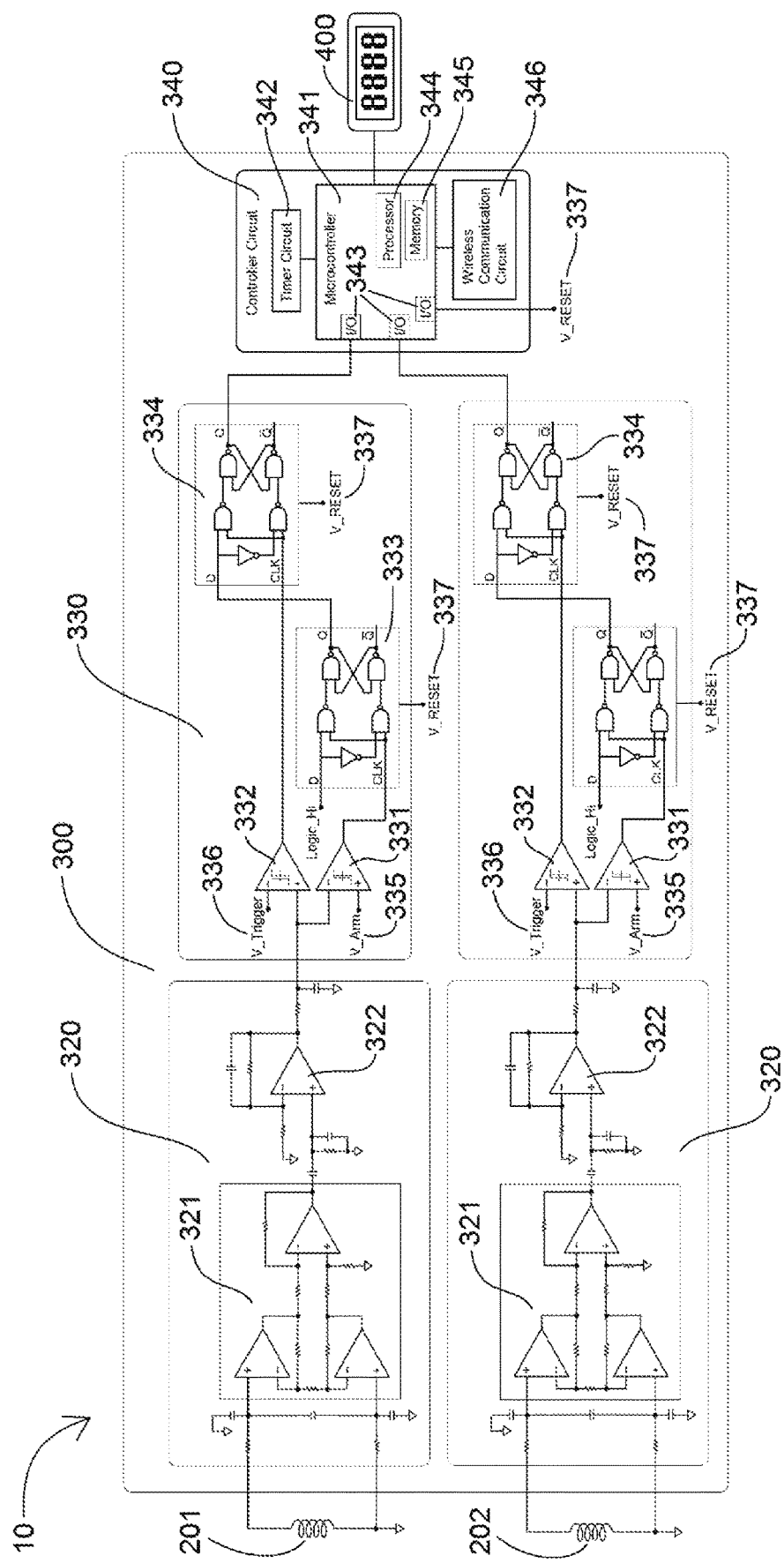
FIG. 5-A

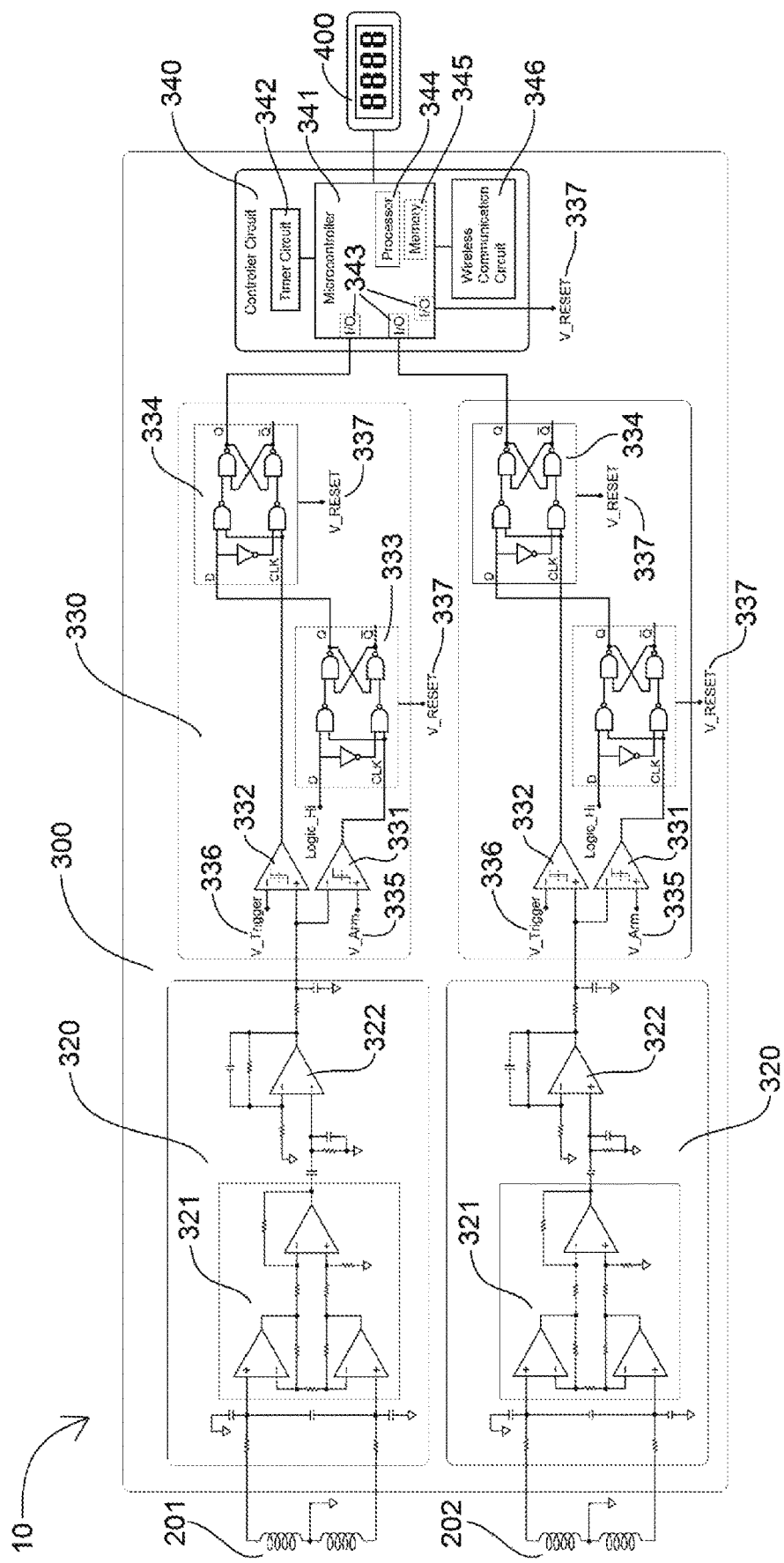
FIG. 5-B

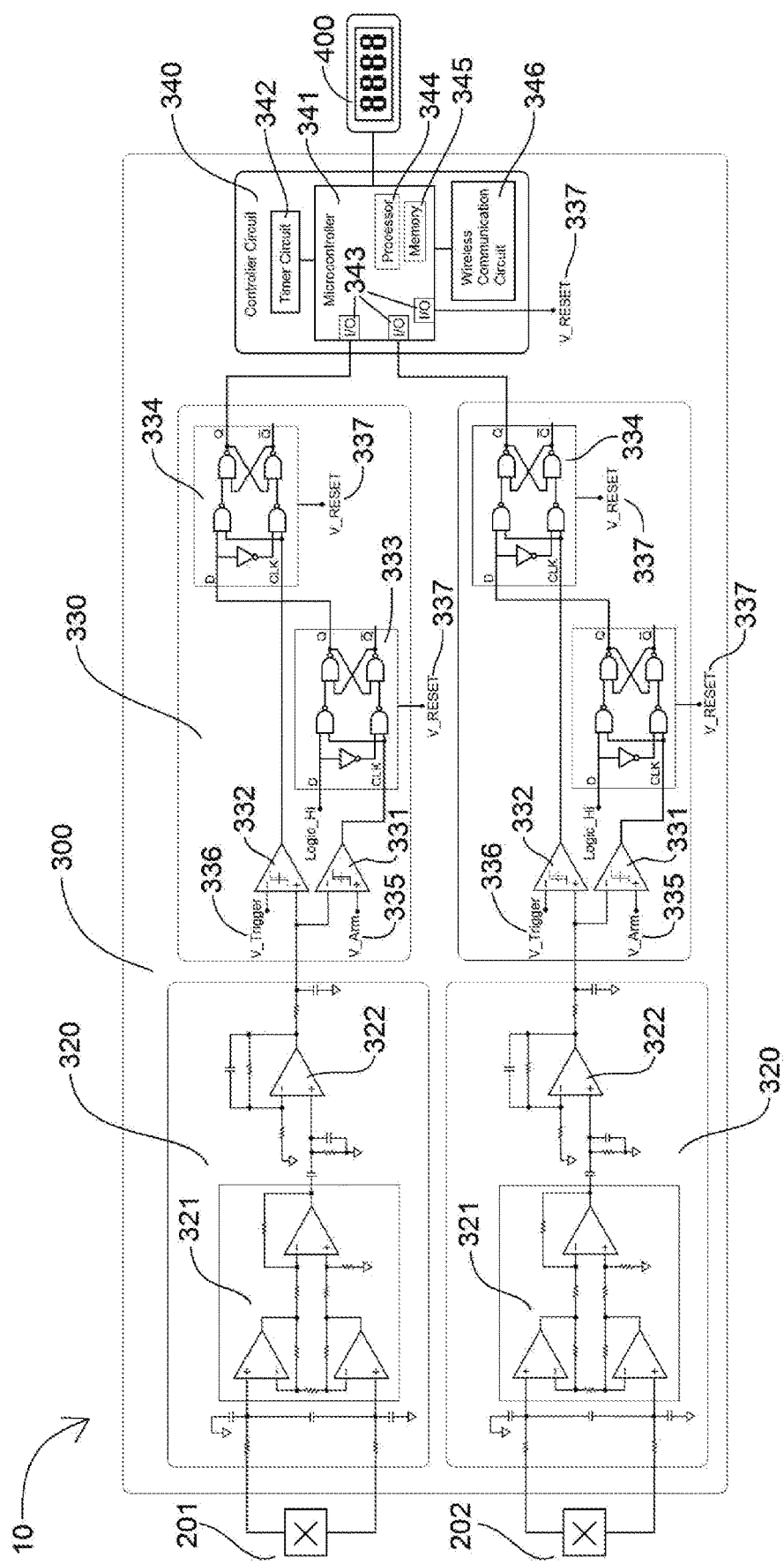
FIG. 5-C

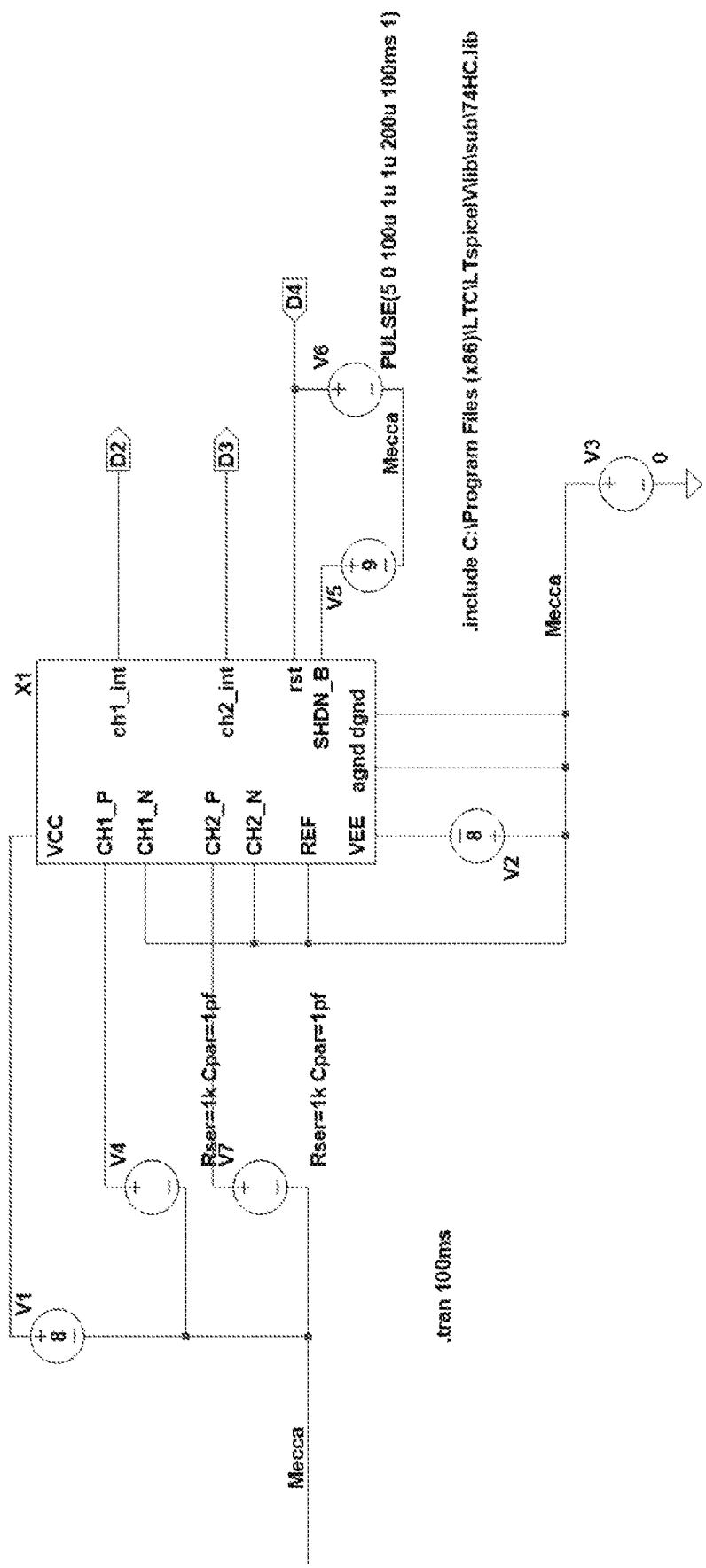
FIG. 6-A

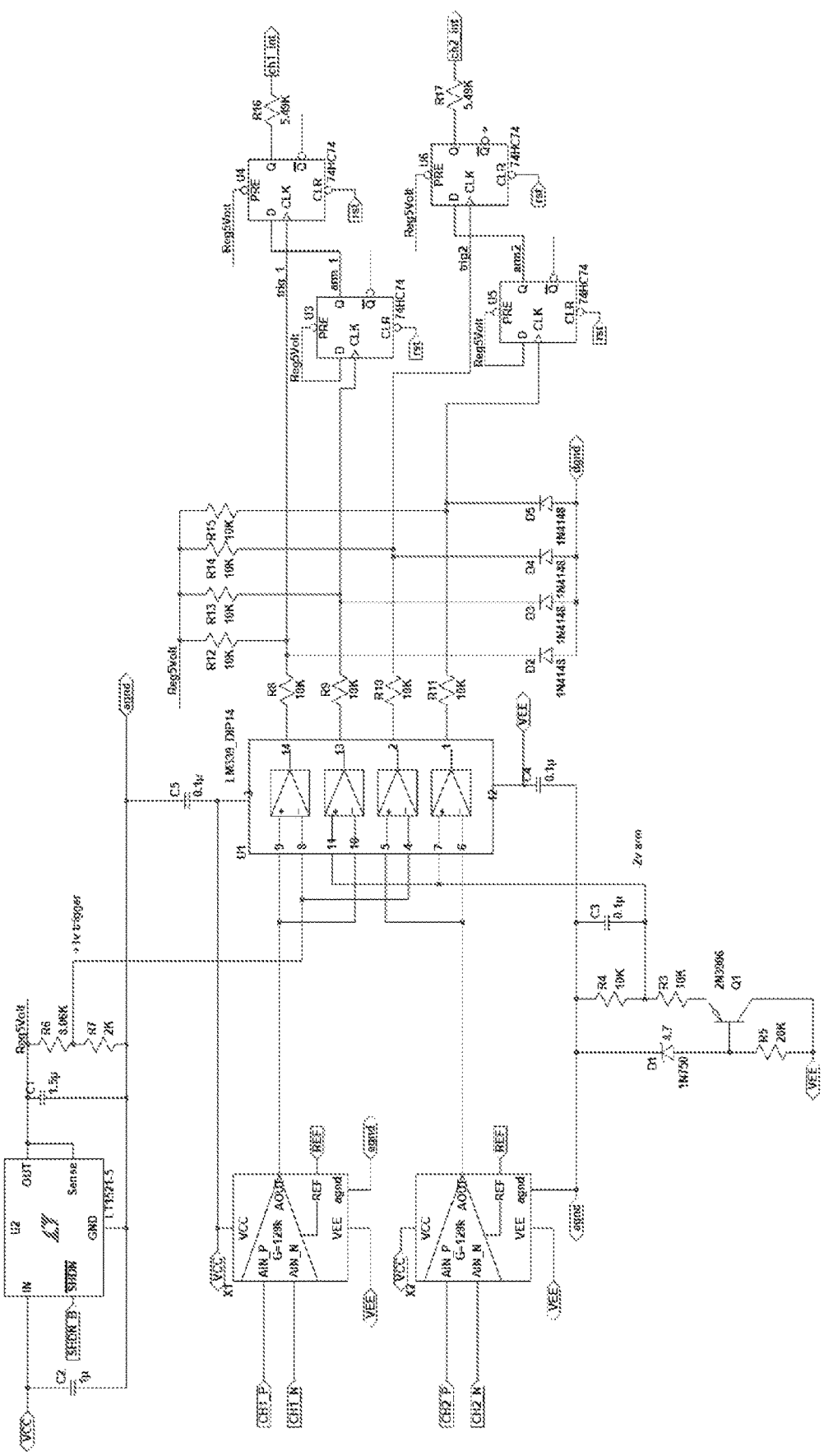
FIG. 6-B

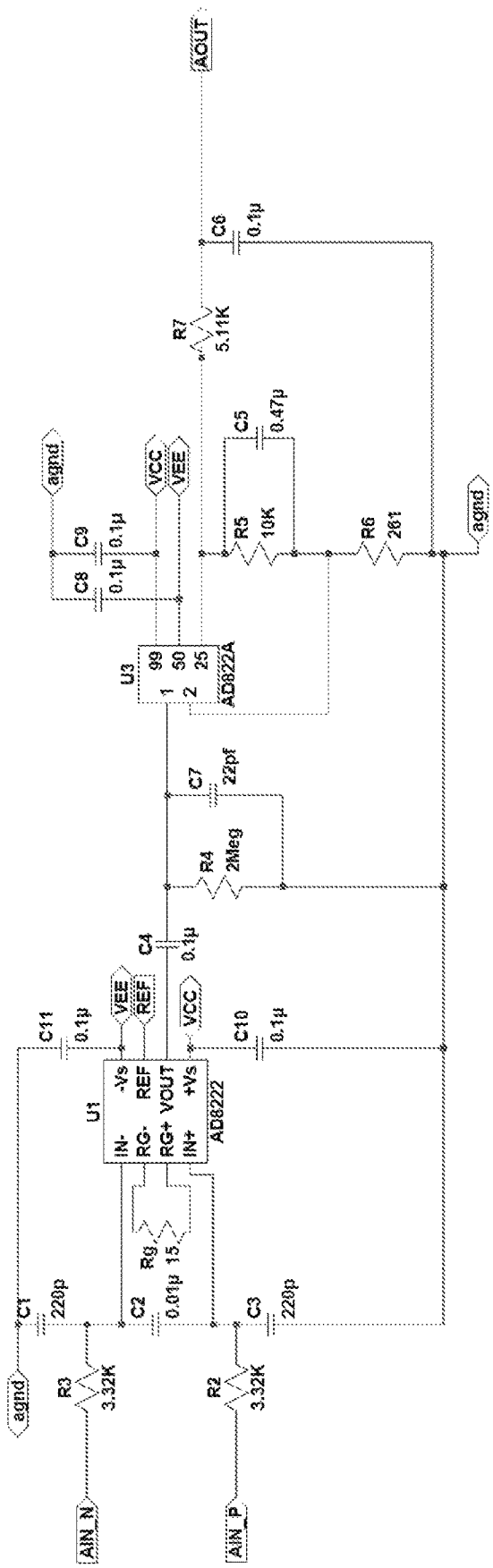
FIG. 6-C

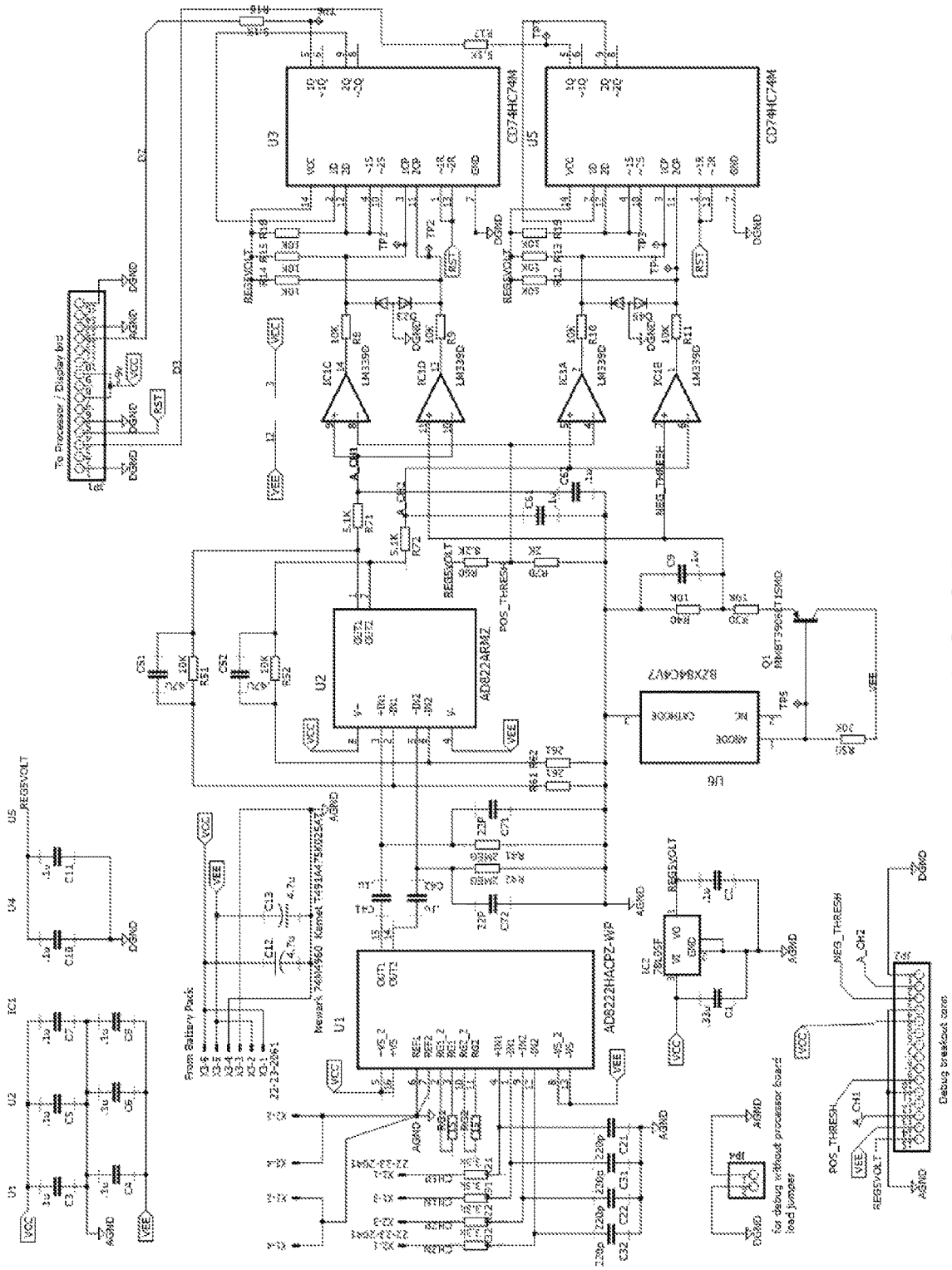
FIG. 6-D

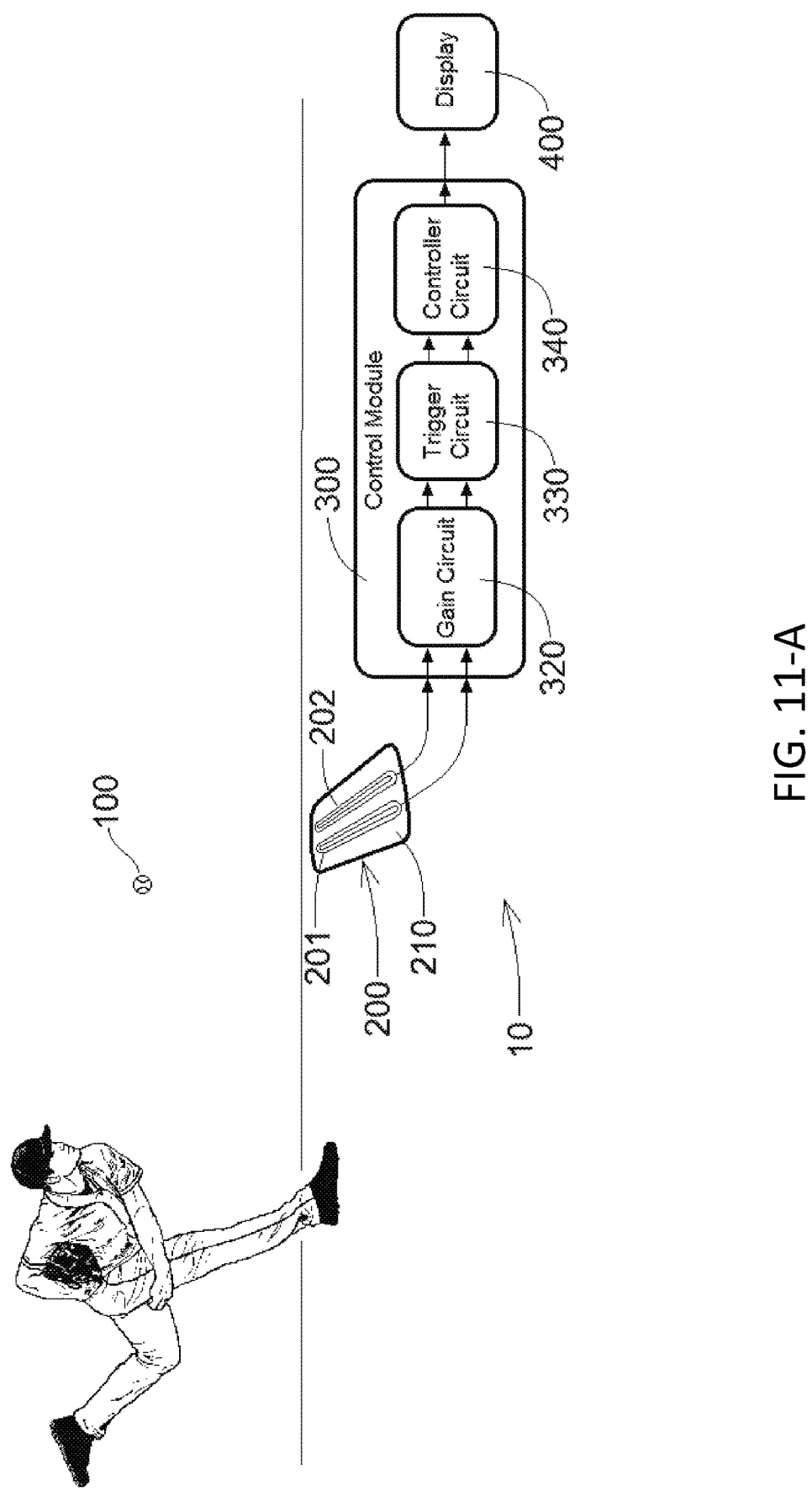
FIG. 11-A

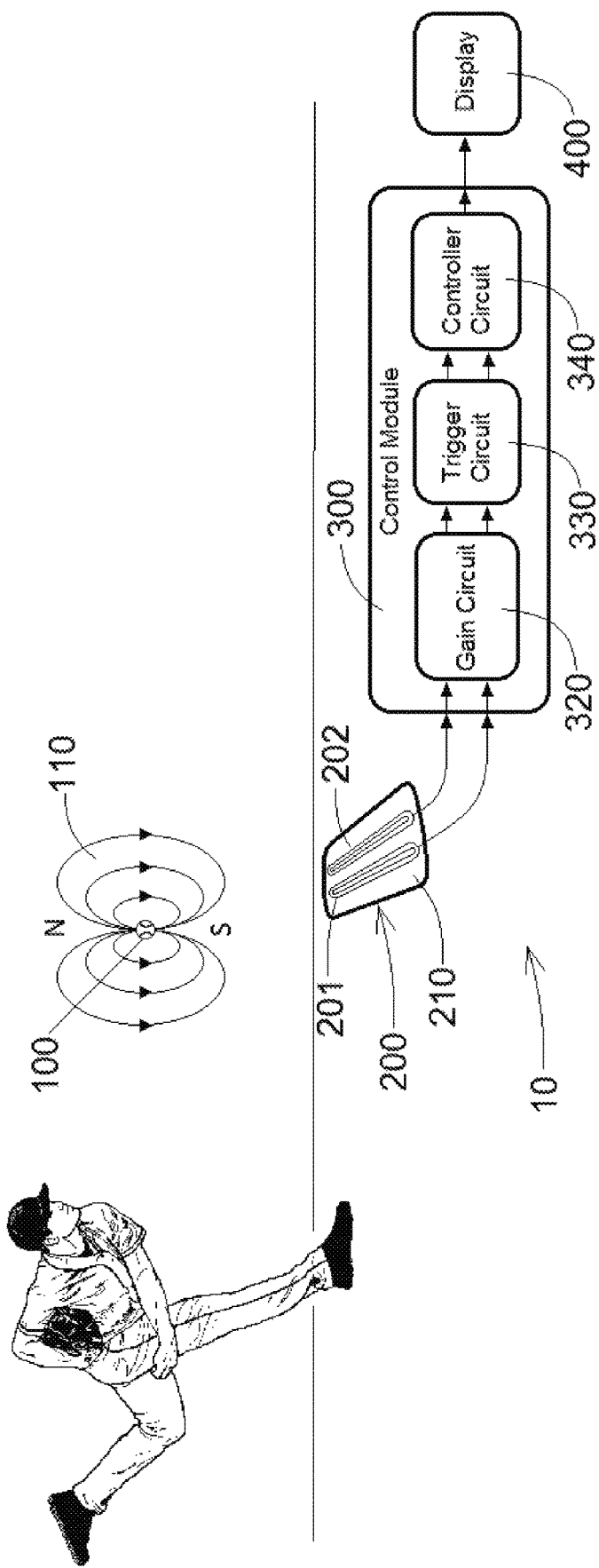
FIG. 11-B

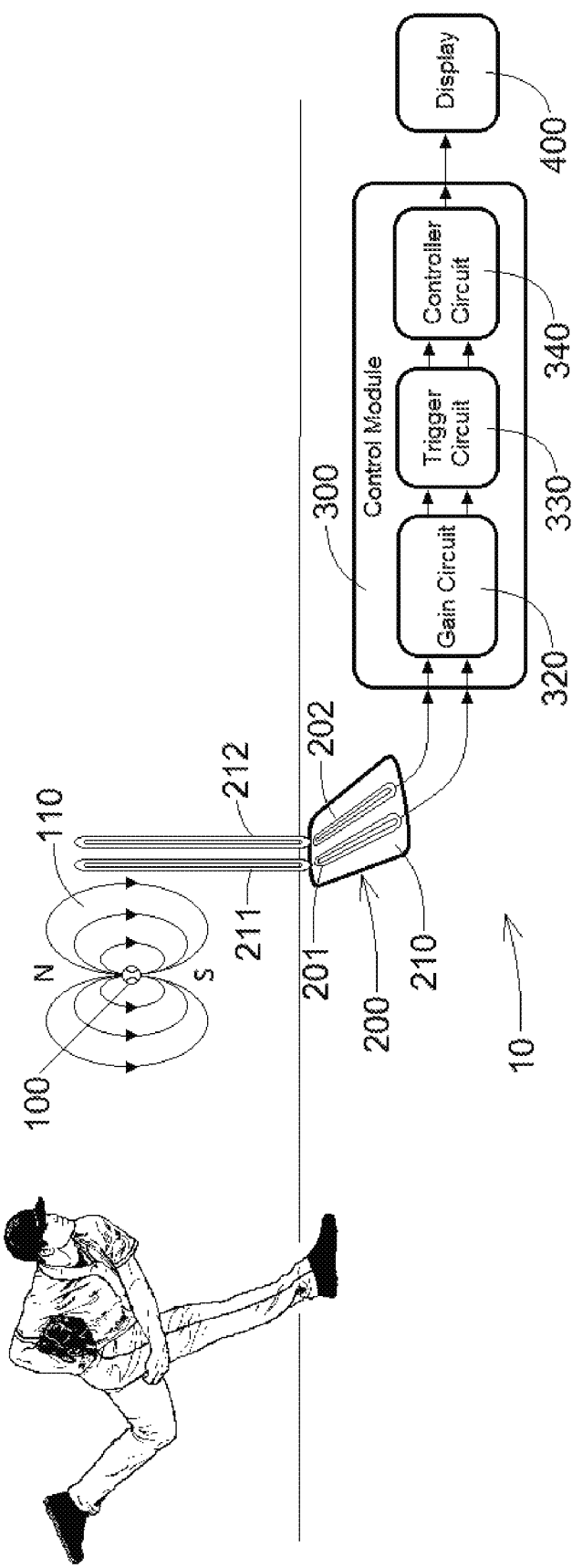
FIG. 11-C

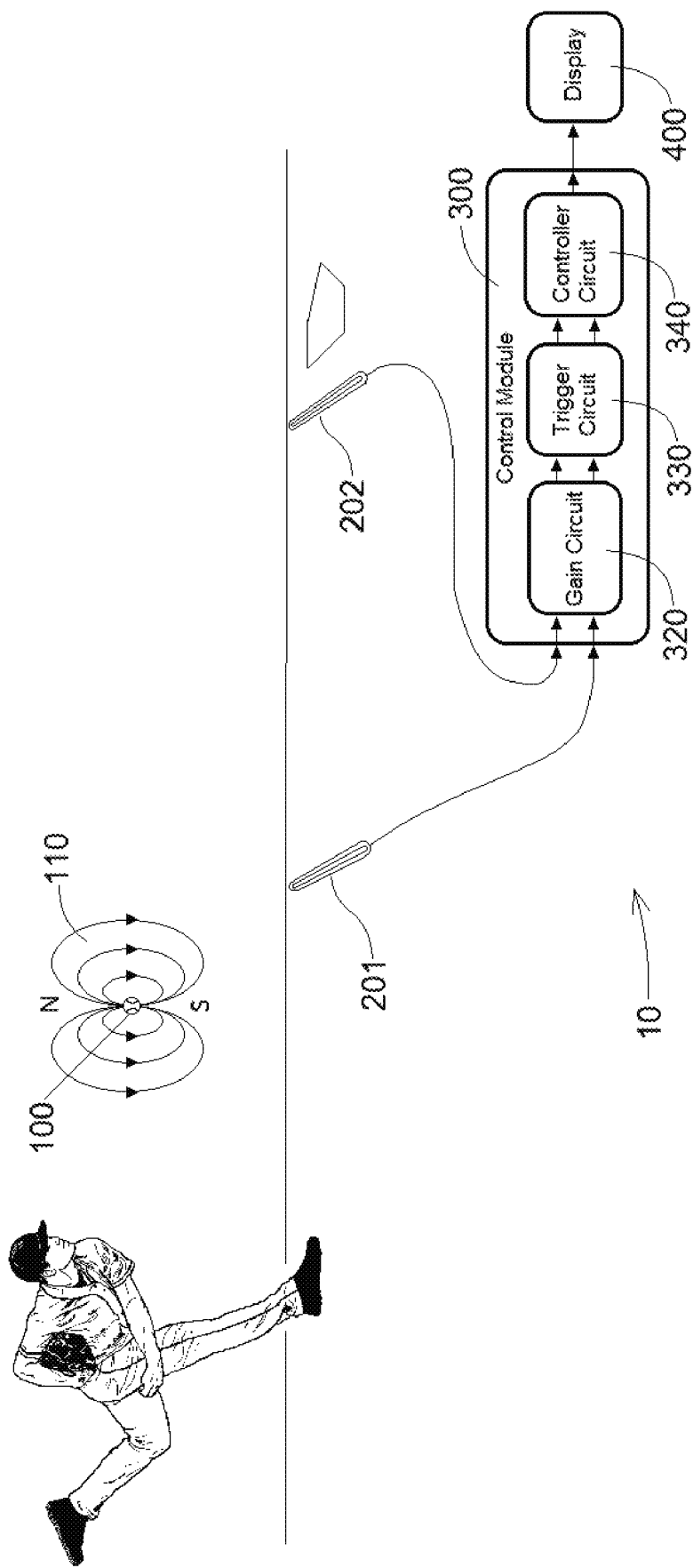
FIG. 11-D

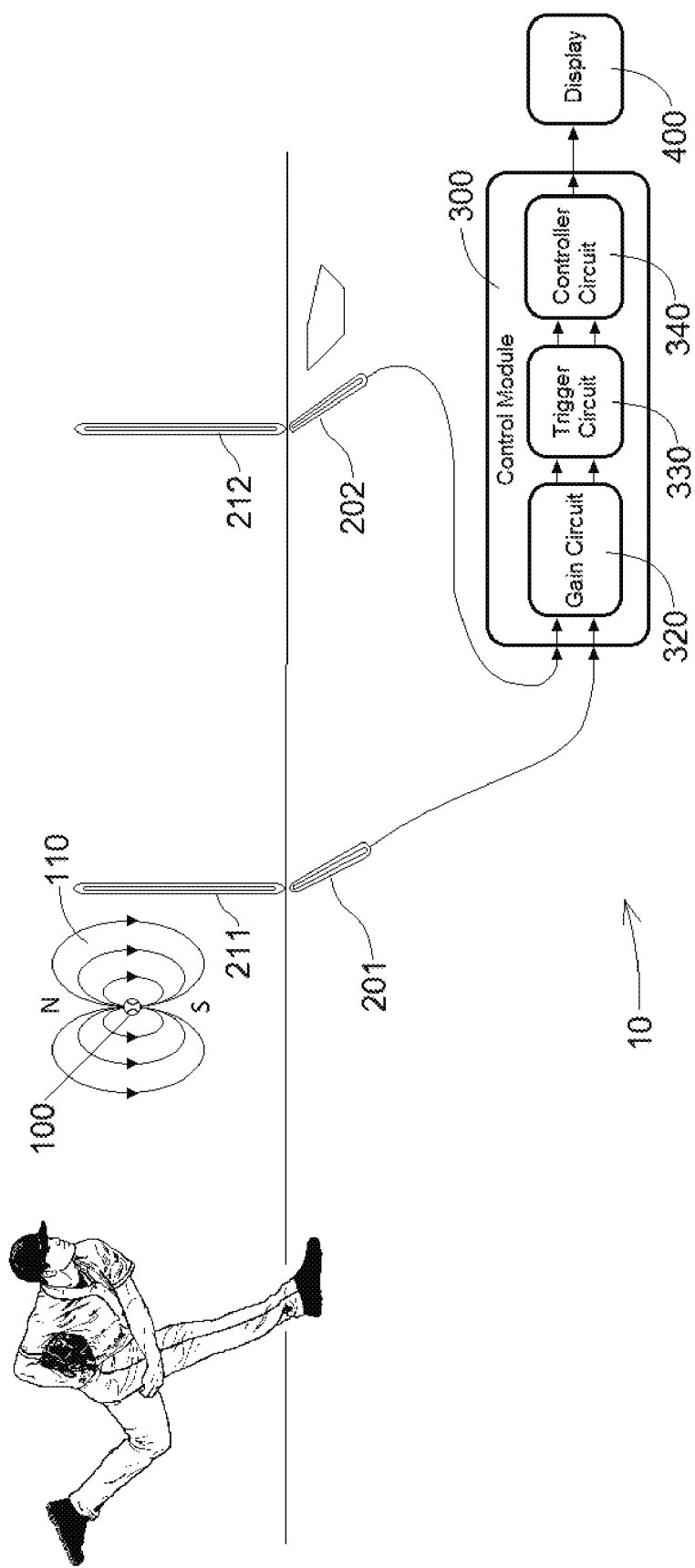
FIG. 11-E

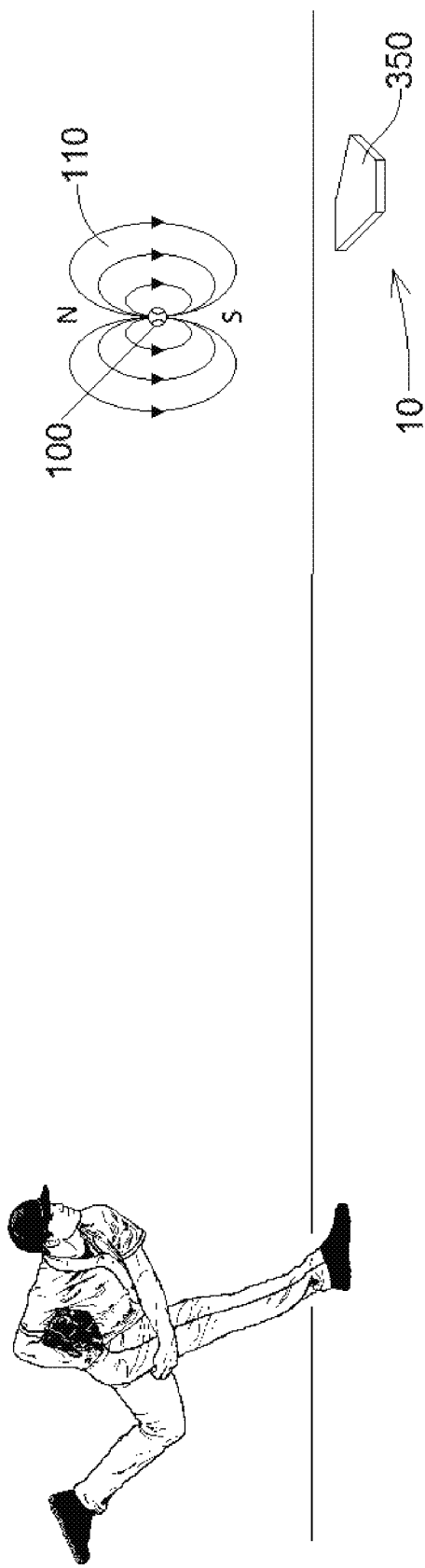
FIG. 11-F

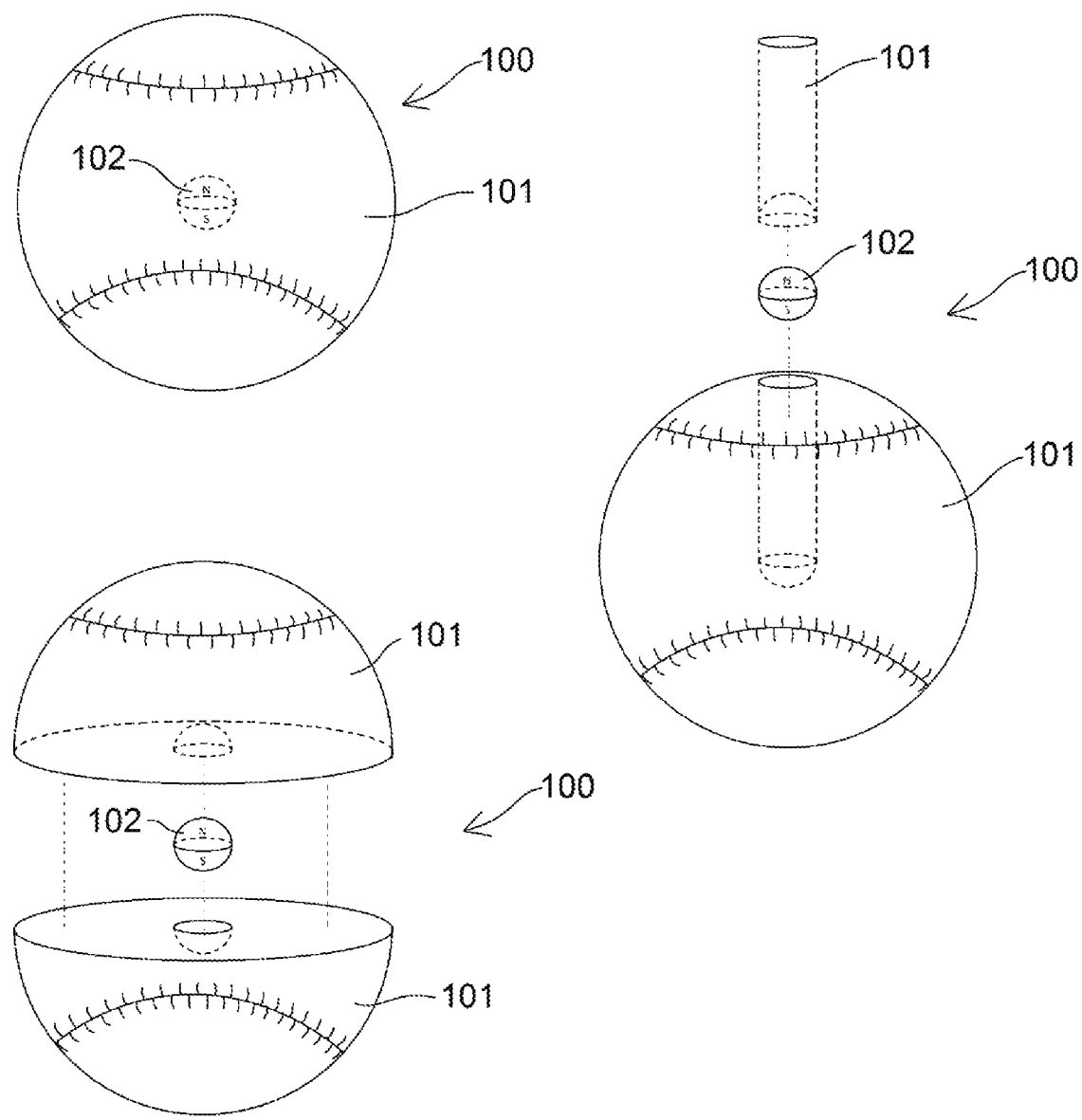
FIG. 12-A

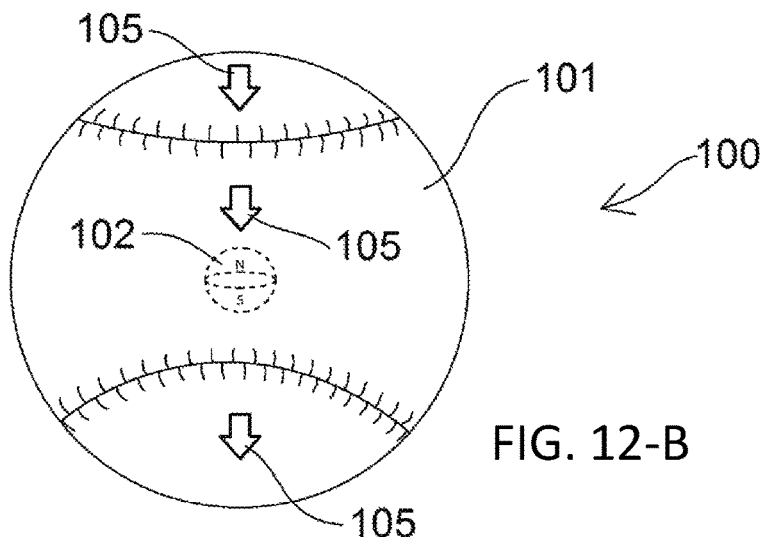
FIG. 12-B
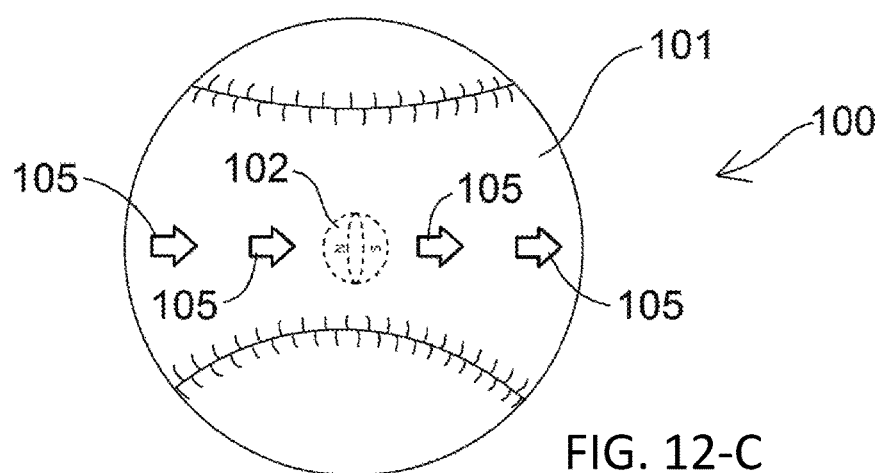
FIG. 12-C
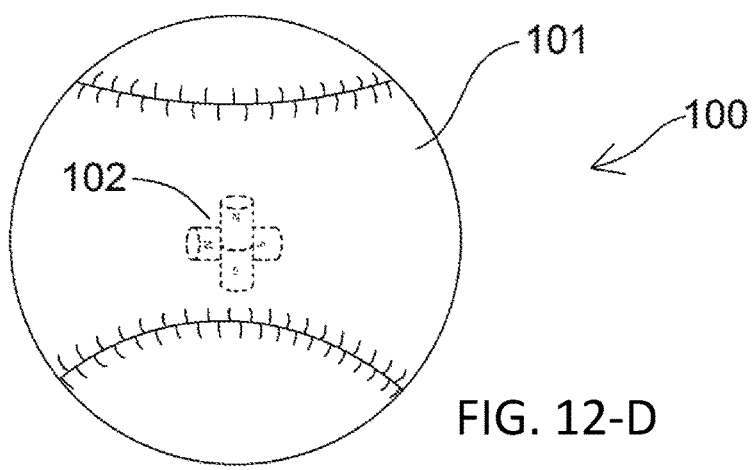
FIG. 12-D

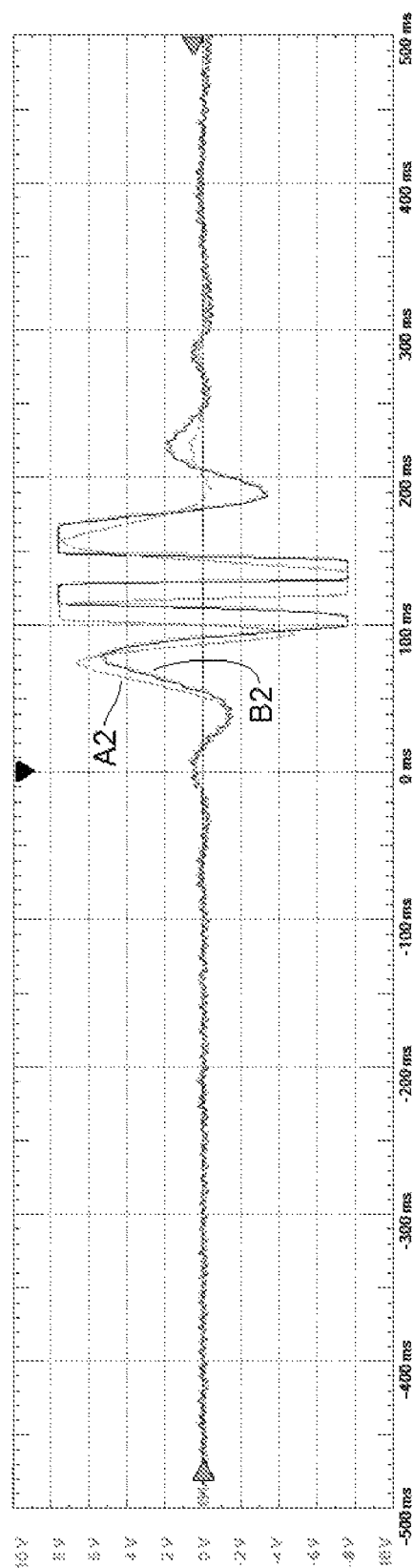
FIG. 13-A

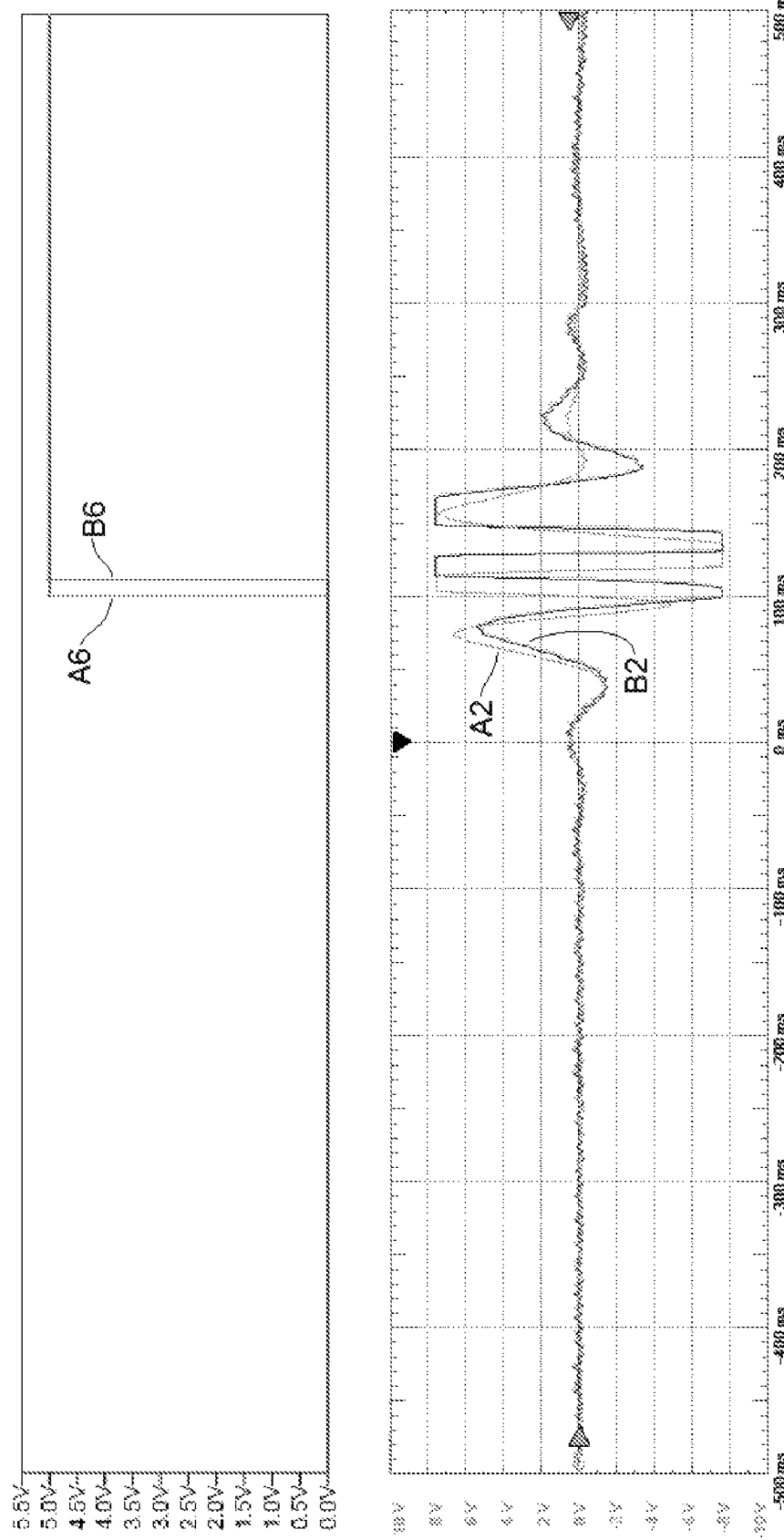
FIG. 13-B

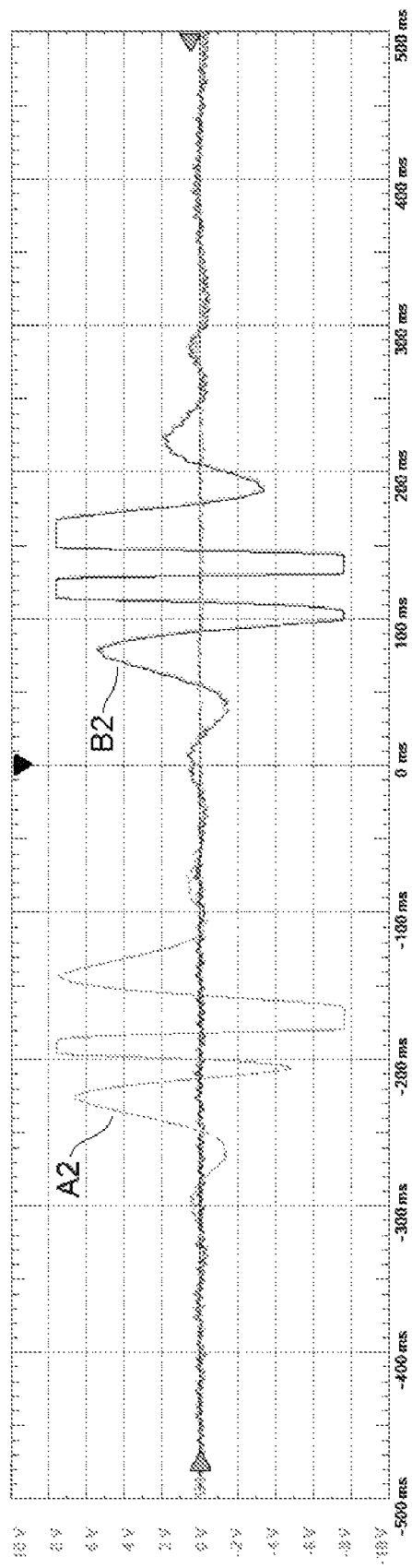
FIG. 13-C

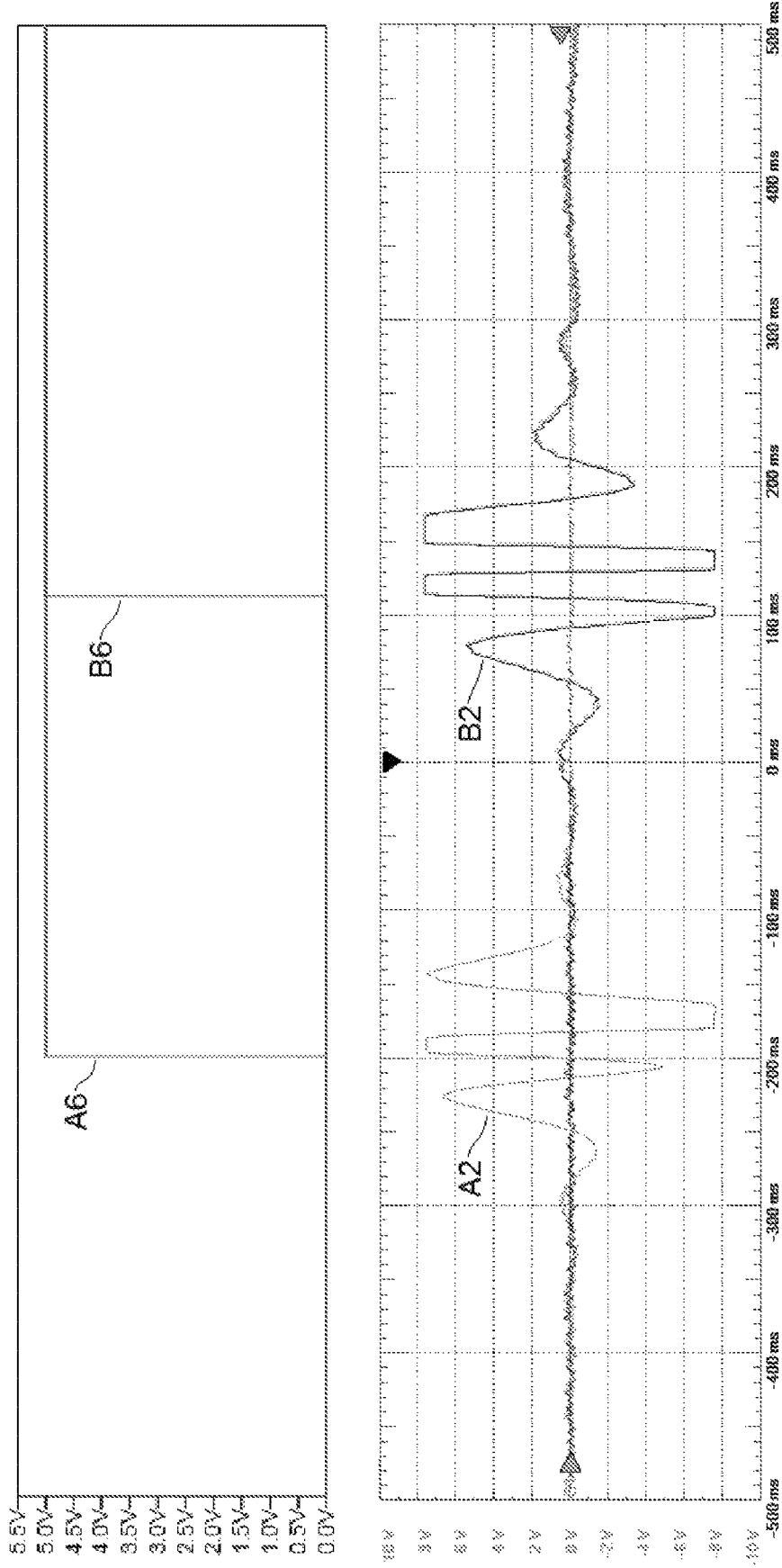
FIG. 13-D

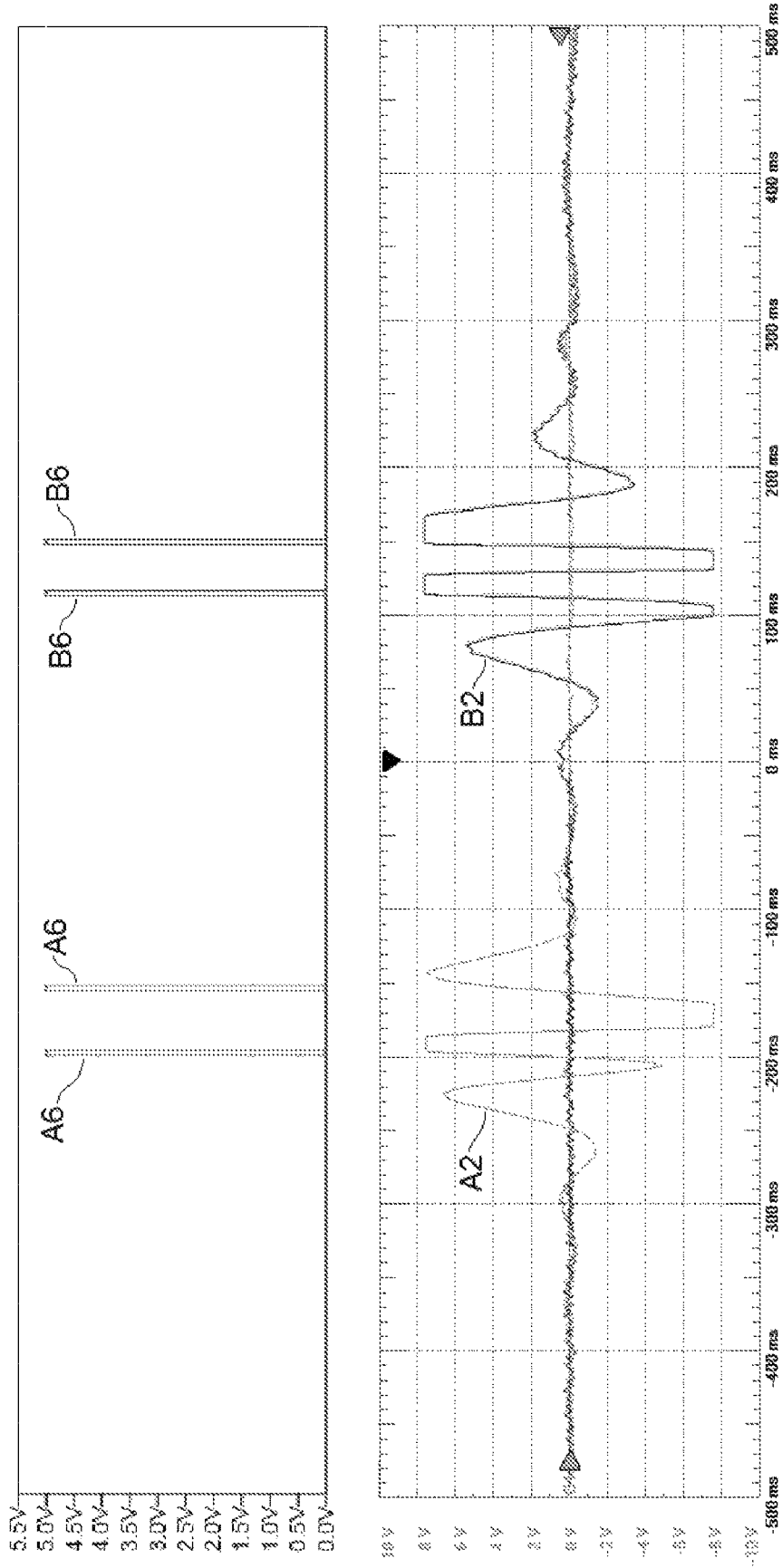
FIG. 13-E

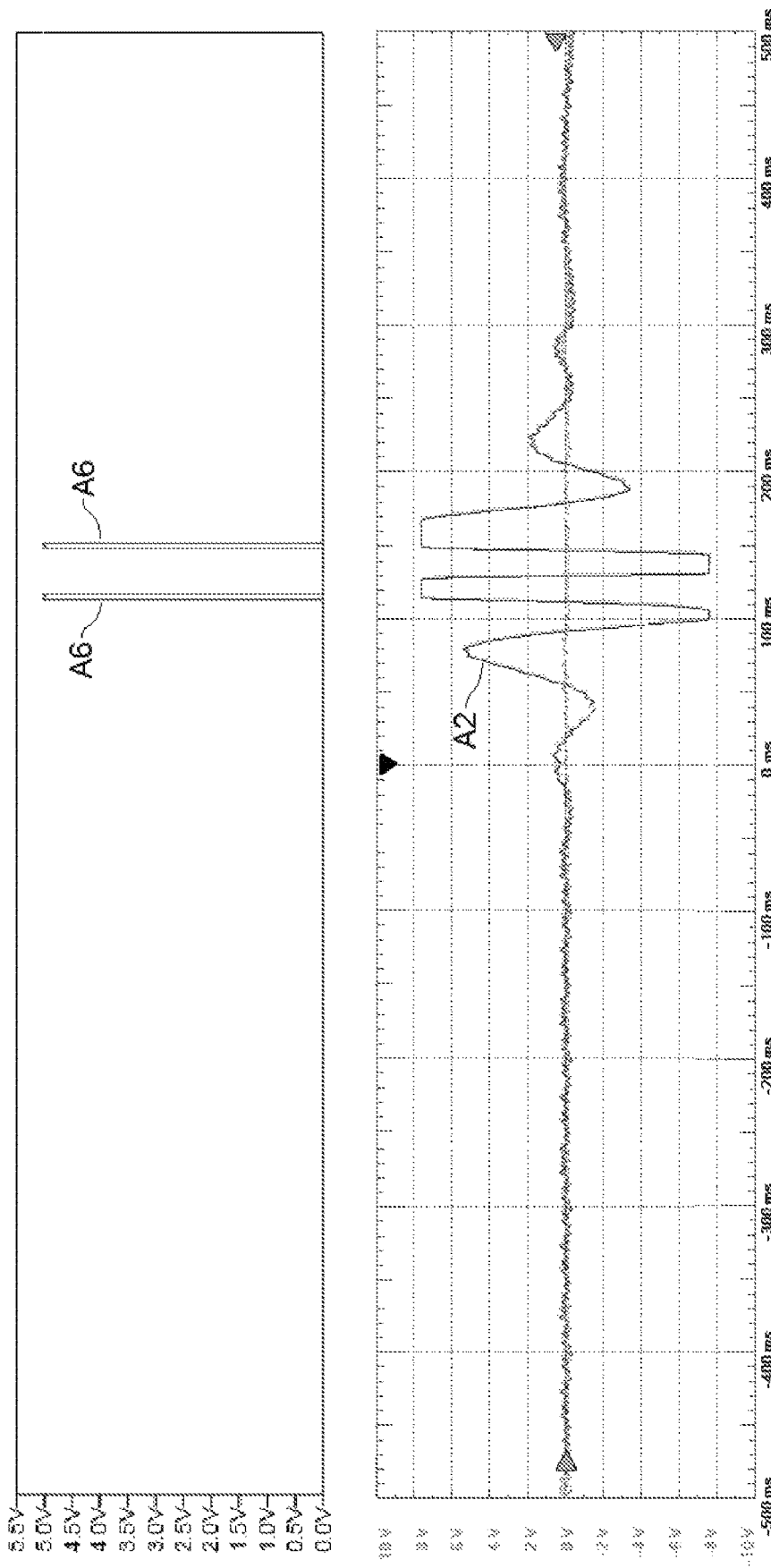
FIG. 13-F

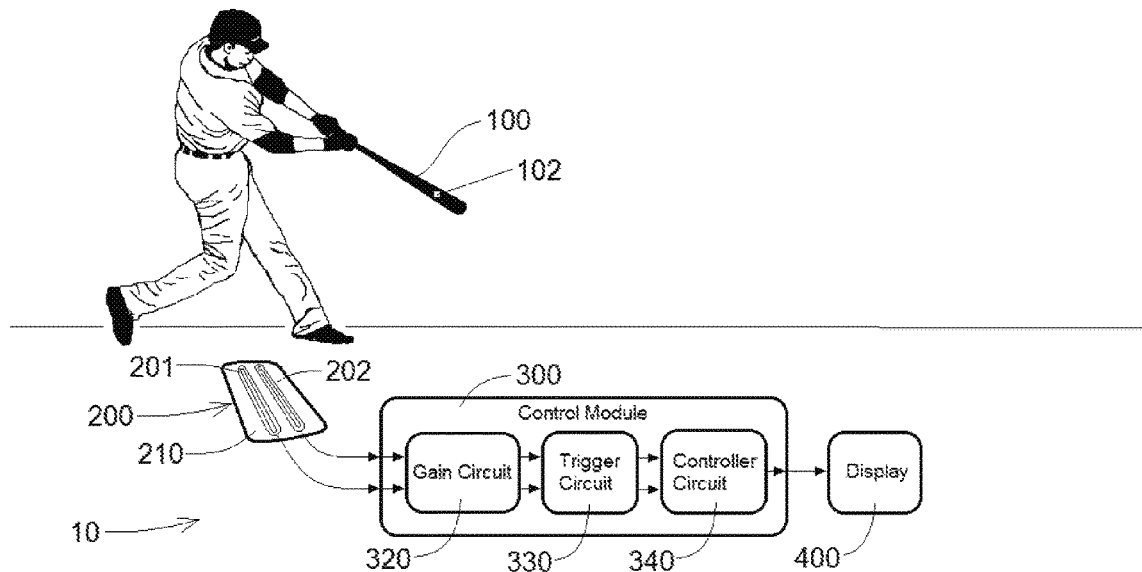
FIG. 16-A
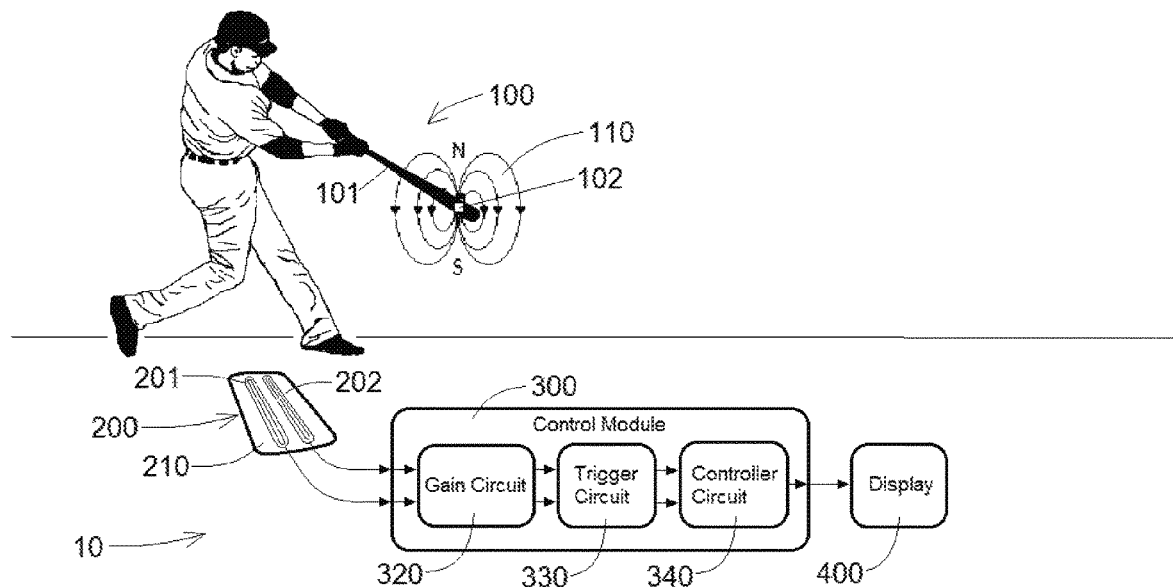
FIG. 16-B

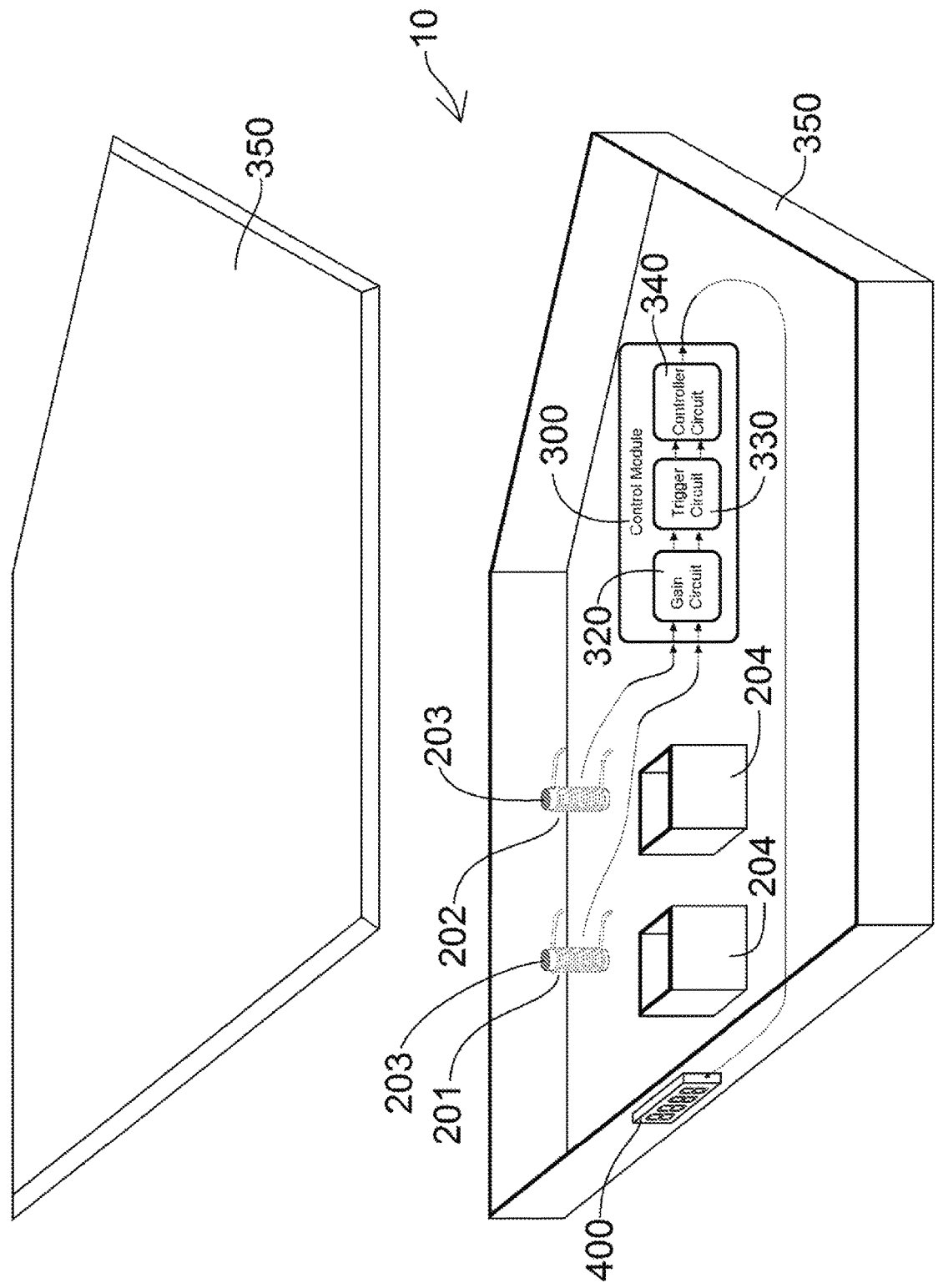
FIG. 19-A

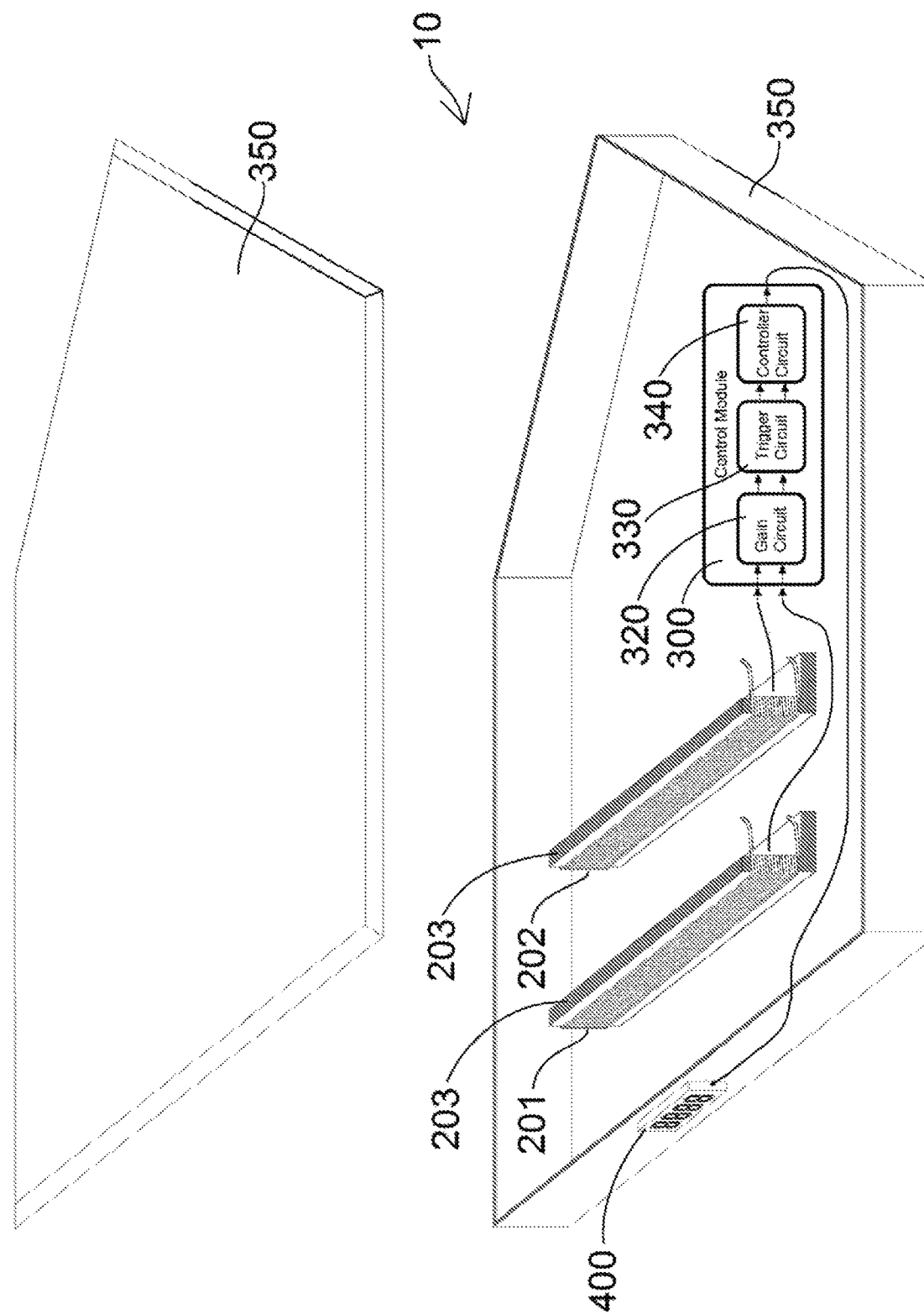
FIG. 19-B

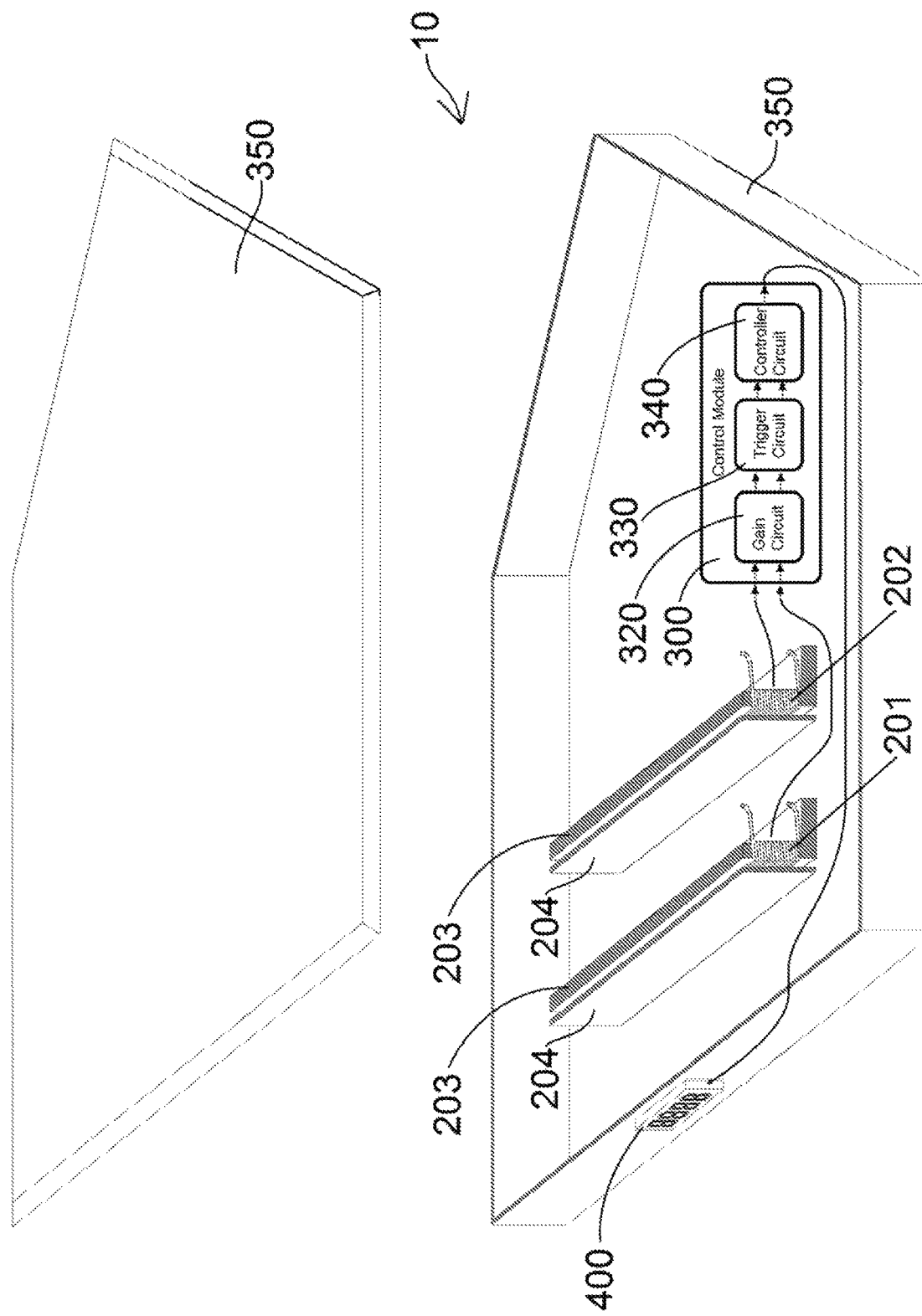
FIG. 19-C

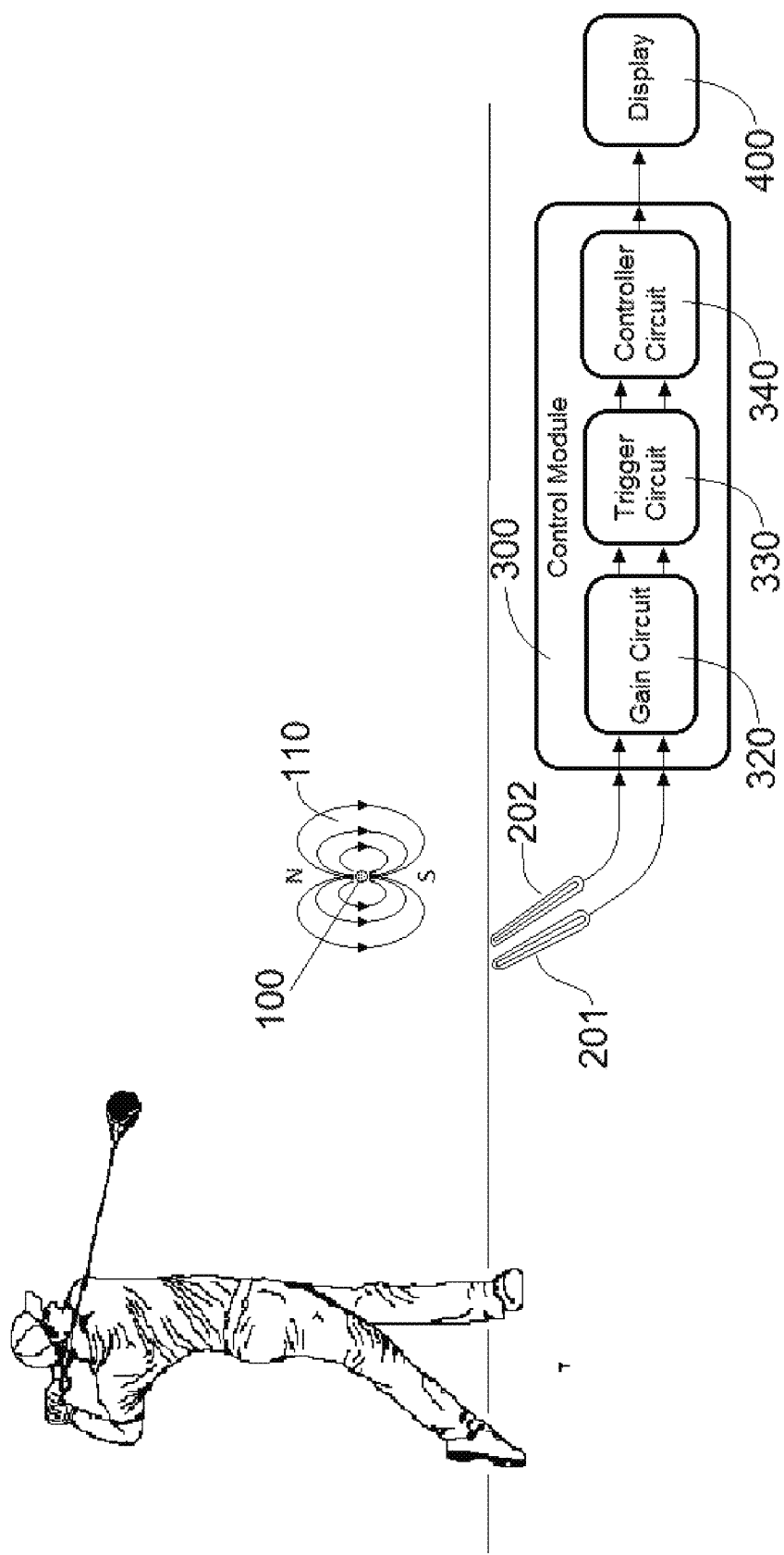

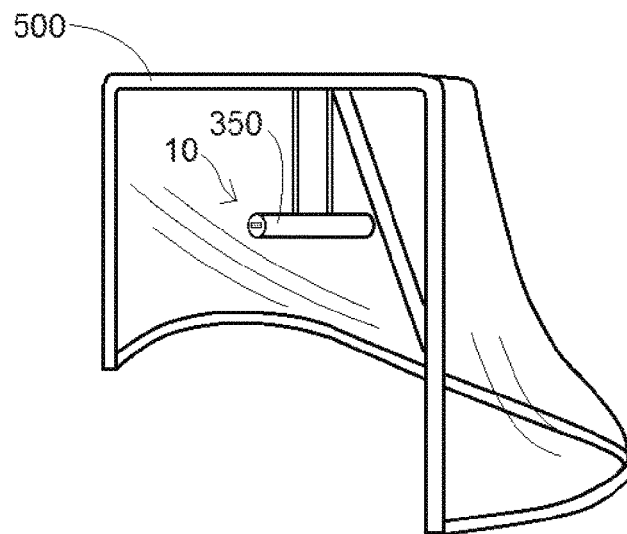
FIG. 26-A
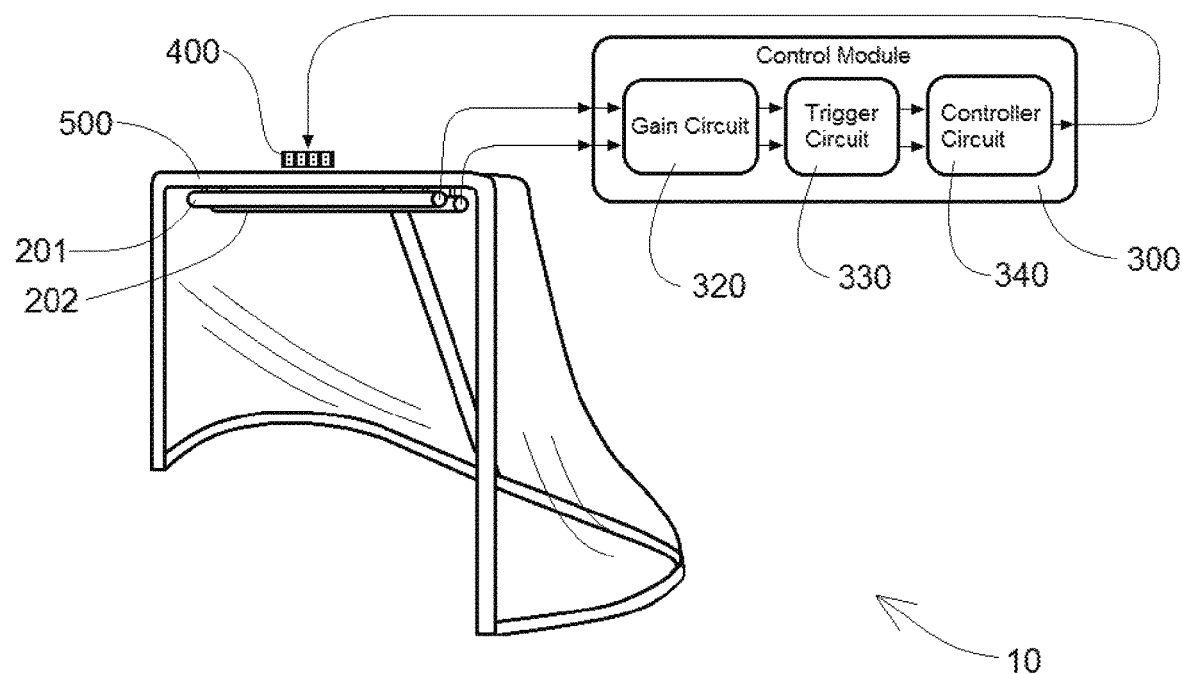
FIG. 26-B

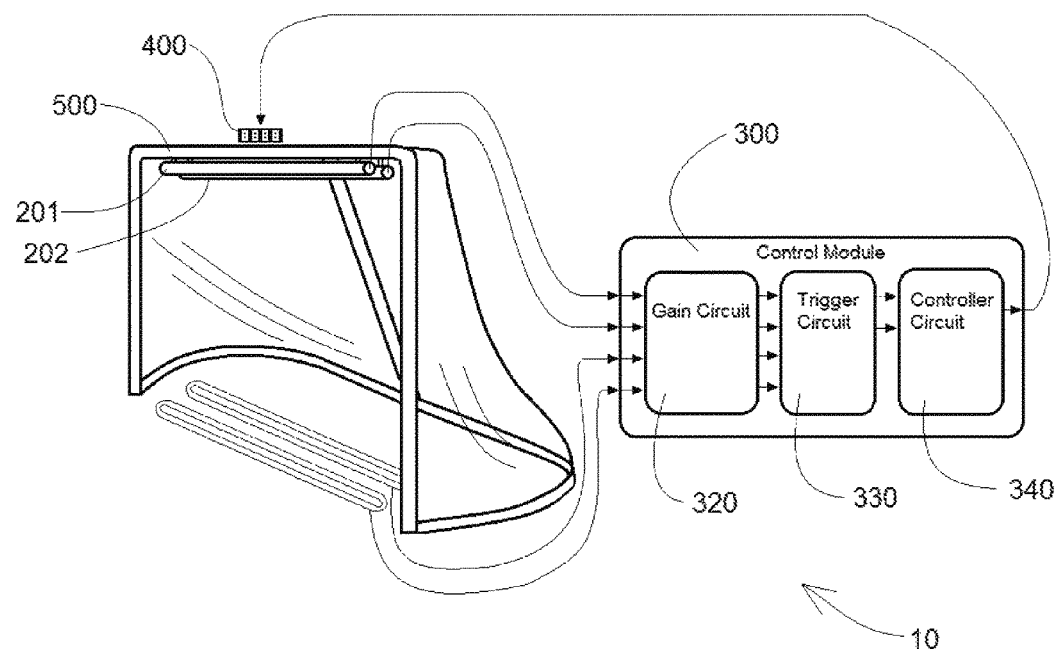
FIG. 26-C
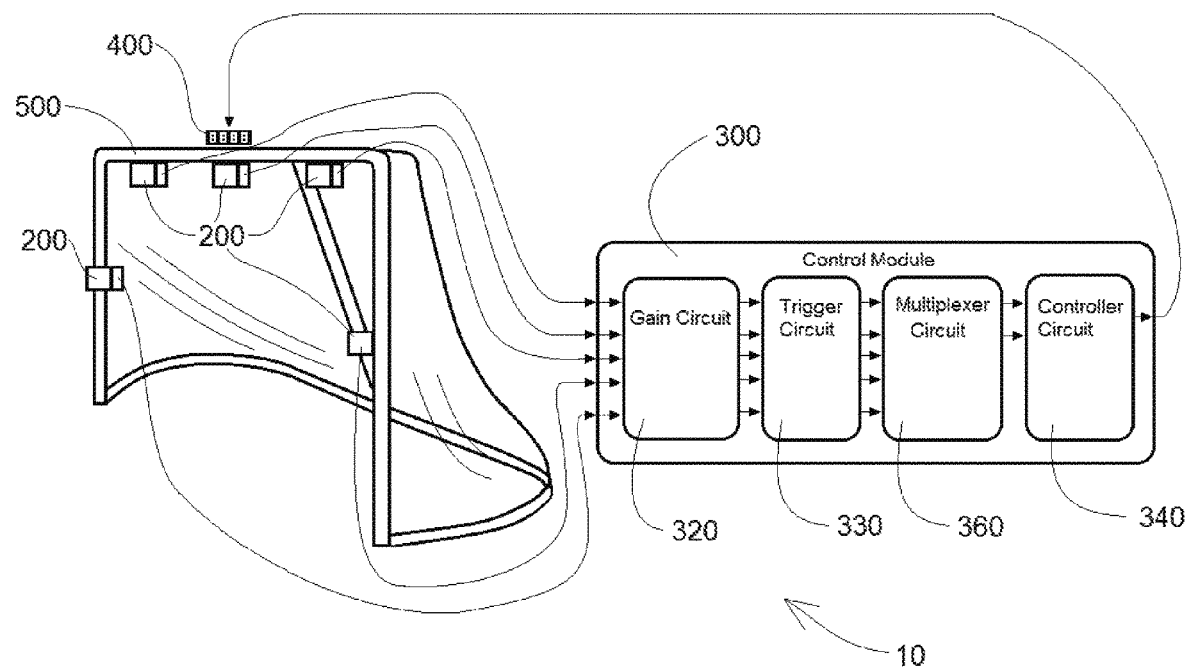
FIG. 26-D

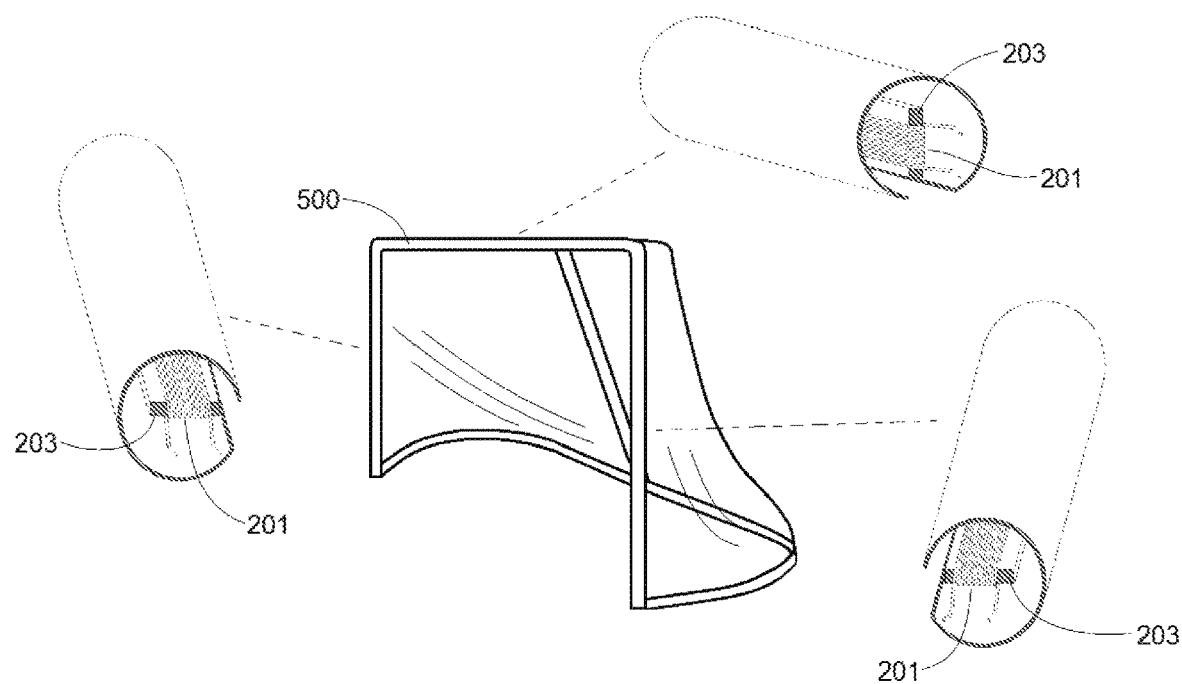
FIG. 26-E
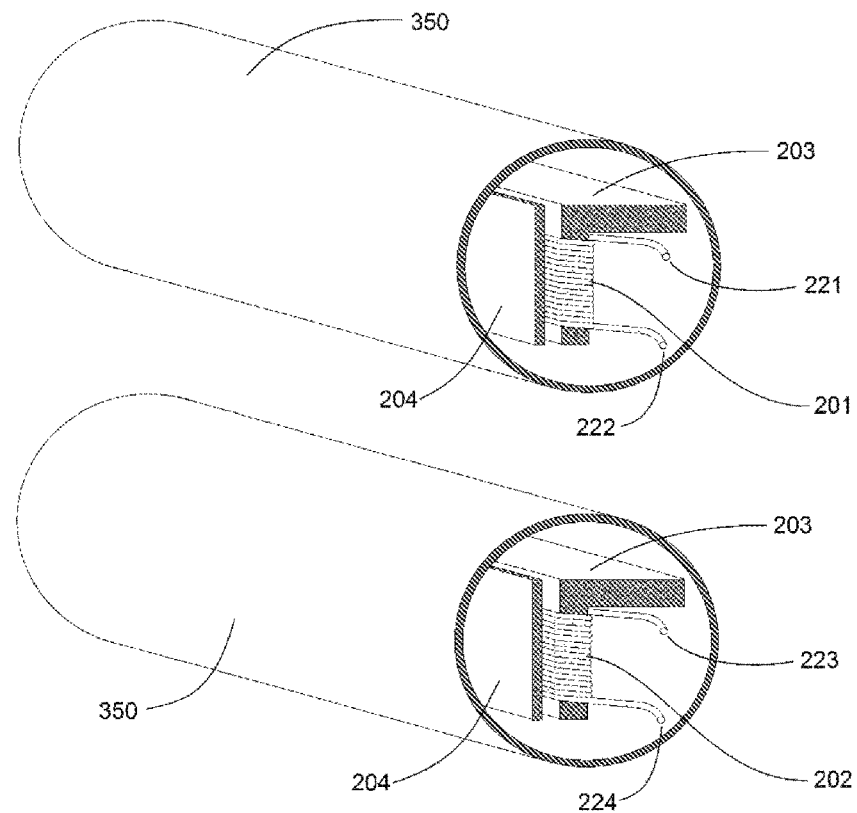
FIG. 27

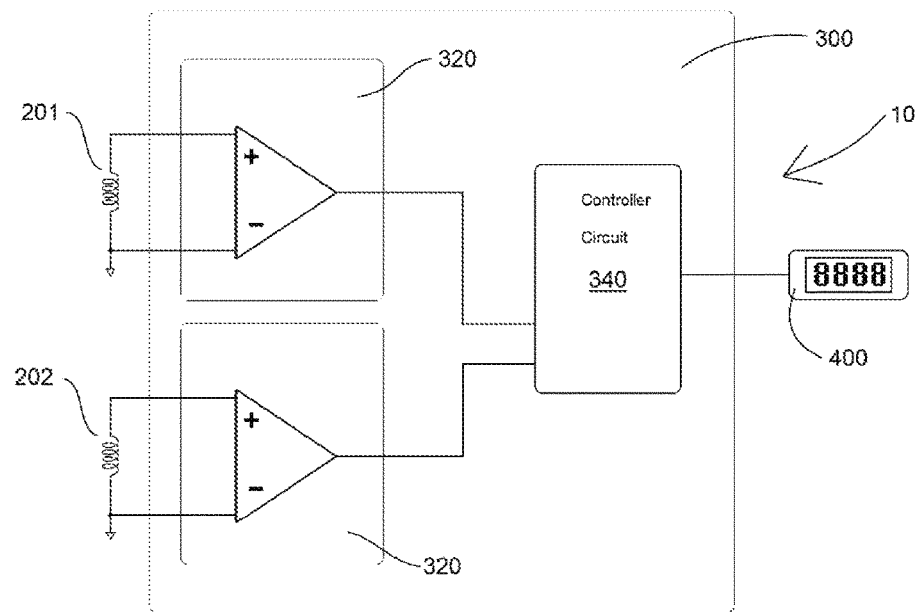
FIG. 30-A
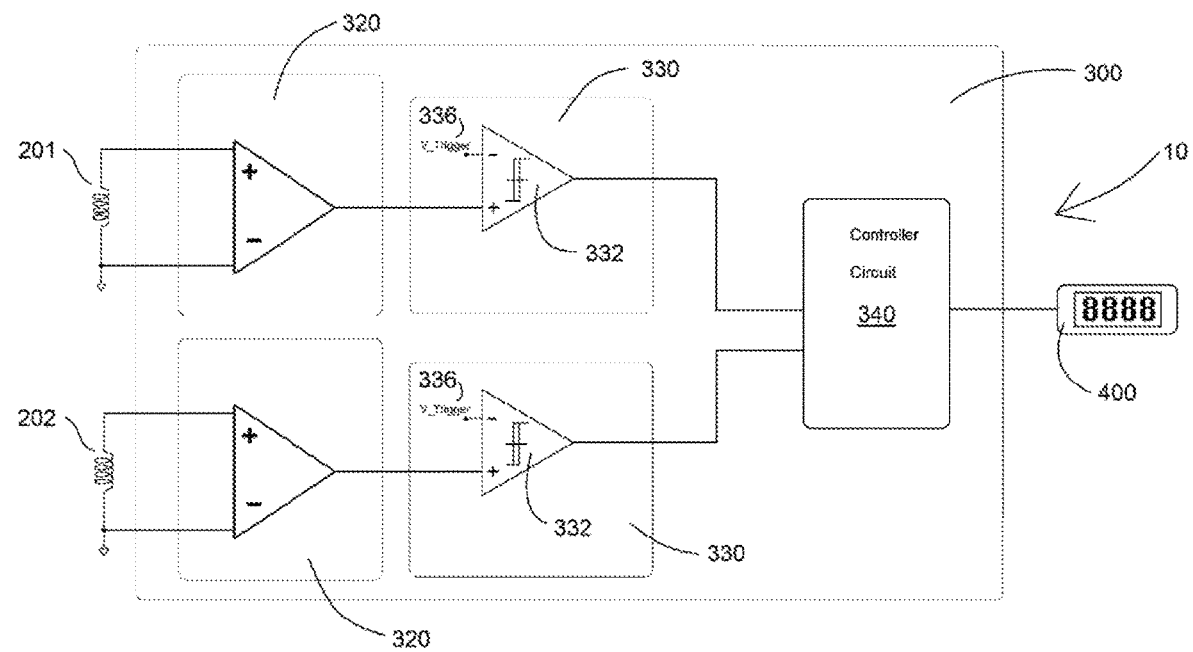
FIG. 30-B

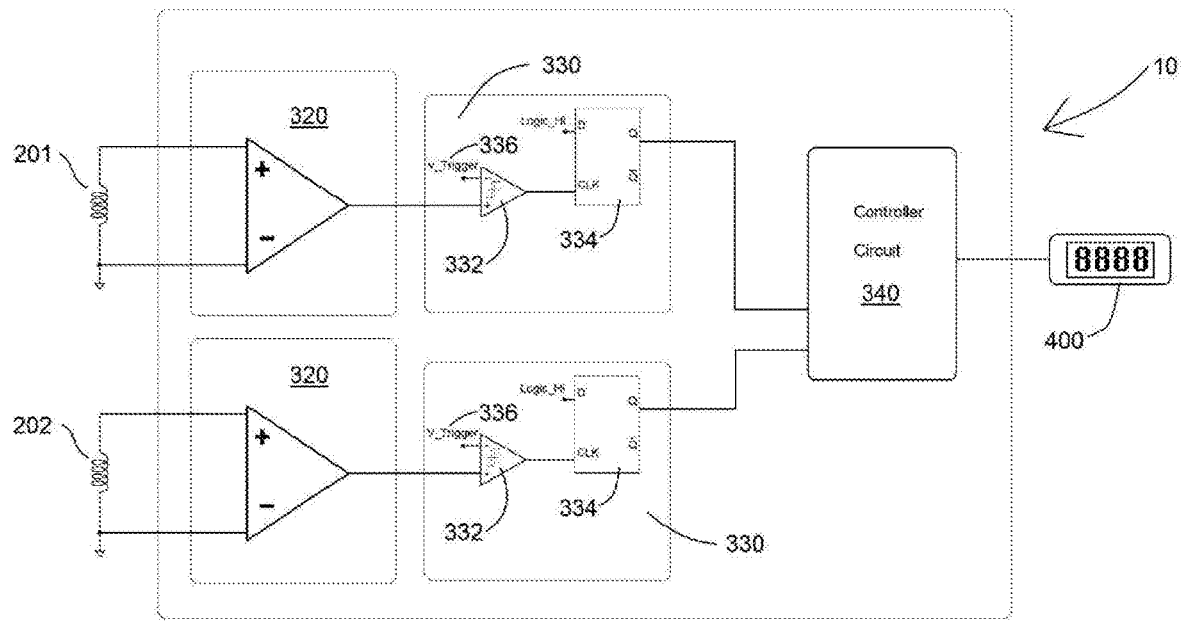
FIG. 30-C
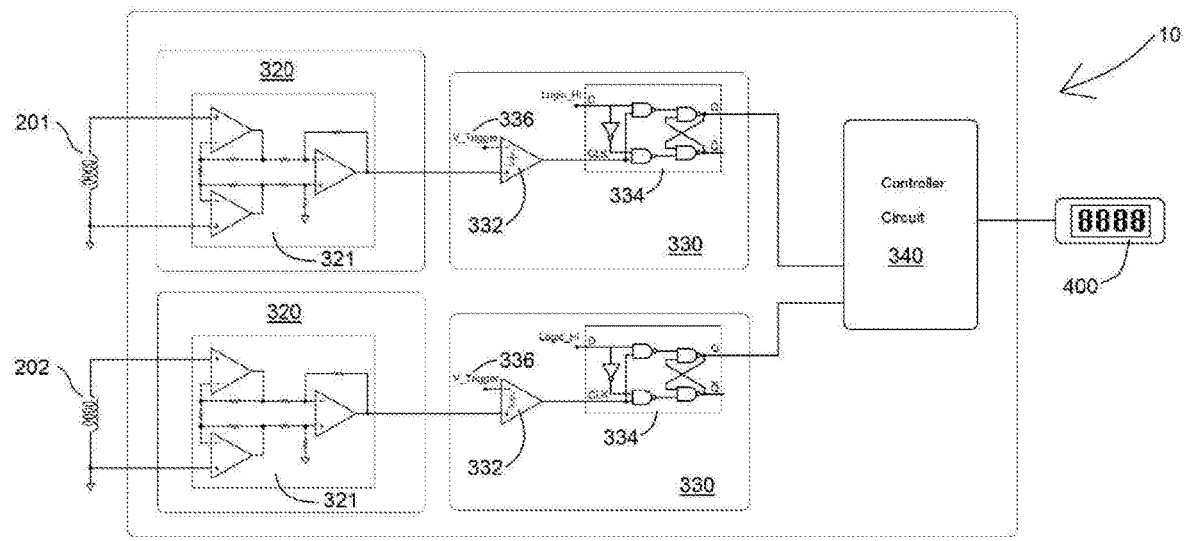
FIG. 30-D

SYSTEM AND METHOD FOR MEASURING SPEED, SPIN RATE, AND ACCURACY OF A SPORTING DEVICE

CROSS-REFERENCE TO RELATED APPLICATIONS

This application claims priority under 35 U.S.C § 119 to provisional application No. 62/396,830, filed Sep. 20, 2016, entitled "System and Method for Measuring Speed, Spin Rate, and Accuracy of a Sporting Device," and the content of which is incorporated herein by reference in its entirety.

FIELD OF THE INVENTION

The present invention relates to measuring the motion properties of a movable object. More particularly, the present invention relates to a system and method for determining motion properties such as speed, rate of spin, and accuracy of a movable sporting device, such as a baseball, a hockey puck, a golf ball, a lacrosse ball, a bowling ball, a football, an arrow, a baseball bat, a golf club, or the like.

BACKGROUND

Athletes are often interested in knowing various motion properties of the moving objects associated with their respective sports. The ability to measure motion properties such as speed, rate of spin, and accuracy may help sports participants assess and improve their skills. For example, having the ability to measure the speed, rate of spin, and accuracy of a thrown ball may help baseball players or football players assess and improve their throwing skills. Similarly, hockey players, lacrosse players, and golfers may assess and improve their shooting or hitting skills by measuring the speed and accuracy of their shots. Furthermore, measuring the swing speed of a baseball bat, a golf club, or even a first may help baseball players, golfers, or martial artists, respectively, analyze and improve their form.

The speed of moving objects in sporting applications is typically measured with Doppler radar. Doppler radar systems measure speed by bouncing microwave signals off a desired target object and analyzing how the object's motion has altered the frequency of the reflected signal. While these systems can achieve a high degree of accuracy when calculating speed, they are typically very expensive, and they generally do not calculate any other motion properties, such as rate of spin. Furthermore, Doppler radar systems may have difficulty acquiring the intended target of interest; for example, a Doppler radar system may acquire a return signal reflected off of a swinging hockey stick, as opposed to acquiring the intended return signal reflected off of the moving puck. Doppler radar systems may also have difficulty calculating the speed of relatively slow moving targets, since slow moving objects do not alter the frequency of the returned signal as much as fast moving objects do. Another limitation of Doppler radar systems is that they are often embodied in a radar gun form that requires operation by someone other than the athlete performing the event to be measured. This may inhibit athletes who wish to practice their skills in solitary.

It is thus apparent that there is a need in the art for an improved system and method for measuring the motion properties of a moving object, which does not require the moving object to travel a known or predetermined distance, does not significantly or materially alter the moving object's physical characteristics or flight performance, is accurate for a wide range of speeds, does not acquire and measure false targets, has low power requirements, does not require power to be supplied to the moving object, does not require sensors or active components embedded within the moving object, does not require the moving object to strike any measurement apparatus, is inexpensive and durable, is easily portable and easy to set up, is simple to use, is applicable to many different types of sports equipment and other movable objects, measures many different motion characteristics including speed, rate of spin, and accuracy, and is operable by the person doing the throwing, shooting, hitting, swinging, rolling, or kicking. The present invention meets these and other needs in the art.

BRIEF SUMMARY OF THE INVENTION

The present disclosure provides a system and method for measuring motion properties, such as speed, rate of spin, and accuracy, of a movable object. The system and method presented are particularly well suited for sporting applications in which the movable object to be measured is a sporting device, such as a baseball, a hockey puck, a golf ball, a lacrosse ball, a bowling ball, a football, and arrow, a baseball bat, a golf club, or the like.

The disclosed system and method for measuring motion properties of a movable object contemplate that the movable object to be measured has an associated magnetic field. A magnetic field may be applied to the movable object to be measured by embedding a magnetized unit, that is capable of producing a magnetic field, inside the movable object itself. Alternatively, the magnetized unit may be attached or secured to the movable object, as appropriate for the application. For example, in a hockey application the magnetized unit may be embedded and completely disposed inside the body of the puck, such that the look, feel, size and shape of the puck remains the same as a conventional puck. Whereas in a baseball application in which the movable sporting device to be measured is a baseball bat, it may be appropriate to secure the magnetized unit to the exterior of the baseball bat. It should be noted that some movable objects, such as iron golf clubs, may inherently produce their own magnetic fields and therefore may not utilize an embedded, attached or secured magnetized unit.

One embodiment of the disclosed system for measuring motion properties of a magnetized movable object comprises at least one magnetic field sensor, the first magnetic field sensor, in communication with a control module. The first magnetic field sensor is capable of producing an output signal in response to changes in the local magnetic field caused by the magnetized object moving along a proximate trajectory. The control module is responsive to the output signals produced by the first magnetic field sensor, and is configured to determine motion properties, such as speed, rate of spin, and accuracy of the magnetized movable object. For example, the control module may be configured to determine the speed of the movable object by analyzing the pulse width of the first magnetic field sensor's output signal. The control module may also be configured to determine the rate of spin of the movable object by analyzing the period of the first magnetic field sensor's output signal. The control module may further be configured to determine the trajectory, or accuracy relative to a target, of the movable object by analyzing the amplitude of the first magnetic field sensor's output.

Another embodiment of the disclosed system for measuring motion properties of a magnetized movable object further comprises a display device and a second magnetic field sensor in communication with the control module. The second magnetic field sensor is positioned at a known distance, Δd, away from the first magnetic field sensor described above. The second magnetic field sensor provides the control module with more output signal data to utilize for determining motion properties of the magnetized movable object. In this embodiment, the control module may be configured to determine the time duration, Δt, between a first output signal event, received from the first magnetic field sensor, and a second output signal event, received from the second magnetic field sensor. The control module is further configured to calculate the speed of the magnetized moving object by dividing the distance, Δd, by the time duration, Δt. The control module is still further configured to write the calculated speed to the display device for viewing by the user. For applications in which knowing the spin rate of the magnetized movable object to be measured is of interest, such as baseball or bowling, the control module may be configured to measure the time interval between detected changes in the polarity of the magnetic field surrounding the first magnetic field sensor caused by the rotation of the magnetized movable object, and to use the measured time interval to calculate the spin rate of the rotating magnetized movable object.

An exemplary method for measuring the speed of a magnetized movable object comprises the steps of:
1) Positioning a first magnetic field sensor, being capable of producing a first output signal in response to a change in the magnetic field surrounding the first magnetic field sensor, in a known location;
2) Positioning a second magnetic field sensor, being capable of producing a second output signal in response to a change in the magnetic field surrounding the second magnetic field sensor, at a known distance, Δd, away from the first magnetic field sensor;
3) Monitoring the first magnetic field sensor, and detecting a first output signal produced in response to a change in the magnetic field surrounding the first magnetic field sensor as a result of a magnetized movable object traveling on a trajectory proximate to the first magnetic field sensor;
4) Recording time t1, the time at which the first output signal was detected;
5) Monitoring the second magnetic field sensor, and detecting a second output signal produced in response to a change in the magnetic field surrounding the second magnetic field sensor as a result of the magnetized movable object traveling on a trajectory proximate to the second magnetic field sensor;
6) Recording time t2, the time at which a second output signal was detected;
7) Calculating Δt, the elapsed time between t1 (the time at which the first output signal was detected from magnetic field sensor) and t2 (the time at which the second output signal was detected from magnetic field sensor), where:

$$\Delta t = t2 - t1$$

8) Calculating v, the speed of the magnetized movable object, by dividing Δd, the known distance between the first magnetic field sensor and the second magnetic field sensor, by Δt, such that:

$$v = \frac{\Delta d}{\Delta t}$$

9) Writing the calculated speed, v, to a display device for viewing by the user; and,
10) Repeating sequence from step 3 above, if another magnetized moving object to measure is expected.

An exemplary method for measuring the spin rate of a magnetized movable object comprises the steps of:
1) Positioning a first magnetic field sensor, being capable of producing a first output signal in response to a change in the polarity of the magnetic field surrounding the first magnetic field sensor, in a known location;
2) Monitoring the first magnetic field sensor, and detecting a first output signal produced in response to a change in the polarity of the magnetic field surrounding the first magnetic field sensor as a result of a magnetized movable object rotating while traveling on a trajectory proximate to the first magnetic field sensor;
3) Recording time t1, the time at which the first output signal was detected;
4) Monitoring the first magnetic field sensor, and detecting a second output signal produced in response to a change in the polarity of the magnetic field surrounding the first magnetic field sensor as a result of the magnetized movable object rotating while traveling on a trajectory proximate to the first magnetic field sensor;
5) Recording time t2, the time at which the second output signal was detected;
6) Calculating Δt, the elapsed time between t1 (the time at which the first output signal was detected from the first magnetic field sensor) and t2 (the time at which the second output signal was detected from the first magnetic field sensor), where:

$$\Delta t = t2 - t1$$

7) Calculating spin_rate of the rotating magnetized movable object, such that:

$$\text{spin\_rate} = \frac{1}{(2 * \Delta t)}$$

8) Writing the calculated spin_rate to a display device for viewing by the user; and,
9) Repeating sequence from step 2 above, if another rotating magnetized object to measure is expected.

BRIEF DESCRIPTION OF THE DRAWINGS

FIGS. 1-A though 1-C present an exemplary embodiment of system 10 and magnetized projectile 100, as configured for a hockey application.

FIG. 3-A shows multiple perspective views of an exemplary embodiment of magnetized object 100, as configured for a hockey application.

FIGS. 4-A and 4-B show perspective views of exemplary embodiments of magnetic field sensor 201 and sensor array 200, as configured for a hockey application.

FIGS. 5-A through 5-C present simplified schematic views of exemplary embodiments of system 10.

FIGS. 6-A through 6-C present detailed hierarchal schematic views of exemplary embodiments of gain circuit 320 and trigger circuit 330. FIGS. 6-A through 6-C were constructed for purposes of simulating gain circuit 320 and trigger circuit 330. FIG. 6-D shows a detailed schematic of an actual PCB board used for gain circuit 320 and trigger circuit 330.

FIGS. 11-A though 11-F present various alternate embodiments of system 10 and magnetized projectile 100, as configured for a baseball application.

FIGS. 12-A through 12-D show multiple perspective views of an exemplary and alternate embodiments of magnetized object 100, as configured for a baseball application.

FIGS. 13-A through 13-F present output waveforms, A2 and B2, generated by the exemplary embodiment of gain circuit 320 in response to a thrown baseball 100 in various embodiments of system 10 for a baseball application. FIGS. 13-B, 13-D, 13-E, and 13-F further show corresponding output waveforms A6 and B6, generated by the exemplary embodiment of trigger circuit 330.

FIGS. 16-A and 16-B present an exemplary embodiment of system 10 and magnetized baseball bat 100, as configured for a baseball bat swing speed application.

FIGS. 19-A through 19-C show a perspectives views of alternate embodiments of housing 350 and sensor array 200 of system 10, as configured for a baseball application.

FIG. 20 shows an exemplary embodiment of system 10 and magnetized object 100, as configured for a golf application.

FIGS. 26-A through 26-E show perspective views of multiple alternative embodiments of housing 350 and magnetic field sensors 201 and 202 of system 10, as configured for a hockey net application.

FIG. 27 shows a perspective view of an alternate embodiment of housing 350 and magnetic field sensors 201 and 202 of system 10, as configured for a hockey net application.

FIGS. 30-A through 30-D show schematic views of multiple alternative simplified embodiments of control module 350 of system 10.

DETAILED DESCRIPTION AND BEST MODE OF IMPLEMENTATION

Figure 2:
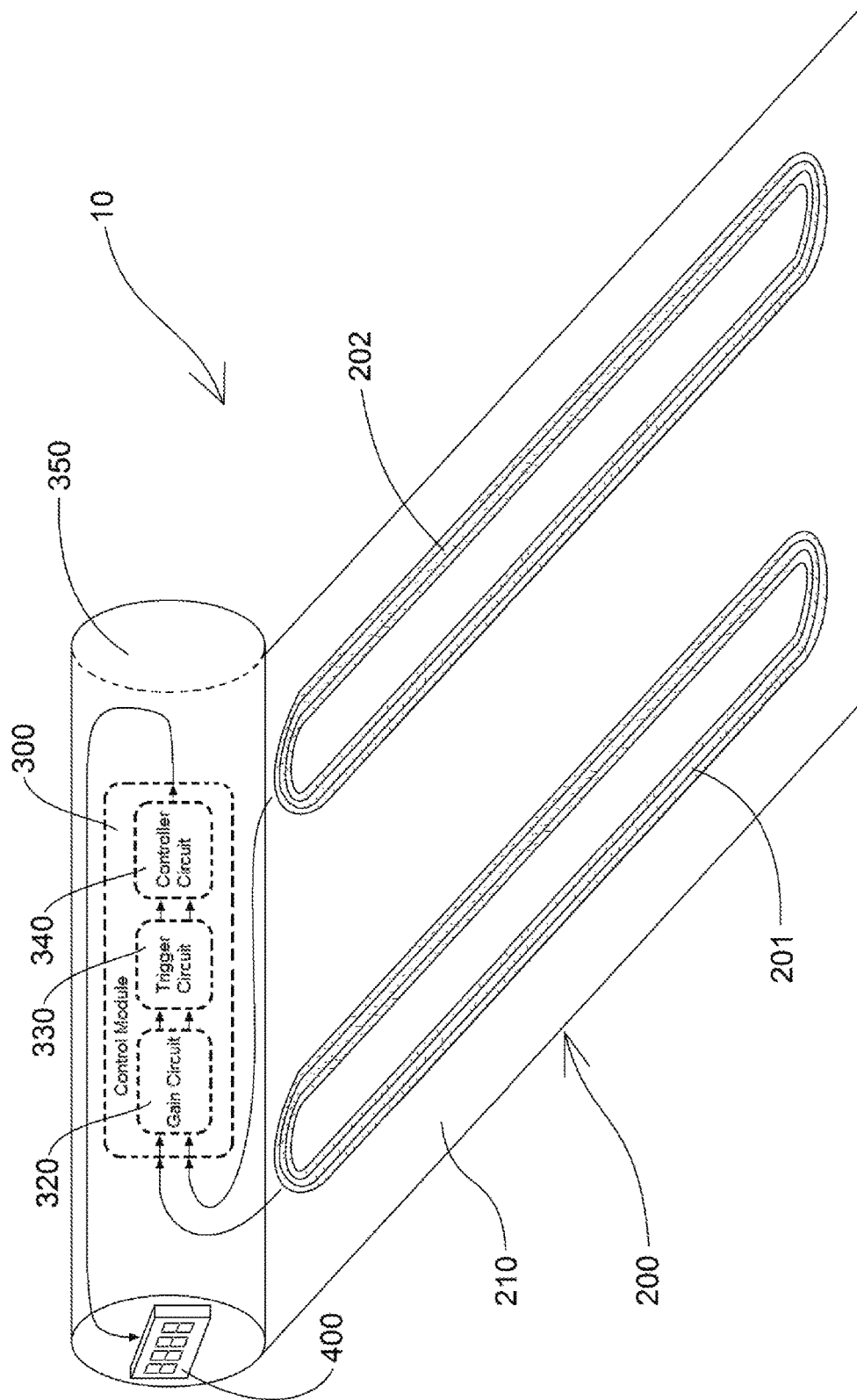
FIG. 2 shows a perspective view of an exemplary embodiment of housing 350 and sensor array 200 of system 10, as configured for a hockey application.

The best presently contemplated mode of implementing the present invention is described below. The following descriptions of exemplary and alternate embodiments of the present invention are made for the purpose of illustrating the general principles of the invention, and should not be read to limit the scope of the invention to the specific embodiments described.

Overview

The present disclosure provides a system and method for measuring motion properties, such as speed, rate of spin, and accuracy, of a movable object. The system and method presented are particularly well suited for sporting applications in which the movable object to be measured is a sporting device, such as a baseball, a hockey puck, a golf ball, a lacrosse ball, a bowling ball, a football, and arrow, a baseball bat, a golf club, or the like.

Exemplary System: Hockey Application—General Architecture

FIG. 1-A shows a diagram of an exemplary measurement system 10 for measuring the speed of a moving object in a hockey application. In this application, the embodiment of magnetized object 100 is a hockey puck, which will also be referred to as "magnetized puck 100." Magnetized object 100 will be described in further detail below.

In an exemplary embodiment, sensor array 200 comprises lay-flat surface 210, first magnetic field sensor 201, and second magnetic field sensor 202. First magnetic field sensor 201 and second magnetic field sensor 202 are secured to lay-flat surface 210 in parallel, and are separated with a known distance, $\Delta d$, between them. Sensor array 200 is placed proximate to the expected trajectory of magnetized puck 100, such that magnetized puck 100 will travel past first magnetic field sensor 201 before traveling past second magnetic field sensor 202, as shown in FIG. 1-A. Magnetic field sensors 201 and 202 are capable of producing output signals in response to changes in the proximate magnetic field created by magnetized puck 100 traveling proximate to sensor array 200. Since sensor array 200 is oriented such that magnetized puck 100 will travel past first magnetic field sensor 201 before traveling past second magnetic field sensor 202, first magnetic field sensor 201 will produce a first output signal A1 (shown in FIG. 8) at some time interval, $\Delta t$ before second magnetic field sensor 202 will produce a second output signal B1 (also shown in FIG. 8). Furthermore, since magnetic field sensors 201 and 202 are separated by a known distance, $\Delta d$, the time interval, $\Delta t$, between first output signal A1 and second output signal B1 is related to the speed of magnetized puck 100, since speed, v, equals $\Delta d/\Delta t$. Sensor array 200 and corresponding magnetic field sensors 201 and 202 are described in further detail below.

Figure 7:
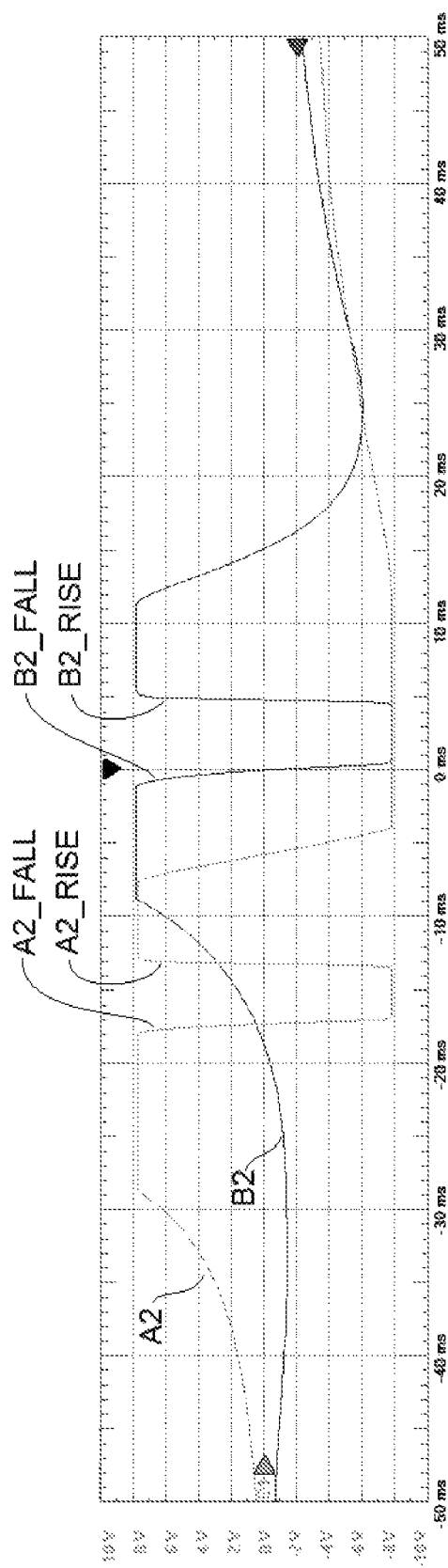
FIG. 7 presents output waveforms, A2 and B2, generated by the exemplary embodiment of gain circuit 320 in response to a shot from magnetized puck 100 in a hockey application.
Figure 8:
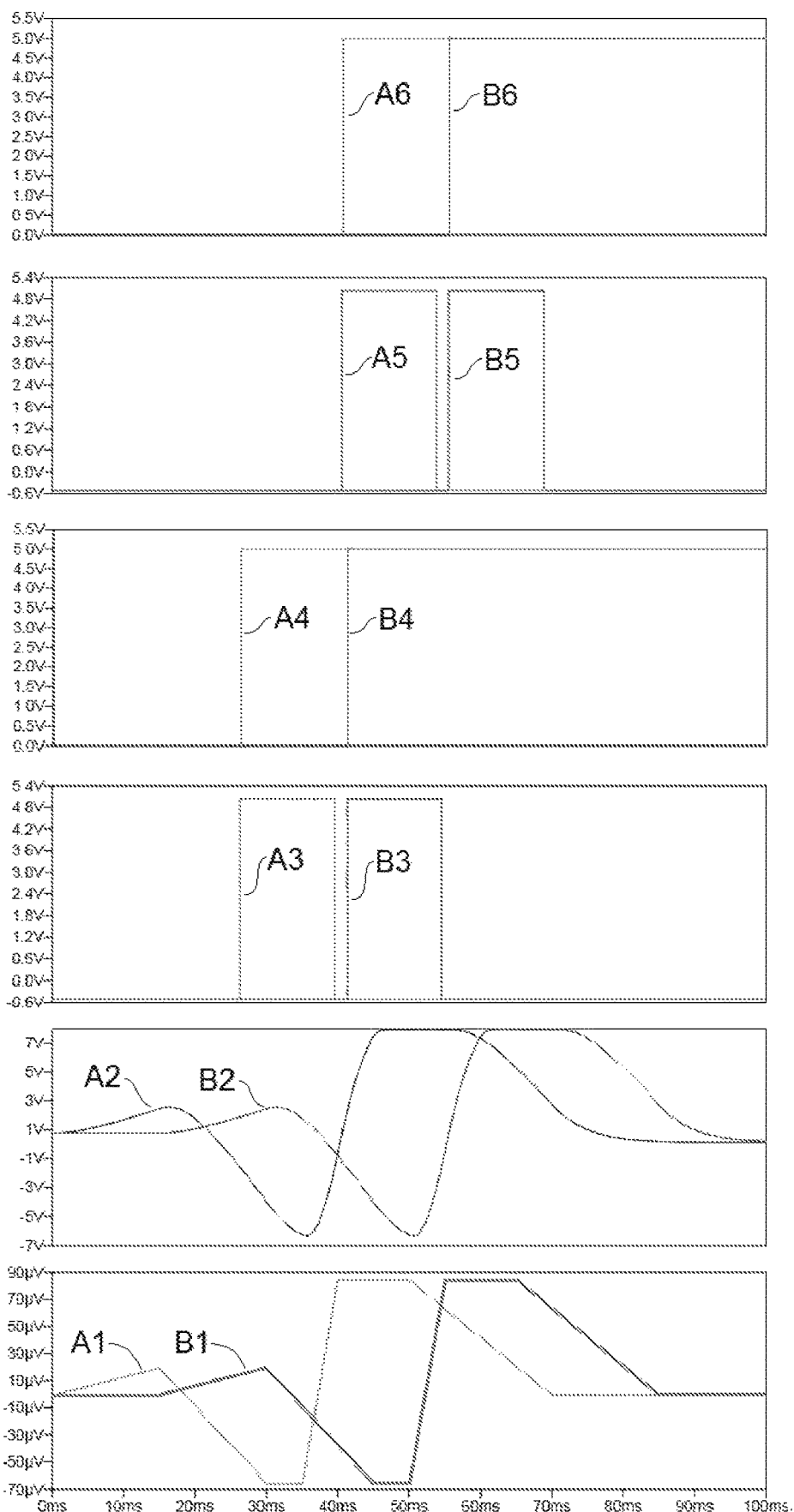
FIG. 8 presents simulated output waveforms generated by the simulation circuits of FIGS. 6-A through 6-C, for exemplary embodiments of gain circuit 320 and trigger circuit 330. Signals A1 and B1 represent the simulated outputs of magnetic field sensors 201 and 202, respectively. Signals A2 and B2 represent the corresponding outputs of gain circuit 320. Signals A3 and B3 represent the corresponding outputs of arm comparators 331, and signals A4 and B4 represent the corresponding outputs of arm flip-flops 333. And finally, Signals A5 and B5 represent the corresponding outputs of trigger comparators 332, and signals A6 and B6 represent the corresponding outputs of trigger flip-flops 334.

An exemplary embodiment of control module 300 comprises gain circuit 320, trigger circuit 330, and controller circuit 340, as shown in FIG. 1-A. First magnetic field sensor 201 and second magnetic field sensor 202 are in communication with gain circuit 320, which is configured to amplify first output signal A1 and second output signal B1 to produce gain output signals A2 and B2 (shown in FIGS. 7 and 8), respectively. This signal amplification aids in conditioning the sensor output signals, since first output signal A1 and second output signal B1 may be very low amplitude signals, as shown in FIG. 8. Trigger circuit 330 is in communication with gain circuit 320, and is configured to convert gain output signals A2 and B2 to rising-edge signals A6 and B6, respectively, as shown in FIG. 8. Controller circuit 340 is in communication with trigger circuit 330, and is configured to record the times at which rising edge-signals A6 and B6 occur. Utilizing trigger circuit 330 to convert analog signals A2 and B2 to rising-edge signals A6 and B6 allows for more precise time measurements to be made by controller circuit 340. Controller circuit 340 is further configured to calculate the time difference, $\Delta t$, between rising-edge signal A6 and rising-edge signal B6. Controller circuit 340 is still further configured to calculate the speed, v, of magnetized puck 100 by dividing the known distance between first magnetic field sensor 201 and second magnetic field sensor 202, $\Delta d$, by the calculated time difference between rising edge signal A6 and rising edge signal B6, $\Delta t$, such that: $v=\Delta d/\Delta t$. In this exemplary embodiment, controller circuit 340 is configured to write the calculated speed, v, of magnetized puck 100 to display 400. Control module 300 and display 400 are described in further detail below.

Exemplary System: Hockey Application—Magnetized Object 100

The exemplary system 10 is configured to measure movable objects that have an associated magnetic field 110, as show in FIG. 1-B. The letters "N" and "S" in the diagram represent the north and south poles of magnetic field 110, respectively. The poles of the magnetic field are the areas where the lines of magnetic flux are concentrated. By convention, the north pole of the magnetic field is the pole which is attracted to the magnetic north pole of the Earth. Conversely, the south pole of the magnetic field is the pole which is attracted to the south pole of the Earth. By typical convention, the lines of flux travel from the north pole of the magnetic field to the south pole of the magnetic field.

In the diagram of the exemplary embodiment of system 10 shown in FIG. 1-B, the north-south polar axis of magnetic field 110 is shown to be generally perpendicular to lay-flat surface 210 of sensor array 200. This orientation causes the magnetic flux that passes through magnetic field sensors 201 and 202 to change direction, or polarity, as magnetized object 100 having associated magnetic field 110 passes over sensor array 200, thereby increasing the change in the magnetic field to be detected by magnetic field sensors 201 and 202. Conversely, if the north-south polar axis of magnetic field 110 is oriented generally parallel to lay-flat surface 210 of sensor array 200, then the magnetic flux that passes through magnetic field sensors 201 and 202 will not change direction as magnetized object 100 having associated magnetic field 110 passes over sensor array 200, thereby decreasing the change in the magnetic field to be detected by magnetic field sensors 201 and 202. Sensor array 200 and corresponding magnetic field sensors 201 and 202 are further discussed below.

Magnetic field 110 may be applied to the movable object to be measured by embedding a magnetized unit 102 inside body 101 of magnetized object 100, as shown in FIG. 3-A. An exemplary embodiment of body 101 for hockey applications is a regulation hockey puck having an aperture in the center that is large enough to tightly fit magnetized unit 102. For this exemplary embodiment, magnetized unit 102 is a cylindrical bar magnet disposed within the aperture in the center of body 101 of magnetized puck 100. A cylindrical bar magnet was chosen for magnetized unit 102 in this exemplary embodiment due to its shape that resembles the cylindrical shape of hockey puck-shaped body 101. A cylindrical bar magnet disposed in the center of cylindrical body 101 allows magnetized puck 100 to best retain the look, feel, size, shape, center of mass, and flight dynamics of a regulation hockey puck. The cylindrical bar magnet used for magnetized unit 102 is oriented with its north-south polar axis perpendicular to the flat surfaces of body 101 in the exemplary embodiment of FIG. 3-A, such that the north-south polar axis of magnetic field 110 will be generally perpendicular to lay-flat surface 210 of sensor array 200 when in flight, as shown in FIG. 1-B.

Magnetized unit 102 may comprise any material or object that is capable of producing a magnetic field, including any permanent magnet utilizing ferromagnetic materials such as iron, nickel, cobalt, rare earth metals, or naturally occurring minerals, such as lodestone. Magnetized unit 102 may also comprise an electromagnet. In the exemplary embodiment of FIG. 3-A, a neodymium magnet is used. Neodymium magnets are also referred to as NdFeB magnets, or NIB magnets, because they are composed mainly of Neodymium, Iron, and Boron. A cylindrical bar-shaped Neodymium magnet, of grade N42, was chosen for this exemplary embodiment due to the high strength of the magnetic field it is capable of producing relative to its size, although as noted above, many other magnet choices would work well in this application.

It is important to note that body 101 of magnetized object 100 is not limited to being a regulation hockey puck, but rather can have any form appropriate for alternate embodiments or applications of system 10. For example, in a baseball application body 101 may be a regulation baseball, or may be manufactured to substantially have the look and feel of a regulation baseball. An alternate embodiment of magnetized object 100 in which body 101 is a regulation baseball is shown in FIG. 12-A. Note that magnetized unit 102 is spherically shaped in this alternate embodiment to retain the look, feel, size, shape, center of mass, and flight dynamics of a baseball. Other embodiments of magnetized object 100 are shown as being a baseball bat in FIG. 17, a golf ball in FIG. 21, and a golf club in FIG. 23. Also note that some magnetized objects 100 do not require magnetized unit 102 to be attached to, secured to, or embedded within body 100. An example of a magnetized object 100 that does not require magnetized unit 102 is the iron golf club shown in FIG. 24. The "N" and "S" designations on the golf club indicate that the ferromagnetic iron head of the golf club is capable of producing its own magnetic field without the aid of magnetized unit 102.

Exemplary System: Hockey Application—Sensor Array 200

In the exemplary embodiment of system 10, sensor array 200 comprises lay-flat surface 210, magnetic field sensor 201 and magnetic field sensor 202, as shown in FIG. 4-B. In the exemplary embodiment, lay-flat surface 210 is constructed from 40-mil, or 40 thousandths of an inch, thick polyvinyl chloride, or PVC. This material was chosen for its durability, its ability to be furled or rolled around cylindrical housing 350 (shown in FIG. 1-C and FIG. 2), its propensity to lay flat when unfurled, its weight (which allows it to remain stationary in use), its resistance to water, its relatively thin cross-section, and its relatively low cost. While PVC was the material chosen for the exemplary embodiment sensor array 200, numerous other materials that are capable of laying relatively flat would suffice in this application.

Magnetic field sensors 201 and 202 are secured to sensor array 200, and are oriented in parallel to each other, as shown in FIG. 4-B. In the exemplary embodiment, magnetic field sensors 201 and 202 are coils constructed of 30-guage copper wire, as shown in FIG. 4-A. The coils used in the exemplary embodiment are custom wound coils that lay flat against lay-flat surface 210, and are oblong in shape, having an inner diameter of 48 inches on the long side and an inner diameter of 0.125 inches on the short side. The coils in the exemplary embodiment have an air core, and 10 turns of wire. The coil used for magnetic field sensors 201 and 202 has two end terminals 221 and 222, shown in FIG. 4-A, that are in communication with the inputs of gain circuit 320.

The voltage, V, generated across coil end terminals 221 and 222 is proportional to the change in the magnetic flux through the coil, dϕ/Δt, multiplied by the number of turns of the coil, N. This relationship is described by Faraday's Law of induction, and may be written as:

$$V = N\frac{d\phi}{dt}$$

Applying Lenz's Law to describe the polarity of the voltage generated across coil end terminals 221 and 222, V, the relationship becomes:

$$V = -N\frac{d\phi}{dt}$$

The relationship of the generated voltage, V, to the change in flux through the coil, dϕ/Δt, shown above is of particular interest with respect to the exemplary embodiment shown in FIG. 1-B since it describes how the polarity of voltage, V, changes as the direction of the flux, ϕ, changes. Therefore, as magnetized object 100 passes over the coil causing the flux applied to the coil to change polarity, the voltage, V, generated across coil end terminals 221 and 222 will change polarity.

The flux through the coil, ϕ, may be described as the magnetic field, B, of the environment surrounding the coil multiplied by the area of the coil, A. Therefore, the voltage, V, may be expressed as:

$$V = -N\frac{d(BA)}{dt}$$

And since the area of the coil, A, is static in the exemplary application, the voltage, V, may be expressed as:

$$V = -NA\frac{dB}{dt}$$

Note that the equation above indicates that the voltage, V, increases as dB/dt, the rate of change in the magnetic field surrounding the coil, increases. That is to say that the faster the magnetic field, B, changes, the larger the voltage, V, generated across the coil will be. Therefore, the higher the speed at which magnetized object 100 passes over the coil, the larger the rate of change in magnetic field surrounding the coil will be, and the larger the voltage, V, will be. It should be noted that that a current, I, is also induced as magnetized object 100 passes over the coil.

The voltage, V, generated across coil end terminals 221 and 222 may also be expressed as a function of the change in the current induced in the coil, dI/dt, multiplied by the inductance, L, of the wire coil, such that:

$$V = -L\frac{dI}{dt}$$

The inductance, L, of the wire coil may be expressed in terms of the magnetic permeability of the material inside of the coil, μ, the number of turns of the coil, N, the area of the coil, A, and the length (or height) of the coil, l, as shown:

$$L = \frac{\mu N^2 A}{l}$$

Therefore, the voltage, V, generated across coil end terminals 221 and 222 may be increased by increasing the inductance of the coil, L. The inductance of the coil may be increased by increasing the number of turns of the coil, N, increasing the area of the coil, A, or by decreasing the height of the coil, l. Increasing the magnetic permeability of the material at the core of the coil, μ, may also greatly increase the inductance of the coil. For example, adding an iron core to the coil may increase the inductance by a factor of 5000 or more, since the relative permeability of reasonably pure iron may be greater than 5000, meaning that the permeability of iron can be over 5000 times greater than the permeability of free space.

It is important to note that while magnetic field sensors 201 and 202 are constructed of wire coils in the exemplary embodiment, many other types of sensors that are capable of outputting a signal in response to changes in the magnetic field acting on the sensor may be used. Examples of some other types of magnetic field sensors that may be configured to work in various embodiments of disclosed system 10 include, but are not limited to, various configurations of search-coil inductive sensors, magnetoinductive sensors, magneto-diode sensors, magneto-transistor sensors, fluxgate sensors, magneto-optical sensors, anisotropic magnetoresistive sensors, magnetic tunnel junction based sensors, electron tunneling based sensors, MEMS magnetic field sensors that may utilize various magnetic field sensing technologies, and Lorentz force based sensors, including magnetoresistors and Hall effect sensors. A simplified schematic of an alternate embodiment of disclosed system 10 that uses inductive wire coil sensors in a four terminal configuration for sensors 201 and 202 is shown in FIG. 5-B. A simplified schematic of yet another alternate embodiment of system 10 that uses Hall effect sensors for sensors 201 and 202 is shown in FIG. 5-C. The two alternate sensor options shown in FIG. 5-B and FIG. 5-C are not intended to be limiting. Any sensor that is able to sense magnetic flux changes acting on the sensor as a result of magnetized object 100 passing through the proximity of the sensor and is able provide a corresponding output signal may be used for sensors 201 and 202.

Exemplary System: Hockey Application—Control Module 300

In the exemplary embodiment of system 10, control module 300 comprises gain circuit 320, trigger circuit 330, and controller circuit 340, as shown in FIG. 1-A. Gain circuit 320 amplifies the signals generated by magnetic field sensors 201 and 202 as magnetized object 100 passes over sensor array 200. The amplified signals output by gain circuit 320 are converted to rising-edge signals by trigger circuit 330, in order to precisely signal the occurrence of an event of interest. Controller circuit 340 detects the rising-edge signals output by trigger circuit 330, records the time at which the rising-edge events are detected, performs calculations to determine the speed, spin rate, accuracy, or other motion properties of magnetized object 100, resets trigger circuit 330, and writes the calculated results to display 400.

A simplified schematic of an exemplary embodiment of control module 300 is shown in FIG. 5-A. This simplified schematic shows an exemplary signal chain starting with magnetic field sensors 201 and 202, continuing through the filtering and amplification stage of gain circuit 320, continuing through the analog-to-digital rising-edge conversion of trigger circuit 330, continuing through the calculation stage of controller circuit 340, and ending with display 400. The signal path starting with magnetic field sensor 202 has the same architecture as the signal path starting with magnetic field sensor 201; therefore, the detailed description to follow will primarily focus on the signal path starting with magnetic field sensor 201, but is also applicable to the signal path starting with magnetic field sensor 202.

FIGS. 6-A, 6-B, and 6-C collectively show a more detailed hierarchal schematic developed to simulate the exemplary embodiment of gain circuit 320 and trigger circuit 330, and will be referred to where appropriate for more detailed discussion of those circuits. FIG. 6-A is a top-level view, or "bench setup," of the hierarchal schematic that shows inputs and outputs of the circuit to be simulated, X1. Voltage sources V1 and V2 provide power supply voltages VCC and VEE, respectively. Voltage source V3 provides Mecca, a voltage reference set to GND. Voltage sources V4 and V7 simulate the voltage signals generated by magnetic field sensors 201 and 202, respectively. Voltage source V5 provides an enable voltage for 5V reference circuit U2 (shown in FIG. 6-B), and voltage source V6 simulates reset voltage signals, rst, sent to trigger circuit 330 from microcontroller 341 of controller circuit 340. The purpose of reset voltage signals, rst, is to initialize trigger circuit 330 for the simulation. Voltage nodes D2 and D3 represent the outputs of trigger circuit 330 that are in communication with microcontroller 341 of controller circuit 340.

FIG. 6-B shows a schematic of the circuitry inside of the circuit to be simulated, shown as X1 of FIG. 6-A. The schematic of FIG. 6-B shows the exemplary embodiment of gain circuit 320 and trigger circuit 330. Gain circuit 320 is shown in FIG. 6-B as X1 and X2, the details of which are shown in the hierarchal circuit block shown in FIG. 6-C.

FIG. 6-D shows a schematic of a proposed PCB board for the exemplary embodiment of gain circuit 320 and trigger circuit 330, and will also be referred to where appropriate. This schematic is instructive in that it is a practical representation of how to construct and wire the exemplary embodiment of gain circuit 320 and trigger circuit 330.

Gain Circuit 320

Referring to the simplified schematic FIG. 5-A, the exemplary gain circuit 320 of system 10 comprises instrumentation amplifier 321 and operational amplifier 322. Instrumentation amplifier 321 is configured to have a gain of approximately 3,300 V/V, and operational amplifier 322 is configured to have a non-inverting gain of approximately 39 V/V, making the total system gain of gain circuit 320 approximately 130,000 V/V.

Instrumentation amplifier 321 is configured to measure the differential voltage generated across the inductive coil of magnetic field sensor 201. In the exemplary embodiment, instrumentation amplifier 321 has a three-amplifier architecture comprising a two-amplifier input gain stage that drives a differential amplifier output stage. This architecture allows for high-gain differential measurements while rejecting any common mode voltage on the input terminals. An AD8222 was chosen for instrumentation amplifier 321 in the exemplary embodiment due to its low noise, low offset voltage, low input offset current, and excellent common mode rejection. An amplifier having low input offset current was chosen in this exemplary embodiment because the input offset current of instrumentation amplifier 321 will be multiplied by any resistance between the input terminals of the instrumentation amplifier (including the resistance of input filter resistors R2 and R3 shown in FIG. 6-C, and the resistance of magnetic field sensors 201 and 202), resulting in an offset voltage at the instrumentation amplifier's input that will be amplified. The AD8222 was also chosen for its dual instrumentation amplifier configuration, which allows for measuring the voltages across both magnetic field sensors 201 and 202 with a single integrated circuit package.

The gain of instrumentation amplifier 321 is set to approximately 3,300 V/V by 15Ω, resistor Rg, as shown in FIG. 6-C (resistor Rg is also shown as RG1 and RG2 in the board schematic of FIG. 6-D). Also shown in greater detail in FIG. 6-C are the input filter components R2, R3, C1, C2, and C3. This filter at the input of instrumentation amplifier 321 (shown as component U1 in the schematic of FIG. 6-C)

reduces unwanted noise across magnetic field sensor 201 that would otherwise be amplified. Still referring to FIG. 6-C, the high-pass filter comprising C4 and R4 filters out the DC offset voltage at the output of instrumentation amplifier 321.

Referring back to the simplified schematic of an exemplary embodiment of system 10 shown in FIG. 5-A, the filtered output of instrumentation amplifier 321 is gained up by operational amplifier 322 (also shown as component U3 in FIG. 6-C). The non-inverting gain of operational amplifier 322 is set to approximately 39 V/V by resistors R5 and R6, as shown in FIG. 6-C. An AD822 dual FET input operational amplifier was chosen for operational amplifier 322 due to its very low input bias current, low noise, and low offset voltage. The amplifier chosen for operational amplifier 322 has low input bias current in this exemplary circuit, since the amplifier's input bias current flows across 2 MΩ resistor R4, creating a DC voltage to be amplified by operational amplifier 322. Additional low-pass filtering is performed by resistor R7 and capacitors C5 and C6, shown in FIG. 6-C, before output node AOUT, which is tied to the inputs of trigger circuit 330.

FIG. 8 shows signals of interest that were generated by simulating the exemplary circuit shown in FIGS. 6-A, 6-B, and 6-C. Signals A1 and B1 are simulated input voltages generated by magnetic field sensors 201 and 202, respectively. Simulated signals A1 and B1 are amplified by gain circuit 320 to produce signals A2 and B2, respectively, at gain circuit output nodes AOUT (shown in FIGS. 6-B and 6-C). Actual oscilloscope plots of signals A2 and B2 are shown in FIG. 7.

It is important to note that the exemplary embodiment of gain circuit 320 is not restricted to the circuit architecture and component choices described herein and illustrated in the figures. There are multiple combinations of circuit architectures and component choices that would adequately perform the function of amplifying the signals generated by sensors 201 and 202. Regardless of any specific circuit architecture or component choices, gain circuit 320 should be capable of amplifying the signals generated by magnetic field sensors 201 and 202 as appropriate based on the choice of magnetic field sensors used, or other aspects of alternate embodiments of the system. It should be noted that alternate embodiments of control module 300 and system 10 may not utilize gain circuit 320 at all, according to the combination of circuit architecture and components chosen for magnetic field sensors and controller circuit 340.

Trigger Circuit 330

The function of the exemplary trigger circuit 330 of system 10, as shown in FIG. 5-A, is to convert the analog output signals of gain circuit 320 into digital rising-edge signals that are easily read by microcontroller 341 of controller circuit 340. This is function is performed in the exemplary embodiment because one of the motion properties being calculated in this embodiment is the speed of magnetized puck 100; the calculation of which includes recording the timing of events detected by magnetic field sensors 201 and 202 as magnetized puck 100 passes by sensor array 200. The fast rise-time from a logic-low state to a logic-high state of a rising-edge signal allows for the time of occurrence of an event to be more clearly determined by controller circuit 340.

The events to be marked by rising-edge signals in this embodiment of trigger circuit 330 are magnetized puck 100 passing over magnetic field sensors 201 and 202, causing the flux through the sensors to change direction. The change in direction of flux through the sensors causes the voltage generated by the coils of sensors 201 and 202 to change polarity. The change in polarity of the voltage generated by sensors 201 and 202 as magnetized puck 100 passes over the sensors is shown in FIG. 7. Gain circuit 320 output signals A2 and B2 both exhibit a sharp falling-edge, denoted as A2-FALL and B2-FALL respectively, followed by a sharp rising-edge, denoted as A2-RISE and B2-RISE respectively. These falling-edge and rising-edge signatures of signals A2 and B2 are detected by the exemplary embodiment of trigger circuit 330 to create rising-edge signals, shown in plots A6 and B6 of FIG. 8, that indicate the instance of magnetized puck 100 passing over magnetic field sensors 201 and 202.

Referring to the simplified schematic FIG. 5-A, the exemplary embodiment of trigger circuit 330 comprises comparator circuits 331 and 332, and flip-flop circuits 333 and 334. In the exemplary embodiment, trigger circuit 330 is configured to first detect falling-edges of signals A2 and B2, shown as A2-FALL and B2-FALL in FIG. 7, and then to generate rising-edge digital signals, A6 and B6, upon detecting a rising-edge of signals A2 and B2, shown as A2-RISE and B2-RISE. The purpose of this configuration is to signal the detection of the change in flux direction that indicates that magnetized puck 100 is passing over the magnetic field sensors. The distinct falling-edge followed by rising-edge signal profile created as magnetized puck 100 passes over a magnetic field sensor is indicative of where magnetized puck 100 is located relative to the magnetic field sensor at a particular point in time. By creating a rising-edge output signal upon detecting a falling-edge followed by a rising-edge profile of the signal generated by the magnetic field sensor, trigger circuit 330 is signaling to controller circuit 340 the instance in time that the flux through the magnetic field sensor changed direction, and therefore is also signaling the instance in time that magnetized puck 100 is substantially located over the magnetic field sensor.

Voltage V_arm, shown as 335 in FIG. 5-A, is set to −2V in the exemplary embodiment and is applied to the non-inverting input of arm comparator 331. Voltage V_arm is set by the voltage reference circuit comprising Q1, R5, R3, and R4, which is configured as shown in FIG. 6-B. The inverting input of arm comparator 331 is connected to the output of gain circuit 320, as shown in FIG. 5-A. In this configuration, the output of arm comparator 331 will be driven to 0V, or logic-low, when the output of gain circuit 320 is greater than −2V. Conversely, the output of arm comparator 331 will be driven to 5V, or logic-high, when the output of gain circuit 320 is less than −2V. Therefore, when magnetic puck 100 passes over magnetic field sensors 201 and 202, causing falling-edges A2-FALL and B2-FALL on gain circuit 320 output signals A2 and B2, the outputs of arm comparators 331 will be driven to 5V, or logic-high. Arm comparator 331 output signals A3 and B3 are shown in the simulation plots of FIG. 8. Note that arm comparator 331 output signals A3 and B3 are forced high when gain circuit 320 output signals A2 and B2 are less than −2V, respectively.

The output of arm comparator 331 is connected to the CLK-input of arm flip-flop circuit 333, as shown in FIG. 5-A. The D-input of arm flip-flop circuit 333 is driven to 5V, or logic-high (shown as Logic_Hi in FIG. 5-A), by reference circuit U2, shown in FIG. 6-B. Therefore, the Q-output of arm flip-flop circuit 333 will be driven high when the output of arm comparator 331 is driven high. Once driven high, the Q-output of arm flip-flop circuit 333 will stay high until a logic-low signal is sent to Reset pin 337 by microcontroller 341. Arm flip-flop circuit 333 Q-output signals A4 and B4 are shown in the simulation plots of FIG. 8. The Q-output of arm flip-flop circuit 333 is connected to the D-input of trigger flip-flop circuit 334, as shown in FIG. 5-A. Therefore, when the Q-output of arm flip-flop circuit 333 is driven high, trigger flip-flop circuit 334 could be considered to be enabled, or "armed," and waiting for the output of trigger comparator 332 to be driven high.

Voltage V_trigger, shown as 336 in FIG. 5-A, is set to 1V in the exemplary embodiment, and is applied to the inverting input of trigger comparator 332. Voltage V_trigger is set by the voltage reference circuit comprising U1, R6, and R7, which is configured as shown in FIG. 6-B. The non-inverting input of trigger comparator 332 is connected to the output of gain circuit 320, as shown in FIG. 5-A. In this configuration, the output of trigger comparator 332 will be driven to 0V, or logic-low, when the output of gain circuit 320 is less than 1V. Conversely, the output of trigger comparator 332 will be driven to 5V, or logic-high, when the output of gain circuit 320 is greater than 1V. Therefore, when magnetic puck 100 passes over magnetic field sensors 201 and 202, causing rising-edges on gain circuit output signals A2 and B2, the outputs of trigger comparators 332 will be driven to 5V, or logic-high. Trigger comparator 332 output signals A5 and B5 are shown in the simulation plots of FIG. 8. Note that comparator output signals A5 and B5 are forced high when gain circuit output signals A2 and B2 are greater than 1V, respectively.

The output of trigger comparator 332 is connected to the CLK-input of trigger flip-flop circuit 334, as shown in FIG. 5-A. The D-input of trigger flip-flop circuit 334 is driven by the Q-output of arm flip-flop circuit 333, as shown in FIG. 6-B. Therefore, the Q-output of trigger flip-flop circuit 334 will be driven high when the output of arm comparator 332 is driven high and when the Q-output of arm flip-flop circuit 333 is also driven high. Once driven high, the Q-output of trigger flip-flop circuit 334 will stay high until a logic-low signal is sent to Reset pin 337 by microcontroller 341. The Q-output of trigger flip-flop circuit 334 is connected to an input port 343 of microcontroller 341 of controller circuit 340.

Trigger flip-flop circuit 334 Q-output signals A6 and B6 are shown in the simulation plots of FIG. 8. Note that output signal A6 does not go high until both arm comparator output signal A3 and trigger comparator output signal A5 have gone high. Similarly, note that output signal B6 does not go high until both arm comparator output signal B3 and trigger comparator output signal B5 have gone high. This ensures that trigger flip-flop circuit 334 Q-output signals A6 and B6 are forced high when the flux through magnetic field sensors 201 and 202 changes direction as a result of magnetic puck 100 passing over the sensors, indicating the instance in time that magnetic puck 100 is substantially located over magnetic field sensors 201 and 202.

The comparator circuit chosen for arm comparator 331 and trigger comparator 332 in this embodiment is the LM339. The flip-flop circuit chosen for arm flip-flop circuit 333 and trigger flip-flop circuit 334 is the 74HC74. However, it should be noted that component choices for this circuit are not limited to those selected.

The circuit architecture of trigger circuit 330 is presented above to describe an exemplary embodiment of system 10; other trigger circuit architectures may be devised as appropriate for other system embodiments or applications, including very simplified architectures comprising a single comparator or flip-flop circuit. It is important to note that alternate embodiments of control module 300 of system 10 may not utilize or include trigger circuit 330, depending on the circuit architecture and components chosen for magnetic field sensors 201 and 202, gain circuit 320, and controller circuit 340. Some alternate and simplified embodiments of control module 300 are discussed in a later section, and are shown in FIGS. 30-A through 30-D.

Controller Circuit 340

Functions performed by controller circuit 340 in the exemplary embodiment of system 10 include reading the output signals generated by trigger circuit 330, calculating the speed (or other motion properties) of moving object 100 based on the timing of those signals and the known distance between magnetic field sensors 201 and 202, writing the calculated results to display 400, and sending reset signals to flip-flop circuits 333 and 334 of trigger circuit 330.

In the exemplary embodiment of system 10 shown in FIG. 5-A, controller circuit 340 comprises microcontroller 341 and timer 342. In the exemplary embodiment, timer 342 is integrated into microcontroller 341, but this integration into microcontroller 341 is not necessary for operation as long as timer 342 is in communication with microcontroller 341. Referring to FIG. 5-A, the exemplary embodiment of microcontroller 341 comprises input and output port circuitry 343, processor unit 344, and memory 345. The microcontroller circuit chosen for microcontroller 341 in the exemplary embodiment is the ATmega328, although many other microcontrollers, microprocessors, computers, or other processing circuits can be used.

Figure 9:
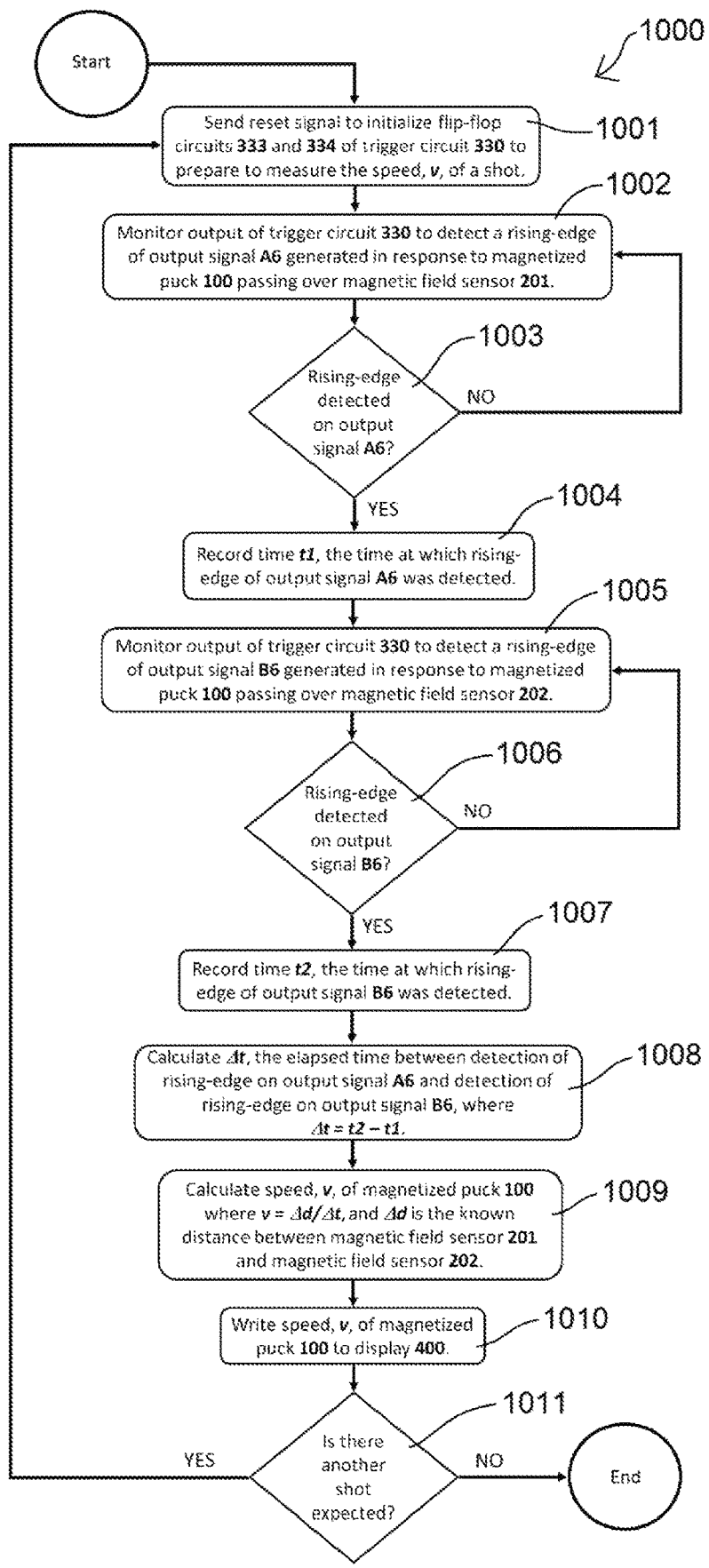
FIG. 9 shows a flow diagram for an exemplary method 1000 for calculating the speed of magnetized movable object 100, as executed by control circuit 340 in the exemplary embodiment of system 10.

In the exemplary embodiment, controller circuit 340 is configured to execute method for measuring speed 1000, as shown in the flow diagram of FIG. 9. That is to say that controller circuit 340 is configured to:
1) send a reset signal to initialize flip-flop circuits 333 and 334 of trigger circuit 330 to prepare the system to measure the speed of a shot, as described in step 1001;
2) detect a rising-edge of output signal A6, generated by trigger circuit 330 in response to magnetized puck 100 passing over magnetic field sensor 201, as described in step 1002 and inquiry 1003;
3) record the time, t1, at which rising-edge of output signal A6 was detected, as described in step 1004;
4) detect a rising-edge of output signal B6, generated by trigger circuit 330 in response to magnetized puck 100 passing over magnetic field sensor 202, as described in step 1005 and inquiry 1006;
5) record the time, t2, at which rising-edge of output signal B6 was detected, as described in step 1007;
6) calculate $\Delta t$, the time elapsed between t1 (the time at which magnetized puck 100 passed over magnetic field sensor 20) and t2 (the time at which magnetized puck 100 passed over magnetic field sensor 201), where:

$\Delta t = t2 - t1$ as described in step 1008;
7) calculate v, the speed of magnetized puck 100, by dividing $\Delta d$, the known distance between magnetic field sensor 201 and magnetic field sensor 202, by $\Delta t$, such that:

$$v = \frac{\Delta d}{\Delta t}$$

as described in step 1009;
8) write the calculated speed, v, to display 400 for viewing by the user, as described in step 1010; and, 9) repeat sequence from step 1 above, if another shot is expected, as described in step 1011.

In the exemplary embodiment of controller circuit 340 of system 10, the term "monitor" in steps 1002 and 1005 of method 1000, shown in in FIG. 9, refers to awaiting an asynchronous interrupt instigated by a trigger event. Trigger events in this embodiment include: the detection of a rising-edge of output signal A6, generated by trigger circuit 330 in response to magnetized puck 100 passing over magnetic field sensor 201; and, the detection of a rising-edge of output signal B6, generated by trigger circuit 330 in response to magnetized puck 100 passing over magnetic field sensor 202. In alternate embodiments of controller circuit 340, the term "monitoring" may refer to, but is not limited to, synchronously polling, or actively sampling, the status of the outputs of trigger circuit 330 to detect rising-edge events on signals A6 and B6.

In the exemplary embodiment of system 10, controller circuit 340 further comprises wireless communication circuit 346, which is in communication with microcontroller 341, as shown in FIG. 5-A. Wireless communication circuit 346 may be used to output data, such as calculated speed or other motion properties, to a computer, a remote display device, or a mobile device, such as a smart phone. Wireless communication circuit 346 may also be used to receive data or commands to microcontroller 341. In the exemplary embodiment, a nRF51822 circuit is used for wireless communication circuit 346, however many other wireless communication circuits such as, but not limited to, nRF8001, HC-05, and HC-06 may be used.

Exemplary System: Hockey Application—Display 400

In the exemplary embodiment of system 10, display 400 is in communication with microcontroller 341 of controller circuit 340, as shown in FIG. 5-A. The purpose of display 400 is to communicate calculated values of various motion properties of magnetized object 100 to the user. A four-digit seven-segment LED display was chosen for display 400 in the exemplary embodiment. While an LED display is used in the exemplary embodiment, many other means of communication to the user may be used, including but not limited to various types of visual display monitors and projectors, or purely audio output devices, such as audio speakers. Display 400 may even be a device such as a mobile device or a computer that is connected wirelessly to controller circuit 340 via wireless communication circuit 346.

Exemplary System: Hockey Application—Housing

In the exemplary embodiment of system 10, control module 300 and supporting hardware, such as power supply circuitry and power sources, are contained within housing 350, as shown in FIG. 2. The exemplary embodiment of housing 350 is generally cylindrical in shape, and is constructed of polyvinyl chloride, or PVC. This material was chosen for its strength, its durability, its light weigh, its resistance to water, and its relatively low cost. Housing 350 was constructed of strong and durable material in this embodiment for a hockey application to withstand any accidental strikes from magnetized puck 100 or a swinging hockey stick. Another reason that PVC was chosen for a construction material in the exemplary embodiment of system 10 is that the material will not shield wireless signals emitted from or transmitted to wireless communication circuit 346.

The generally cylindrical shape of housing 350 was chosen for the exemplary embodiment of system 10 for a hockey application for many reasons. A first reason is that the generally cylindrical shape increases the ability of housing 350 to withstand an impact from magnetized puck 100, since the rounded edges of the cylinder may deflect the force of an impact, or otherwise act to distribute the force of the strike throughout the entire housing. Another reason that a generally cylindrical shaped housing was chosen for the exemplary embodiment is that housing 350 may act as a structure around which lay-flat surface 210 of sensor array 200 may be furled for transport or storage of system 10. Still another reason that the generally cylindrical shape of housing 350 was chosen for the exemplary embodiment of system 10 for a hockey application is that magnetized pucks 100 may be stored within the housing during transport or storage of system 10. In the exemplary embodiment of housing 350, the inner diameter of the cylinder forming the housing is slightly greater than 3-inches, which allows for the snug storage of standard regulation-sized hockey pucks having a cylindrical shape and a 3-inch diameter.

Housing 350 also serves as a platform upon which to mount display 400 in the exemplary embodiment of system 10, as shown in FIG. 2. Although FIG. 2 shows display 400 mounted on the end of housing 350, display 400 may be mounted on other areas of the housing, or indeed not mounted on the housing at all, as appropriate for other applications and embodiments of system 10.

While a generally cylindrical shaped housing constructed of PVC was chosen for housing 350 in the exemplary embodiment of system 10 for a hockey application, many other housing designs and construction materials will work well for this and other applications and embodiments of system 10. Housing 350 provides a protective vessel in which to contain control module 300 and supporting hardware; therefore, a wide variety of design and construction materials may be utilized for housing 350, as is appropriate for various embodiments and applications of system 10.

Exemplary Method: Hockey Application—Speed Measurement

Figure 10:
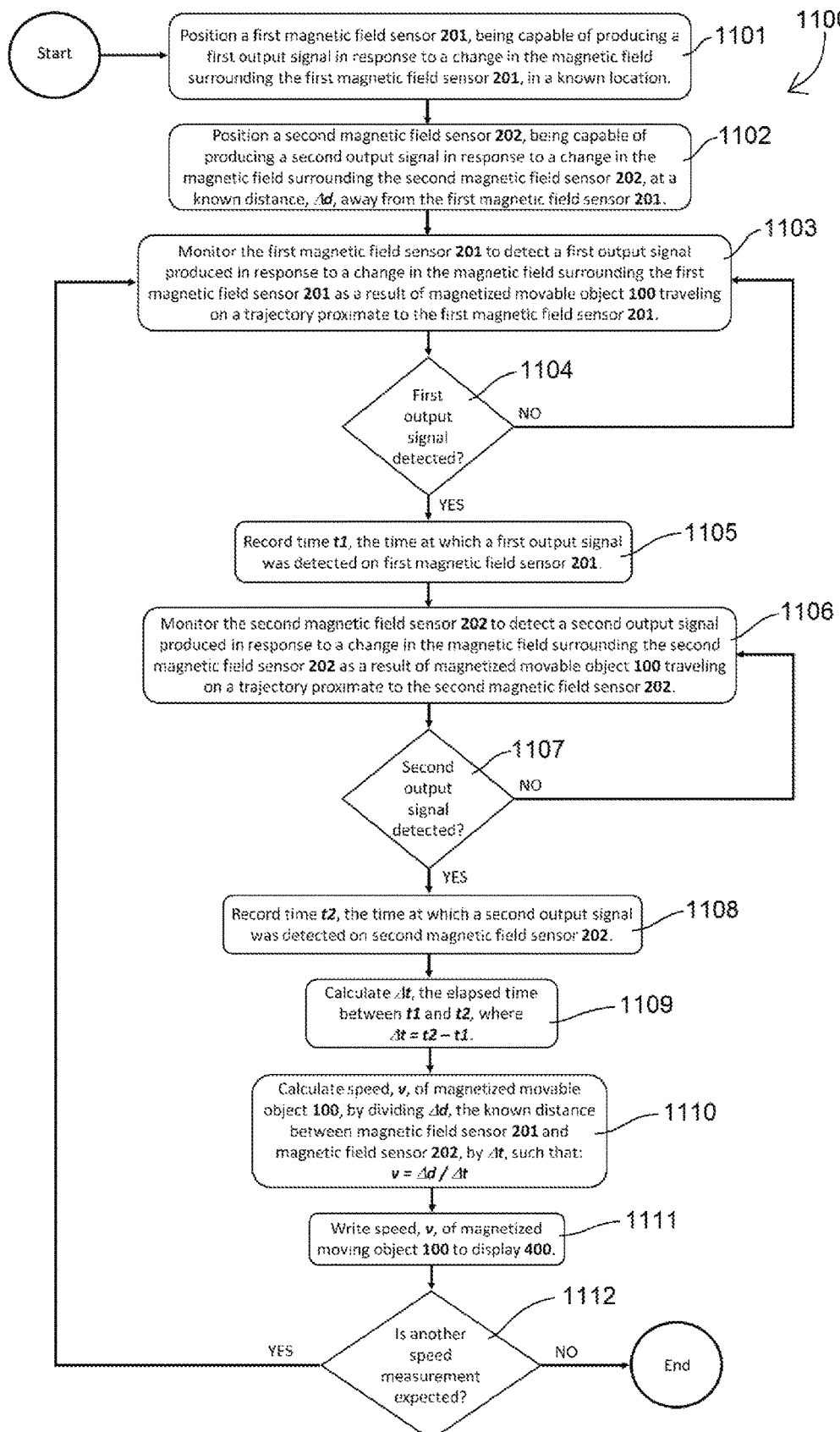
FIG. 10 shows a flow diagram for an exemplary method 1100 for calculating the speed of magnetized movable object 100.

An exemplary method 1100 for measuring the speed of a magnetized movable object 100 is shown in the flow diagram of FIG. 10. The magnetized movable object 100 to be measured by exemplary method 1100 may be, but is not limited to, the embodiment of magnetized hockey puck 100 described above and shown in FIG. 3-A. Exemplary method 1100 may be executed by the exemplary embodiment of system 10 to measure the speed of magnetized puck 100, as shown in FIG. 1-A and described in the detailed description sections above. It is important to note, however, that other systems may be devised or constructed to execute exemplary method 1100 for measuring the speed of a magnetized movable object 100, and that execution of exemplary method 1100 is neither dependent upon, nor limited to implementation by, the exemplary embodiment of system 10, as it is shown in FIG. 1-A and described above.

Exemplary method 1100 for measuring the speed of a magnetized movable object 100 comprises the steps of:
1) Positioning a first magnetic field sensor 201, being capable of producing a first output signal in response to a change in the magnetic field surrounding the first magnetic field sensor 201, in a known location, as described in step 1101;
2) Positioning a second magnetic field sensor 202, being capable of producing a second output signal in response to a change in the magnetic field surrounding the second magnetic field sensor 202, at a known distance, Δd, away from the first magnetic field sensor 201, as described in step 1102;

3) Monitoring the first magnetic field sensor 201, and detecting a first output signal produced in response to a change in the magnetic field surrounding the first magnetic field sensor 201 as a result of magnetized movable object 100 traveling on a trajectory proximate to the first magnetic field sensor 201, as described in step 1103 and step 1104;

4) Recording time t1, the time at which the first output signal was detected, as described in step 1105;

5) Monitoring the second magnetic field sensor 202, and detecting a second output signal produced in response to a change in the magnetic field surrounding the second magnetic field sensor 202 as a result of magnetized movable object 100 traveling on a trajectory proximate to the second magnetic field sensor 202, as described in step 1106 and step 1107;

6) Recording time t2, the time at which a second output signal was detected, as described in step 1108;

7) Calculating Δt, the elapsed time between t1 (the time at which the first output signal was detected from magnetic field sensor 201) and t2 (the time at which the second output signal was detected from magnetic field sensor 202), where:

$$\Delta t = t2 - t1$$

as described in step 1109;

8) Calculating v, the speed of magnetized movable object 100, by dividing Δd, the known distance between magnetic field sensor 201 and magnetic field sensor 202, by Δt, such that:

$$v = \frac{\Delta d}{\Delta t}$$

as described in step 1110;

9) Writing the calculated speed, v, to a display device 400 for viewing by the user, as described in step 1111; and, 10) Repeating sequence from step 3 above, if another moving object to measure is expected, as described in step 1112.

Exemplary System and Method: Hockey Application—Accuracy Measurement

The accuracy of magnetized movable object 100, or magnetized puck 100 in this exemplary embodiment and application, moving about a trajectory may be determined by system 10, as shown in FIG. 1-B. In this exemplary embodiment, system 10 is configured to determine the accuracy of magnetized puck 100 relative to a target. In this embodiment, magnetic field sensor 201 is positioned at a known location relative to the target of interest. Magnetic field sensor 201 is positioned is in the proximity of the target, such that the target is within the measurement range of magnetic field sensor 201. It should be noted that control module 300 is configured as shown in FIG. 5-A in this exemplary embodiment. If the trajectory of moving magnetized puck 100 is proximate to, or accurate with respect to, the target, then moving magnetized puck 100 will pass within the range of magnetic field sensor 201, thereby creating a polarity change in the magnetic flux through magnetic field sensor 201, resulting in a voltage signal being generated by the sensor. The more accurate the shot is, the closer to magnetic field sensor 201 (and to the target) magnetized puck 100 will pass, creating a larger change in the magnetic field proximate to sensor 201, resulting in a larger voltage signal output by the sensor. If the voltage signal generated by magnetic field sensor 201 for a given shot is sufficiently large, trigger circuit 330 will generate a rising-edge on output signal A6, signaling to controller circuit 340 that the shot of magnetized puck 100 was sufficiently accurate relative to the target. Controller circuit 340 will then write to display 400 to signify to the user that the shot was accurate.

It should be noted that alternate embodiments of system 10 may utilize multiple magnetic field sensors arranged into arrays having sensors positioned at known locations relative to each other and relative to a target of interest. In such embodiments, the signals generated on each sensor may be analyzed as magnetized puck 100 passes by to develop a more precise understanding of the location of magnetized puck 100 in three-dimensional space, and to more precisely determine the accuracy of a shot relative to a target. In these embodiments, the relative amplitudes of the signals generated by each sensor in the array may be compared to determine proximity to a target. An example of an alternate embodiment having an array of multiple sensors as described, is shown in FIG. 26-D.

Still other embodiments of system 10 may be configured to measure the speed of magnetized object 100, and to use the measured speed to further improve the accuracy measurement by combining speed with the measured amplitudes of the magnetic field sensor outputs. The amplitude of the signal generated by the embodiment of magnetic field sensors 201 and 202 comprising the wire coil shown in FIG. 4-A is related to the rate of change of the magnetic field surrounding the wire coil, both the speed of magnetized object 100 and its proximity to the magnetic field sensors determine the amplitude of the signal generated by magnetic field sensors 201 and 202. As such, alternate embodiments of system 10 may utilize the measured speed of magnetized object 100 to better determine the accuracy of its trajectory relative to a target, based upon the measured amplitude of the output signals generated by magnetic field sensors 201 and 201.

Alternate Embodiment: Baseball Application

Alternate embodiments of measurement system 10 and magnetized movable object 100 for use in a baseball application are shown in FIG. 11-A and FIG. 12-A, respectively. Magnetized movable object 100 may also be henceforth referred to as "magnetized baseball 100."

Alternate Embodiment: Baseball Application—Magnetized Baseball 100

In an exemplary embodiment for a baseball application, the embodiment of body 101 of magnetized baseball 100 is a regulation baseball, containing an embedded spherical magnetized unit 102 snugly disposed within a cavity located substantially at the center of the ball, as shown in FIG. 12-A. The spherical shape and centered position of magnetized unit 102 in this embodiment of magnetized baseball 100 maintains the look, feel, size, shape, center of mass, and flight dynamics of a regulation baseball.

Alternate Embodiment: Baseball Application—Polar-Axis of Magnetized Unit 102

The axis of rotation of magnetized baseball 100 relative to magnetic field sensors 201 and 201 of system 10 is not always the same when thrown. For example, magnetized baseball 100 may rotate about a given axis, the X-axis, during one throw, then may rotate about another axis, the Y-axis, during the next throw. This may be due to the pitcher's grip relative to the seams of the baseball prior to release of a given throw, or due to other factors that are material to determining the axis of rotation of magnetized baseball 100 during flight. If magnetized baseball 100 is rotating such that the north-south polar-axis of magnetized unit 102 remains generally parallel to magnetic field sensors 201 and 202 during flight, then magnetic field sensors 201 and 202 may not experience a change in sign, or polarity, of magnetic flux as magnetized baseball 100 passes by them. If magnetic field sensors 201 and 202 do not experience a change in polarity of the magnetic flux through them as magnetized baseball 100 passes by, then system 10 will not detect the distinct falling-edge rising-edge signature [that is otherwise created when the north-south polar-axis of magnetized unit 102 is oriented generally perpendicular to the sensors, as discussed in the exemplary embodiment for the hockey application above].

In a hockey application, by contrast, there is not as much uncertainty regarding the axis of rotation of magnetized puck 100 in flight, given the flight dynamics of a typically shot cylindrical puck. Magnetized unit 102 may be oriented within body 101 of magnetized puck 100 in the exemplary embodiment for a hockey application described above, such that the north-south polar-axis of magnetic unit 102 is likely to be generally perpendicular to magnetic field sensors 201 and 202 during flight, as disclosed in the detailed description above and shown in FIGS. 1-B and 3-A.

Alternate embodiments of magnetized baseball 100 and system 10 are presented to address the uncertainty of the axis of rotation of magnetized baseball 100 when thrown. The first alternate embodiment of magnetized baseball 100, shown in FIGS. 12-B and 12-C, may lessen the uncertainty regarding the orientation of the polar-axis of magnetized unit 102 relative to magnetic field sensors 201 and 202. In the embodiment shown in FIG. 12-B, magnetized unit 102 is oriented with its north-south polar-axis perpendicular to the seams and stitching of the baseball body 101. Printed arrows 105 are printed or painted on the outer surface of baseball body 101 to indicate the orientation of the polar-axis of magnetized unit 102 within baseball body 101 to the pitcher. Conversely, in the embodiment shown in FIG. 12-C, magnetized unit 102 is oriented with its north-south polar-axis parallel to the seams and stitching of the baseball body 101, as is indicated to the pitcher by printed arrows 105 pointing parallel to the seams. Other embodiments may continue this theme by having the north-south polar-axis of magnetized unit 102 oriented at other various angles relative to the direction of the seams and stitching, and by having printed arrows 105 indicating the direction of the polar axis to the pitcher. Indicating the orientation of the polar-axis of magnetized unit 102 within magnetized baseball 100 allows the pitcher to choose to the configuration of magnetized baseball 100 that has the optimal polar-axis orientation for the grip and style of the throw to come. Choosing the ball with the optimal polar-axis orientation may increase the likelihood that for any given throw the north-south polar-axis of magnetized unit 102 will be generally perpendicular to magnetic field sensors 201 and 202, thereby optimizing the measurement performance of system 10. For example, if the pitcher plans to throw a split-finger fast-ball, he or she may choose to throw the embodiment of magnetized baseball 100 shown in FIG. 12-C, which is configured to have the polar-axis of magnetized unit 102 oriented in parallel with the seams of the ball, since a split-finger fast-ball is typically thrown with the pitcher's fingers running along the seams of the ball, resulting in the axis of rotation of the ball to be perpendicular to the seams, and further resulting in the polar-axis of the ball to be generally perpendicular to magnetic field sensors 201 and 202.

Another embodiment of magnetized baseball 100 that aims to reduce the probability that the north-south polar-axis of magnetized unit 102 will be parallel to magnetic field sensors 201 and 202 during a given throw is shown in FIG. 12-D. In this embodiment, magnetized unit 102 comprises two cylindrical bar magnets, oriented orthogonally to each other and embedded with body 101 of magnetized baseball 100. A third cylindrical bar magnet may also be added to this configuration, such that the orientation of the third magnet is orthogonal to the first two magnets. This embodiment may reduce the probability for a given throw that the magnetic polar-axis will be generally parallel to magnetic field sensors 201 and 202, regardless of the axis of rotation of magnetized baseball 100 in flight.

An alternate embodiment of system 10 that is configured to ensure that the north-south polar-axis of magnetized unit 102 is not parallel to the magnetic field sensors for a given throw is shown in FIG. 11-C. In this embodiment, sensor array 200 further comprises magnetic field sensors 211 and 212, which are positioned substantially orthogonally to magnetic field sensors 201 and 202, respectively, as shown. In this embodiment, magnetic field sensors 211 and 212 are also in communication with control module 300, and are electrically configured the same as magnetic field sensors 201 and 202. In this embodiment of system 10, the likelihood that the polar-axis of magnetized unit 102 for a given throw will not be parallel to magnetic field sensors 201 and 202, and 211 and 212, is reduced.

Alternate Embodiment: Baseball
Application—Speed Measurement

One embodiment of system 10 for measuring the speed of magnetized baseball 100 is shown in FIG. 11-A. This embodiment of system 10 comprises the functional blocks of the exemplary embodiment for the hockey application, as described above and shown in FIG. 1-A. The following written description of the embodiment shown in FIG. 11-A assumes the case that thrown magnetized baseball 100 is spinning on an axis of rotation such that the north-south polar-axis of magnetized unit 102 is generally perpendicular to magnetic field sensors 201 and 202, as shown by the orientation of magnetic field 110 in FIG. 11-B. See the discussion of the polar-axis issue above for alternate embodiments of magnetized baseball 100 and sensor array 200 that aim to increase the likelihood of this optimal case.

FIG. 13-A shows the output signals A2 and B2 generated by gain circuit 320 during a throw of magnetized baseball 100. Note that the signature falling-edge followed-by rising-edge profile of these output signals is present for both signals A2 and B2, indicating a change in polarity of the magnetic flux through magnetic field sensors A2 and B2 as magnetized baseball 100 passes by. Since the distinct falling-edge followed-by rising-edge profile is present for this application, trigger circuit 330 of control module 300 may be configured as described in the exemplary embodiment for a hockey application section above (shown in FIGS. 5-A, 6-B, and 6-D).

The output signals A2 and B2 generated by gain circuit 320 for thrown magnetized baseball 100 differ from the equivalent signals generated for shot magnetized puck 100

(signals A2 and B2 generated for shot magnetized puck 100 are shown in FIG. 7), in that output signals A2 and B2 generated by thrown magnetized baseball 100 (shown in FIG. 13-A) exhibit multiple falling-edge followed-by rising-edge cycles in series as magnetized baseball 100 passes over magnetic field sensors 201 and 202. This series of falling-edge followed-by rising-edge cycles is caused by the rotation of magnetized baseball 100 in flight. As magnetized baseball 100 rotates over magnetic field sensors 201 and 202, the north-south polar-axis of magnetized unit 102 is also rotating perpendicular to the sensors. The rotation of the polar-axis of magnetized unit 102 while in flight above the sensors creates a continuous change in the polarity of the magnetic flux through the sensors, thereby causing the series of falling-edge followed-by rising-edge cycles shown in output signals A2 and B2 of FIG. 13-A. Note that the series of falling-edge followed-by rising-edge cycles has the signature of an envelope as a result of thrown magnetized ball 100 entering then leaving the range of sensitivity of magnetic field sensors 201 and 202.

In an embodiment of system 10 for a baseball application, control module 300 may measure the speed of baseball 100 by executing the method 1000 described in the description of the exemplary embodiment for a hockey application described above, as shown in the flow diagram of FIG. 9. FIG. 13-B shows gain circuit 320 output signals A2 and B2, and corresponding output signals A6 and B6 generated by trigger circuit 330 to be sent to controller circuit 340 during a throw. Refer to above discussion of output signals A6 and B6 generated at the output of trigger circuit 330 as a result of a falling-edge followed by rising-edge profile of gain circuit outputs A2 and B2 in the exemplary embodiment for a hockey application.

In this embodiment of system 10 for a baseball application, controller circuit 340 is configured to execute method of measuring speed 1000, as shown in the flow diagram of FIG. 9. That is to say that controller circuit 340 is configured to:

1) send a reset signal to initialize flip-flop circuits 333 and 334 of trigger circuit 330 to prepare the system to measure the speed of a throw, as described in step 1001;
2) detect a rising-edge of output signal A6, generated by trigger circuit 330 in response to magnetized baseball 100 passing over magnetic field sensor 201, as described in step 1002 and inquiry 1003;
3) record the time, t1, at which rising-edge of output signal A6 was detected, as described in step 1004;
4) detect a rising-edge of output signal B6, generated by trigger circuit 330 in response to magnetized baseball 100 passing over magnetic field sensor 202, as described in step 1005 and inquiry 1006;
5) record the time, t2, at which rising-edge of output signal B6 was detected, as described in step 1007;
6) calculate Δt, the time elapsed between t1 (the time at which magnetized baseball 100 passed over magnetic field sensor 20) and t2 (the time at which magnetized baseball 100 passed over magnetic field sensor 201), where:

$$\Delta t = t2 - t1$$

as described in step 1008;
7) calculate v, the speed of magnetized baseball 100, by dividing Δd, the known distance between magnetic field sensor 201 and magnetic field sensor 202, by Δt, such that:

$$v = \frac{\Delta d}{\Delta t}$$

as described in step 1009;
8) write the calculated speed, v, to display 400 for viewing by the user, as described in step 1010; and,
9) repeat sequence from step 1 above, if another throw is expected, as described in step 1011.

It should be noted that the exemplary method 1100 for measuring the speed of a magnetized movable object 100, as shown in the flow diagram of FIG. 10 and described in the discussion of the exemplary embodiment above, may be executed with system 10 to measure the speed of magnetized baseball 100 in a baseball application, as shown in FIG. 11-B.

Alternate Embodiment: Baseball Application—Improved Speed Measurement

Another embodiment of system 10 for measuring the speed of magnetized baseball 100 is shown in FIG. 11-D. This embodiment is very similar to the embodiment described above and shown in FIG. 11-B, except the embodiment shown in FIG. 11-D does away with lay-flat surface 210 of sensor array 200, and instead positions magnetic field sensors 201 and 202 such that the known distance between them, Δd, is increased.

Increasing the known distance, Δd, between the sensors decreases the error, v_error, in the measured speed, v, of magnetized baseball 100. In a baseball application, the rotation of magnetized baseball 100 may induce measurement errors. An example of a measurement error caused by the rotation of magnetized baseball 100 is the phase error in the output signals generated by magnetic field sensors 201 and 202 that may occur when magnetized baseball 100 creates a change in the polarity of the magnetic flux through sensor 202 at a different distance from sensor 202 than the distance from sensor 201 at which magnetized baseball 100 creates a change in the polarity of the magnetic flux through sensor 201. The resulting speed measurement error in this example is related to the actual distance traveled by the ball, d_traveled, over time interval Δt being different from Δd, the known distance between the sensors that is used in the speed calculation as an estimate of the actual distance traveled by the ball. If d_traveled is equal to Δd, for a given throw, then v_error is zero. The assumption that the known distance, Δd, between magnetic field sensors 201 and 202 is the precise distance traveled, d_traveled, by magnetized baseball 100 during time interval Δt may not always be valid. The rotation of magnetized baseball 100 may alter the distance to a given magnetic field sensor at which magnetized baseball 100 causes a polarity change in the magnetic flux through the magnetic field sensor. The exemplary embodiment of system 10 determines time interval Δt by detecting the instances of flux polarity changes in the magnetic field sensors [and sending rising-edge signals from trigger circuit 330 to control circuit 340]. The actual distance traveled, d_traveled, by magnetized baseball 100 over time interval Δt may be different from the known distance, Δd, between magnetic field sensors 201 and 202. The difference between d_traveled and Δd will cause an error in the distance used for the speed calculation, such that:

$$d\_error = d\_traveled - \Delta d$$

The error in the speed measurement, v_error, will therefore be:

$$v\_error = \frac{d\_error}{\Delta t}$$

For a given speed, v, an increase in the known distance between sensors, Δd, results in an increase in the time interval Δt, since:

$$v = \frac{\Delta d}{\Delta t}$$

According to the equation for v_error above, an increase in the time interval Δt results in a decrease of the error in the speed measurement, v_error. Therefore, increasing the known distance, Δd, between magnetic field sensors 201 and 202, as shown in FIG. 11-D, may improve the accuracy of the speed measurement, v, in a baseball application by reducing the speed error, v_error, caused by the rotation of magnetized baseball 100.

FIG. 13-D shows gain circuit 320 output signals A2 and B2, and corresponding trigger circuit 330 output signals A6 and B6, generated by the embodiment of system 10 shown in FIG. 11-D in response to thrown magnetized baseball 100. Note that time interval, Δt, between the rising-edges of output signals A6 and B6 shown in FIG. 13-D are greater than the time interval, Δt, between the rising edges of output signals A6 and B6 shown in FIG. 13-B. The increase of time interval, Δt, shown in FIG. 13-D indicates that the speed measurement error, v_error, caused by the rotation of magnetized baseball 100 is diminished by increasing the known distance, Δd, between magnetic field sensors 201 and 202, as configured in the embodiment of FIG. 11-D.

The speed measurement error, v_error, due to the rotation of magnetized baseball 100 may be further reduced by configuring controller circuit 340 to execute a slight modification to method 1000. In this alternate embodiment, controller circuit 340 is configured to send a reset signal to flip-flop circuits 333 and 334 of trigger circuit 330 after detecting rising-edges on output signals A6 and B6. The reset signals sent to flip-flop circuits 333 and 334 forces the outputs of trigger circuit 330 back to the logic-low level (0V), and initializes trigger circuit 330 so that it can output rising-edge signals in response to subsequent falling-edge followed by rising-edge signals detected within the signal envelope created on gain circuit 320 output signals A2 and B2 as thrown magnetized baseball 100 rotates while passing above sensors 201 and 202. FIG. 13-E shows gain circuit 320 output signals A2 and B2, and corresponding trigger circuit 330 output signals A6 and B6 for this alternate embodiment of controller circuit 340. In this embodiment, controller circuit 340 may be further configured to calculate the average of the times recorded for the detected rising-edges of A6 within an envelope for signal A2, t_A_avg, and to calculate the average of the times recorded for the detected rising-edges of B6 within an envelope for signal B2, t_B_avg. The calculated time for t_A_avg will approximately be the time that marks the center of the signal envelope of A2, and the calculated time for t_B_avg will approximately be the time that marks the center of the signal envelope of B2. The time interval, Δt, used in the calculation of speed, v, will then be the time interval between time t_A_avg and time t_B_avg, such that:

$$\Delta t = t\_B\_avg - t\_A\_avg$$

In this alternate embodiment for a baseball application, controller circuit 340 is configured to execute a modification to method of measuring speed 1000, as shown in the flow diagram of FIG. 9. That is to say that controller circuit 340 is configured to:

1) send a reset signal to initialize flip-flop circuits 333 and 334 of trigger circuit 330 to prepare the system to measure the speed of a throw;
2) detect a rising-edge of output signal A6 generated by trigger circuit 330 in response to magnetized baseball 100 passing over magnetic field sensor 201;
3) record the time, t1, at which rising-edge of output signal A6 was detected;
4) send a reset signal to initialize flip-flop circuits 333 and 334 of trigger circuit 330 to prepare the system to measure another rising-edge;
5) repeat step 2 through step 4 until there are no more rising-edges of output signal A6 generated by trigger circuit 330 from signal envelop of gain circuit 330 output signal A2;
6) average the recorded times, t1, from step 3 to calculate t_A_avg;
7) detect a rising-edge of output signal B6 generated by trigger circuit 330 in response to magnetized baseball 100 passing over magnetic field sensor 202;
8) record the time, t2, at which rising-edge of output signal B6 was detected;
9) send a reset signal to initialize flip-flop circuits 333 and 334 of trigger circuit 330 to prepare the system to measure another rising-edge;
10) repeat step 7 through step 9 until there are no more rising-edges of output signal B6 generated by trigger circuit 330 from signal envelop of gain circuit 330 output signal B2;
11) average the recorded times, t2, from step 8 to calculate t_B_avg;
12) calculate Δt, the time elapsed between t_A_avg (the time approximating the center of the envelope of the signal A2) and t_B_avg (the time approximating the center of the envelope of the signal B2), where:

$$\Delta t = t\_B\_avg - t\_A\_avg$$

13) calculate v, the speed of magnetized baseball 100, by dividing Δd, the known distance between magnetic field sensor 201 and magnetic field sensor 202, by Δt, such that:

$$v = \frac{\Delta d}{\Delta t}$$

14) write the calculated speed, v, to display 400 for viewing by the user; and,
15) repeat sequence from step 1 above, if another throw is expected.

The method described above, as executed by this alternate embodiment of controller circuit 340, further reduces the speed measurement error, v_error, by averaging any phase errors that may be caused by the rotation of magnetized baseball 100.

The method of calculating the speed of a rotating magnetized object by analyzing the signal envelopes of the output signals A2 and B2 generated by gain circuit 320, as described above, is not limited to being executed by the embodiments of system 10. Many other systems and approaches may be employed to determine the speed of a rotating magnetized object by analyzing the signal envelopes produced by magnetic field sensors, including, but not limited to, systems that utilize rms sensor circuits, or envelope detector circuits. Another approach is to continuously sample, or over-sample, signals A2 and B2, to do signal processing and analysis to determine the speed of the rotating magnetized object.

Alternate Embodiment: Baseball Application—Spin Rate Measurement

In another alternate embodiment, system 10 for measuring the motion properties of a magnetized baseball 100, as shown in FIG. 11-D, may be further configured to measure the spin rate, or speed of rotation, of thrown magnetized baseball 100. In this embodiment, control module 300 is configured to determine the period, Δt, of the signal A2, the signal generated by gain circuit 320 in response to changes in the polarity of the magnetic flux through magnetic field sensor 201 created by the rotation of magnetized baseball 100 as it passes over the sensor. Controller circuit 340 of control module 300 is further configured to calculate spin rate in revolutions per minute, or rpm, such that:

$$\text{spin\_rate} = \frac{1}{\Delta t}$$

In this embodiment, trigger circuit 330 is configured as shown in FIGS. 5-A and 6-B, and operates as described in the description of the exemplary embodiment of a hockey application above. Trigger 330 is configured to provide a rising-edge signal, A6, to controller circuit 340 in response to detecting a falling-edge followed by rising-edge profile on output signal A2 generated in response to magnetized baseball 100 rotating over magnetic field sensor 201. Controller circuit 340 is configured to send a reset signal to flip-flop circuits 333 and 334 of trigger circuit 330 after detecting a rising-edge on output signal A6. The reset signal sent to flip-flop circuits 333 and 334 forces the output of trigger circuit 330 back to the logic-low level (0V), and initializes trigger circuit 330 so that it can output another rising-edge signal in response to subsequent falling-edge followed by rising-edge signals on output signal A2. FIG. 13-F shows gain circuit 320 output signal A2 and corresponding trigger circuit 330 output signal A6. The period, Δt, is the interval between the time of detection of a first rising-edge on signal A6, t1, and the time of detection of a second rising-edge signal on A6, t2, such that:

$$\Delta t = t2 - t1$$

Figure 14:
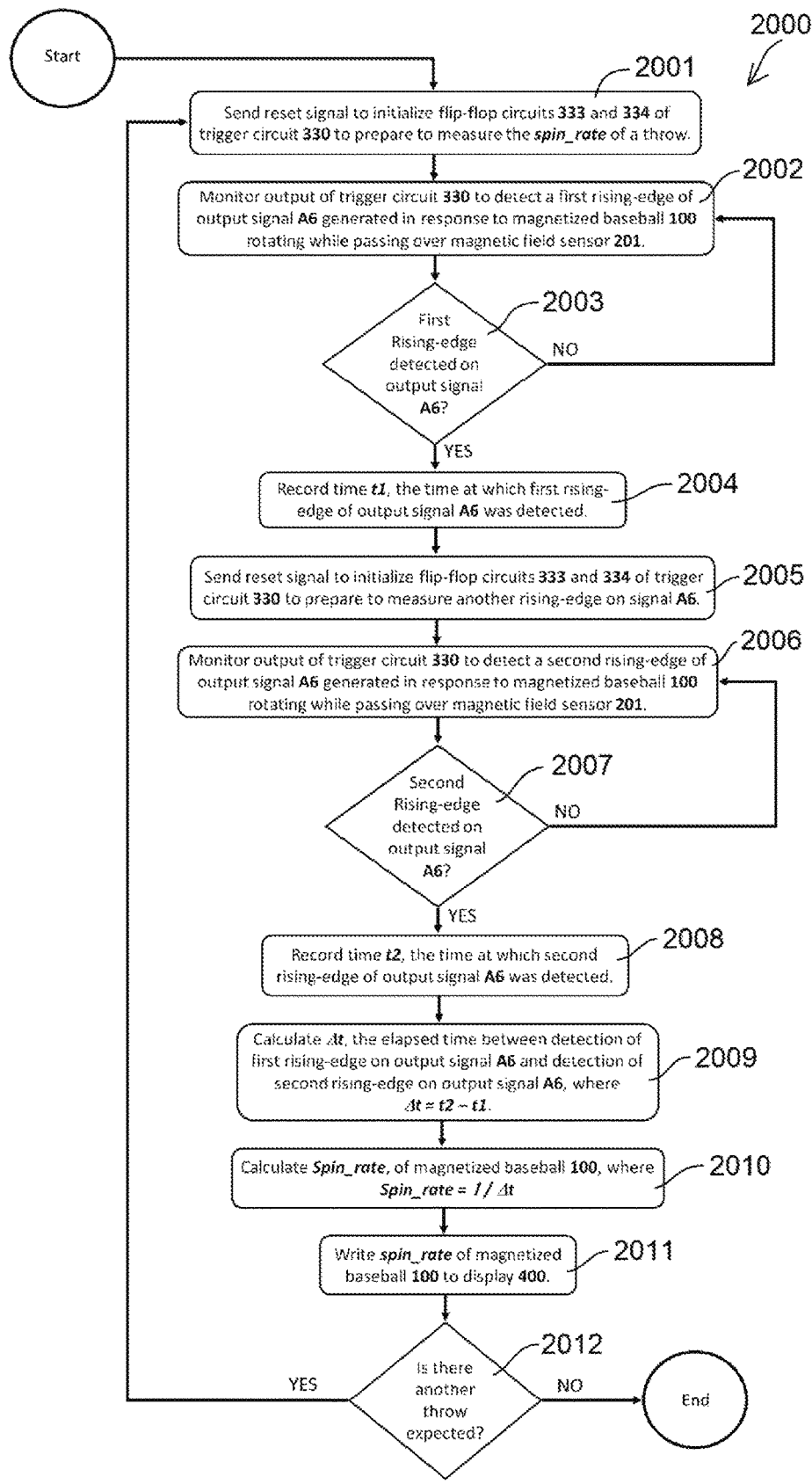
FIG. 14 shows a flow diagram for an exemplary method 2000 for calculating the spin rate of rotating magnetized movable object 100, as executed by control circuit 340 in the exemplary embodiment of system 10 for a baseball application.

In this embodiment for a baseball application, controller circuit 340 is configured to execute method of measuring spin rate 2000, as shown in the flow diagram of FIG. 14. That is to say that controller circuit 340 is configured to:

1) send a reset signal to initialize flip-flop circuits 333 and 334 of trigger circuit 330 to prepare the system to measure the spin rate of a throw, as described in step 2001;
2) detect a first rising-edge of output signal A6 generated by trigger circuit 330 in response to magnetized baseball 100 rotating while passing over magnetic field sensor 201, as described in step 2002 and inquiry 2003;
3) record the time, t1, at which first rising-edge of output signal A6 was detected, as described in step 2004;
4) send a reset signal to initialize flip-flop circuits 333 and 334 of trigger circuit 330 to prepare the system to measure another rising-edge, as described in step 2005;
5) detect a second rising-edge of output signal A6 generated by trigger circuit 330 in response to magnetized baseball 100 rotating while passing over magnetic field sensor 201, as described in step 2006 and inquiry 2007;
6) record the time, t2, at which second rising-edge of output signal A6 was detected, as described in step 2008;
7) calculate Δt, the time elapsed between t1 (the time at which first rising-edge was detected on signal A6) and t2 (the time at which second rising-edge was detected on signal A6), where:

$$\Delta t = t2 - t1$$

as described in step 2009;
8) calculate spin_rate of magnetized baseball 100, such that:

$$\text{spin\_rate} = \frac{1}{\Delta t}$$

as described in step 2010;
9) write the calculated spin_rate to display 400 for viewing by the user, as described in step 2011; and,
10) repeat sequence from step 1 above, if another throw is expected, as described in step 2012.

Exemplary Method: Baseball Application—Spin Rate Measurement

Figure 15:
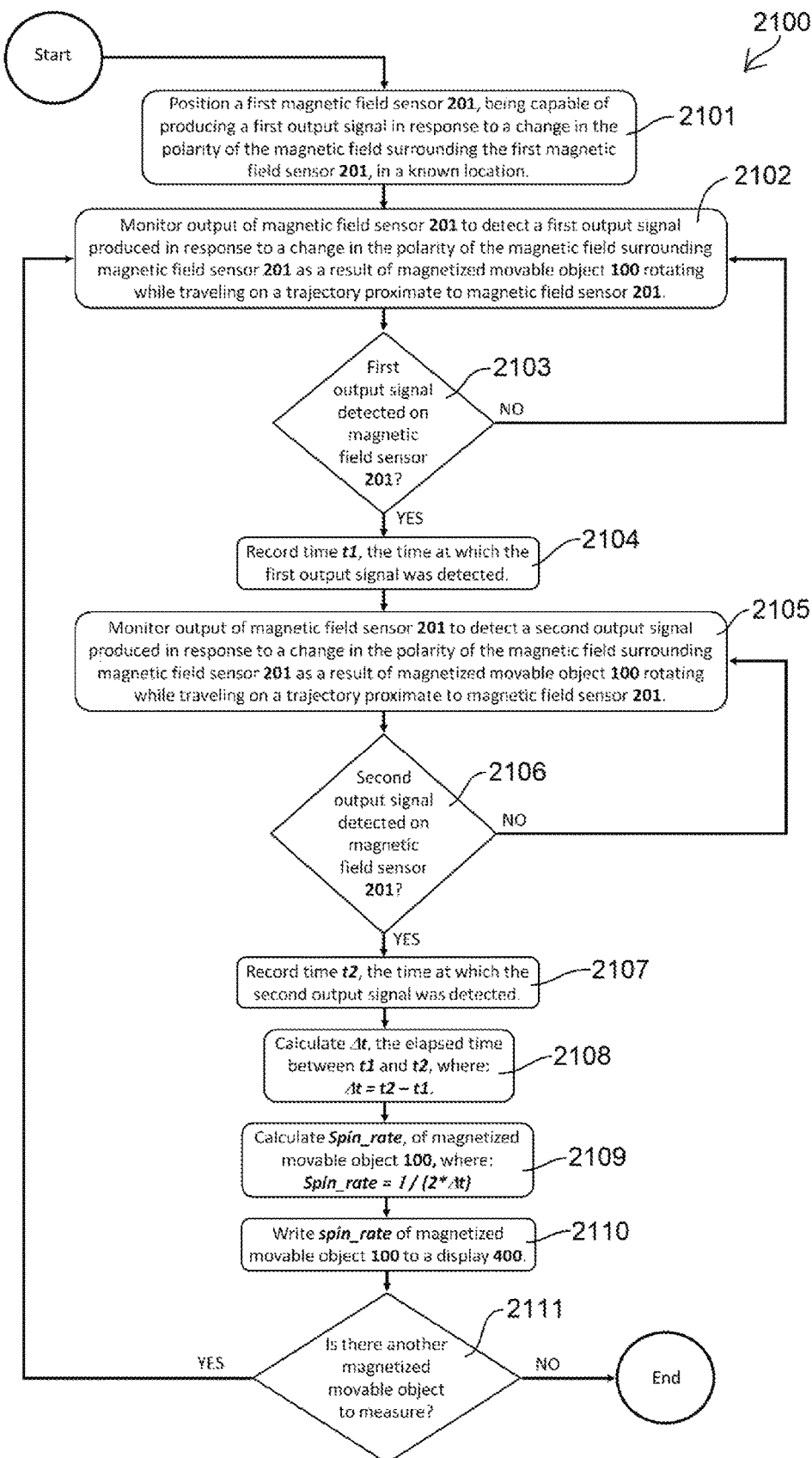
FIG. 15 shows a flow diagram for an exemplary method 2100 for calculating the spin rate of magnetized movable object 100.

An exemplary method 2100 for measuring the spin rate of a rotating magnetized movable object 100 is shown in the flow diagram of FIG. 15. The magnetized movable object 100 to be measured by exemplary method 2100 may be, but is not limited to, the embodiment of magnetized baseball 100 described above and shown in FIG. 12-A. Exemplary method 2100 may be executed by the exemplary embodiment of system 10 to measure the spin rate of magnetized baseball 100, as shown in FIG. 11-D and described in the detailed description sections above. It is important to note, however, that other systems may be devised or constructed to execute exemplary method 2100 for measuring the spin rate of a rotating magnetized movable object 100, and that execution of exemplary method 2100 is neither dependent upon, nor limited to implementation by, the exemplary embodiment of system 10, as it is shown in FIG. 11-D and described above.

Referring to the flow diagram in FIG. 15, exemplary method 2100 for measuring the spin rate of a rotating magnetized movable object 100 comprises the steps of:

1) Positioning a first magnetic field sensor 201, being capable of producing a first output signal in response to a change in the polarity of the magnetic field surrounding the first magnetic field sensor 201, in a known location, as described in step 2101;
2) Monitoring the first magnetic field sensor 201, and detecting a first output signal produced in response to a change in the polarity of the magnetic field surrounding the first magnetic field sensor 201 as a result of magnetized movable object 100 rotating while traveling on a trajectory proximate to the first magnetic field sensor 201, as described in step 2102 and step 2103;
3) Recording time t1, the time at which the first output signal was detected, as described in step 2104;

4) Monitoring the first magnetic field sensor 201, and detecting a second output signal produced in response to a change in the polarity of the magnetic field surrounding the first magnetic field sensor 201 as a result of magnetized movable object 100 rotating while traveling on a trajectory proximate to the first magnetic field sensor 201, as described in step 2105 and step 2106;

5) Recording time t2, the time at which the second output signal was detected, as described in step 2107;

6) Calculating Δt, the elapsed time between t1 (the time at which the first output signal was detected from magnetic field sensor 201) and t2 (the time at which the second output signal was detected from magnetic field sensor 201), where:

$$\Delta t = t2 - t1$$

as described in step 2108;

7) Calculating spin_rate of rotating magnetized movable object 100, such that:

$$\text{spin\_rate} = \frac{1}{(2 * \Delta t)}$$

as described in step 2109;

8) Writing the calculated spin_rate to a display device 400 for viewing by the user, as described in step 2110; and, 9) Repeating sequence from step 2 above, if another rotating magnetized object to measure is expected, as described in step 2111.

Note that the calculation of spin_rate in step 2109 of method 2100 is different from that of step 2010 of method 2000 (as shown in FIG. 14). Step 2109 of method 2100 calculates spin_rate as:

$$\text{spin\_rate} = \frac{1}{(2 * \Delta t)}$$

Whereas step 2010 of method 2000 calculates spin_rate as:

$$\text{spin\_rate} = \frac{1}{\Delta t}$$

Method 2000 is a method for calculating the spin_rate of a rotating magnetized movable object 100 to be executed by control module 300 of the embodiment system 10 shown in FIG. 11-D. In that particular embodiment of system 10, trigger circuit 330 (shown in FIGS. 5-A and 6-B) is configured to output a rising-edge signal in response to detecting a falling-edge (indicating a first change in polarity of the magnetic field surrounding magnetic field sensor 201) followed by a rising-edge (indicating a second change in polarity of the magnetic field surrounding magnetic field sensor 201) signature of the output of gain circuit 320. This rising-edge followed by a falling-edge profile indicates that rotating magnetized movable object 100 has completed a full rotation when trigger circuit 330 outputs a first rising-edge on signal A6, as shown in FIG. 13-F. Therefore, the time between rising-edge signals, Δt, represents the period of rotation of magnetized movable object 100 in this embodiment of system 10. Since Δt represents one full period of rotation of magnetized movable object 100 in this embodiment, the calculation of spin_rate is calculated with the equation shown in step 2010 of method 2000.

Method 2100 for calculating the spin_rate of a magnetized movable object 100, as shown in the flow diagram of FIG. 15, is a method outlining steps that are not limited to be being executed exclusively by the embodiment of system 10 shown in FIG. 11-D. Referring again to the flow diagram of FIG. 15, steps 2102 through 2107 teach recording time t1 during the detection of a first change in the polarity of the magnetic field surrounding magnetic field sensor 201, then recording time t2 during the detection of a second change in the polarity of the magnetic field surrounding magnetic field sensor 201. Time t1 marks the time at which the magnetic field has changed. Time t2 marks the time at which the magnetic field has changed again. Therefore, in the calculation of step 2108, time interval Δt represents one half of the period of rotation of magnetized movable object 100 (since a N-S pole flip would begin the measured time interval at time t1, and a S-N pole flip would end the measured time interval at time t2, measured time interval Δt would measure the time elapsed during the single S-N pole flip; one more pole flip, in this case another N-S pole flip, would have to occur to complete a full rotation of magnetized movable object 100). Since Δt represents one half of the period of rotation of magnetized movable object 100 for the exemplary method 2100 shown in FIG. 15, spin_rate is calculated with the equation shown in step 2009.

Alternate Embodiment: Baseball Application—Baseball Bat Speed

Another embodiment of system 10 for measuring the speed of magnetized baseball 100 is shown in FIG. 16-A. This embodiment of system 10 comprises the functional blocks of the exemplary embodiment for the hockey application, as described above and shown in FIG. 1-A.

Figure 17:
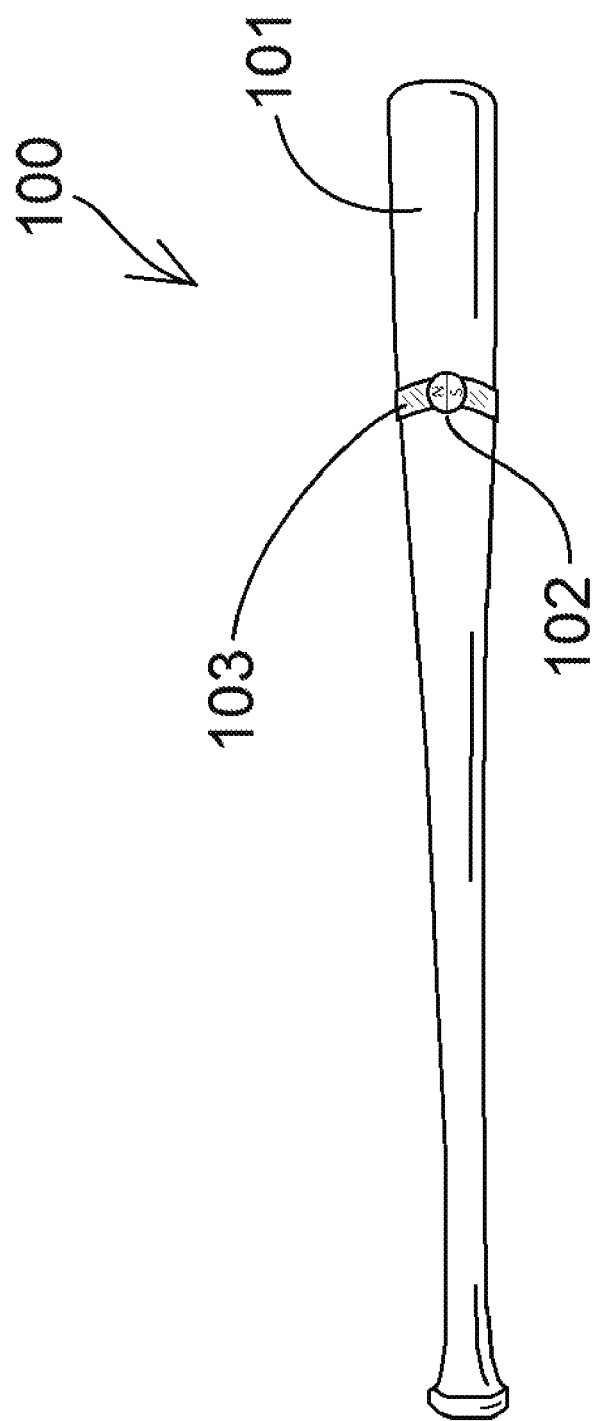
FIG. 17 shows a perspective view of an exemplary embodiment of magnetized object 100, as configured for a baseball bat swing speed application.

In the embodiment shown in FIG. 16-A, magnetized movable object 100 is a swinging member, magnetized baseball bat 100. FIG. 17 shows one embodiment of magnetized baseball bat 100. In this embodiment, magnetized baseball bat 100 comprises magnetic unit 102, which is attached to body 101 by attachment strap 103. Body 101 is a regulation baseball bat in this embodiment. It should be noted that in alternate embodiments magnetic unit 102 may be embedded within, attached to, or otherwise secured to body 101, such that magnetized baseball bat 100 has an associated magnetic field 110, shown in FIG. 16-B.

Figure 18:
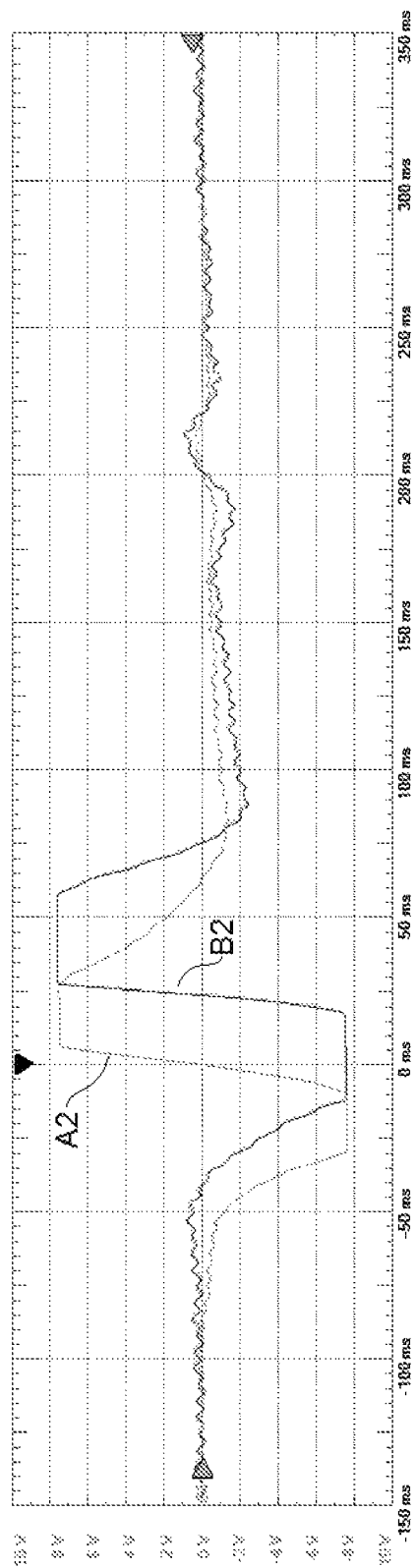
FIG. 18 presents output waveforms, A2 and B2, generated by the exemplary embodiment of gain circuit 320 in response to a swing from magnetized baseball bat 100 in a baseball bat swing speed application.

The output signals A2 and B2 generated gain circuit 320 in response to the change in polarity of the magnetic flux through magnetic field sensors 201 and 202 created by swinging magnetized baseball bat 100 are shown in FIG. 18. Since output signals A2 and B2 exhibit the distinct falling-edge followed by rising-edge profile discussed above, trigger circuit 330 is configured as shown in FIGS. 5-A and 6-B. Controller circuit 340 of control module 300 is configured to execute method 1000, as shown in the flow diagram of FIG. 9 and detailed above, for measuring the speed of swinging baseball bat 100.

Alternate Embodiment: Baseball Application—Home Plate Housing

Alternate embodiments of system 10 that have a home plate form factor for a baseball application are shown in FIGS. 19-A, 19-B, and 19-C. In these embodiments, control circuit 300 may be configured as shown in FIG. 5-A, and may be further configured to measure the speed and rotation of magnetized baseball 100 by executing method 1000 and method 2000, as shown in FIGS. 9 and 14, respectively. In these embodiments, housing 350 may be substantially shaped like a baseball home plate, so as to provide a more authentic pitching experience for the user, as shown in FIG. 11-F.

In the home plate embodiment of FIG. 19-A, magnetic field sensors 201 and 202 are wire coils wound around ferromagnetic core 203. Utilizing ferromagnetic core 203 increases the sensitivity of magnetic field sensors 201 and 202 (as described in the discussion of magnetic field sensors 201 and 202 in the detailed description of the exemplary embodiment for a hockey application, above). In this exemplary embodiment, magnetic field sensors 201 and 202 are positioned inside magnetic shielding boxes 204, and oriented as shown in FIG. 19-A. Magnetic shielding boxes 204 are constructed of ferromagnetic material, a nickel alloy in this embodiment, and are open on the top. The magnetic shielding boxes 204 attenuate the flux through magnetic field sensors 201 and 202 created by the rotating magnetized baseball 100 when magnetized baseball is not positioned generally above magnetic field sensors 201 and 202. This configuration may reduce measurement errors associated with the rotation of magnetized baseball 100 when measuring motion properties of a rotating magnetized baseball with more sensitive magnetic field sensors (see the discussion of the improved embodiment for measuring speed in a baseball application above).

FIG. 19-B shows an alternate embodiment of magnetic field sensors 201 and 202 and ferromagnetic core 203. The purpose of this embodiment is to increase the range of sensors 201 and 202 in the lateral direction, relative to the expected trajectory of magnetized baseball 100, by stretching the coils in the direction parallel to the front panel of home plate shaped housing 350. Ferromagnetic core 203 in this embodiment is L-shaped, forming a flux collector toward the back of housing 350, that collects flux from magnetized baseball 100 when it is rotating substantially above magnetic field sensors 201 and 202. FIG. 19-C and embodiment that further comprises magnetic shield 204 positioned in front of magnetic field sensors 201 and 202, relative to the trajectory of magnetized baseball 100. The purpose of the configuration of magnetic shield 204 and L-shaped ferromagnetic core 203 is to attenuate the magnetic flux through magnetic field sensors 201 and 202 before magnetized baseball 100 is positioned generally above the sensors, then to collect and focus the flux into magnetic field sensors 201 and 202 when magnetized baseball 100 is positioned generally above the sensors.

Alternate Embodiment: Golf Application

Figure 21:
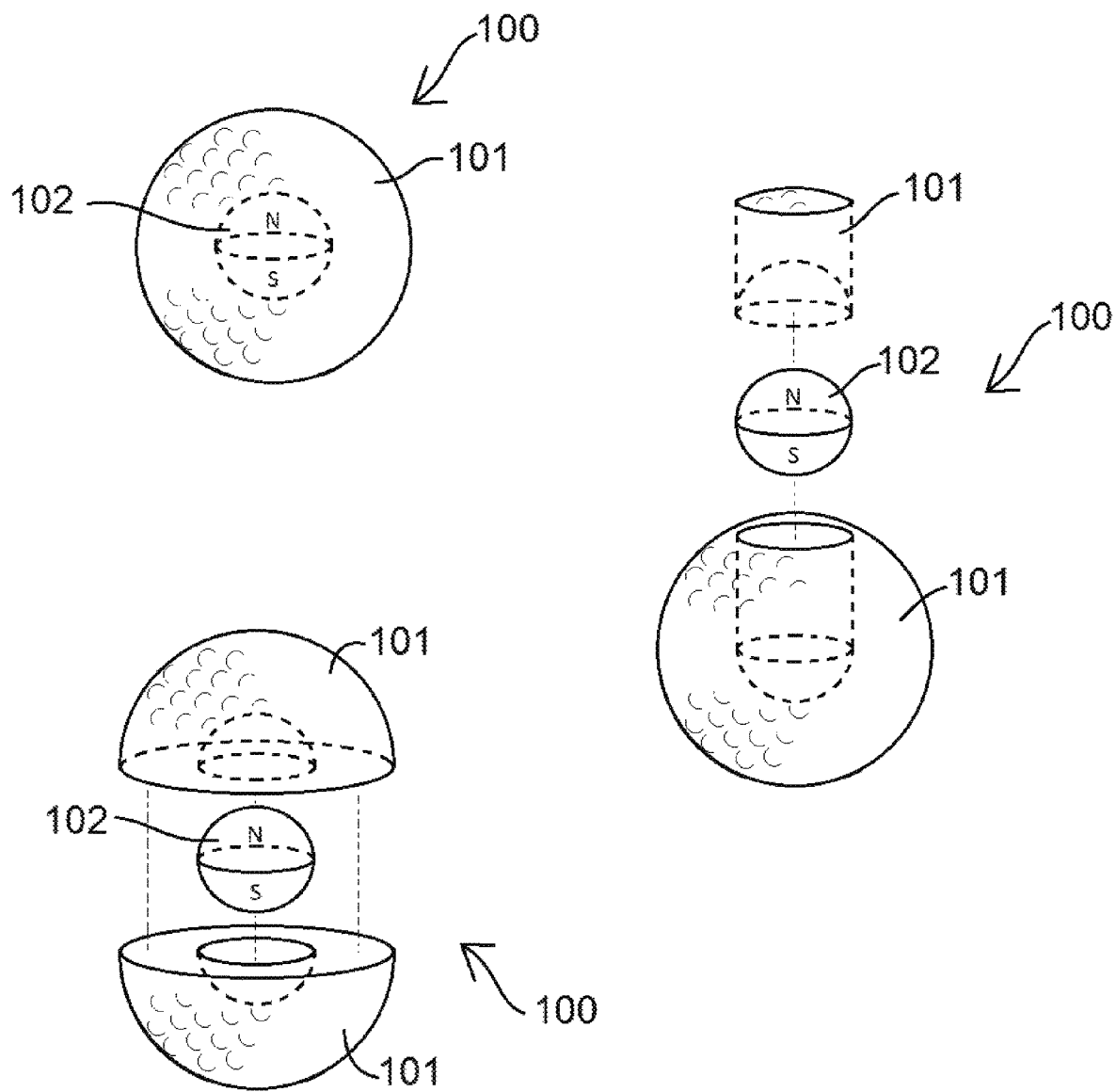
FIG. 21 shows multiple perspective views of an exemplary embodiment of magnetized object 100, as configured for a golf application.
Figure 22:
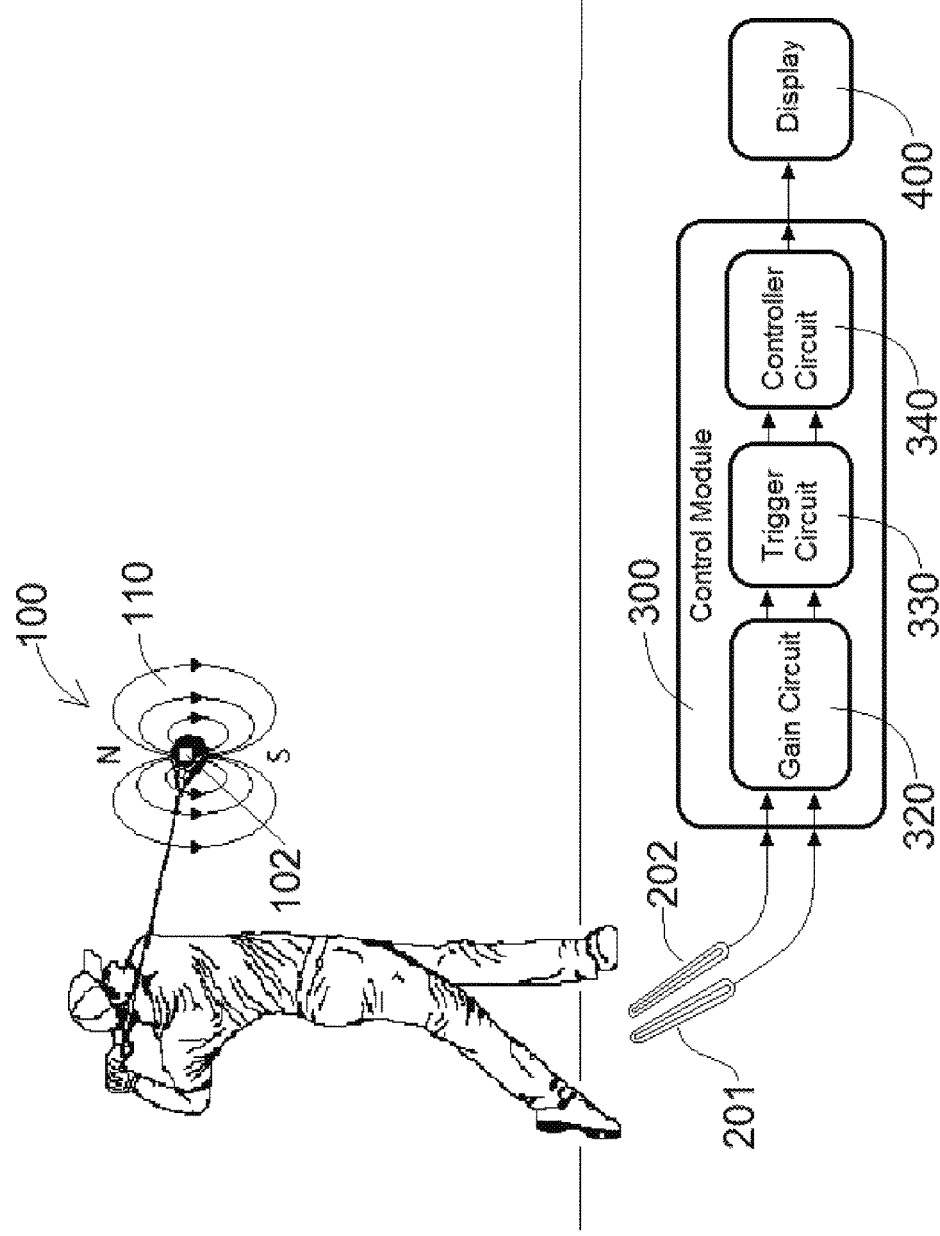
FIG. 22 shows an exemplary embodiment of system 10 and magnetized object 100, as configured for a golf club swing speed application.
Figure 23:
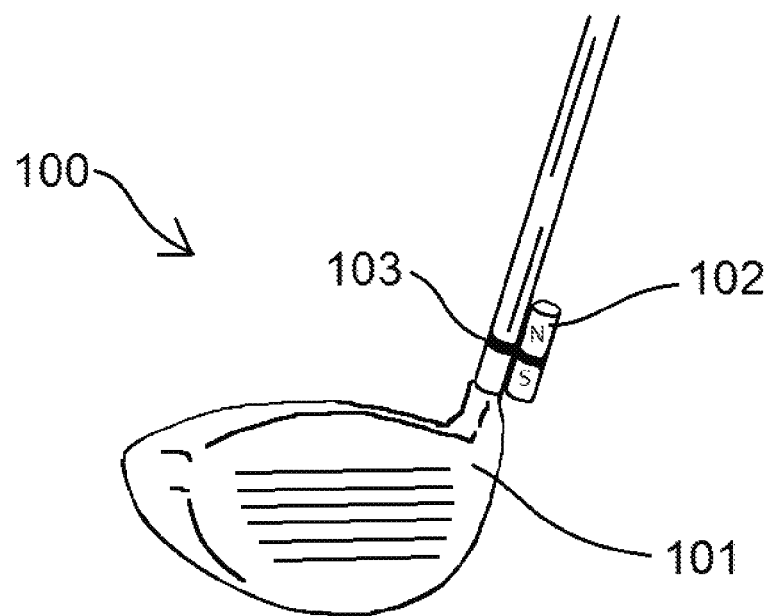
FIG. 23 shows a perspective view of an exemplary embodiment of magnetized object 100, as configured for a golf club swing speed application.
Figure 24:
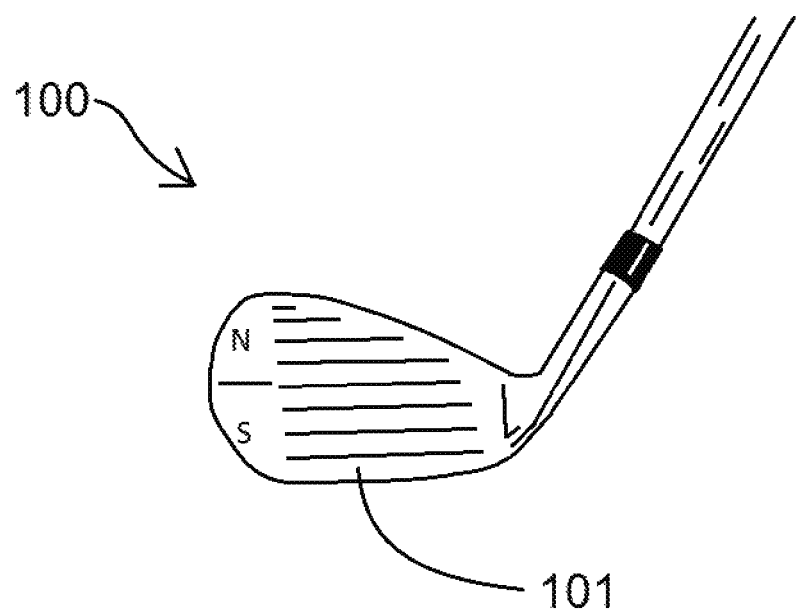
FIG. 24 shows a perspective view of an exemplary embodiment of magnetized object 100, as configured for a golf club swing speed application in which magnetized unit 102 is not utilized.

Alternate embodiments of system 10 for measuring the speed of a magnetized golf ball and the swing speed of a magnetized golf club are shown in FIGS. 20 and 22, respectively. Magnetized golf ball 100 is shown in FIG. 21. Magnetized golf club 100 is shown in FIG. 23, and comprises magnetized unit 102 secured to golf club body 101 by attachment strap 103. Magnetized unit 102 maybe secured to, or embedded within, golf club body 101. Some embodiments of magnetized golf club 100 may not utilize magnetized unit 102 for measuring the swing speed of a golf club, since some golf clubs are constructed out of ferromagnetic materials and naturally have an associated magnetic field. FIG. 24 shows an example of an embodiment of magnetized golf club 100 that does utilize magnetized unit 102, due to its ferromagnetic construction materials that produce a magnetic field (as illustrated by the "N" and "S" designations on the club to indicate the north and south poles of the associated magnetic field).

In the embodiments of system 10 shown in FIGS. 20 and 22, control circuit 300 is configured as shown in FIG. 5-A, and is further configured to measure the speed of magnetized golf ball 100, and to measure the swing speed of magnetized golf club 100, by executing method 1000 shown in FIG. 9.

Alternate Embodiment: Hockey Net

Figure 25:
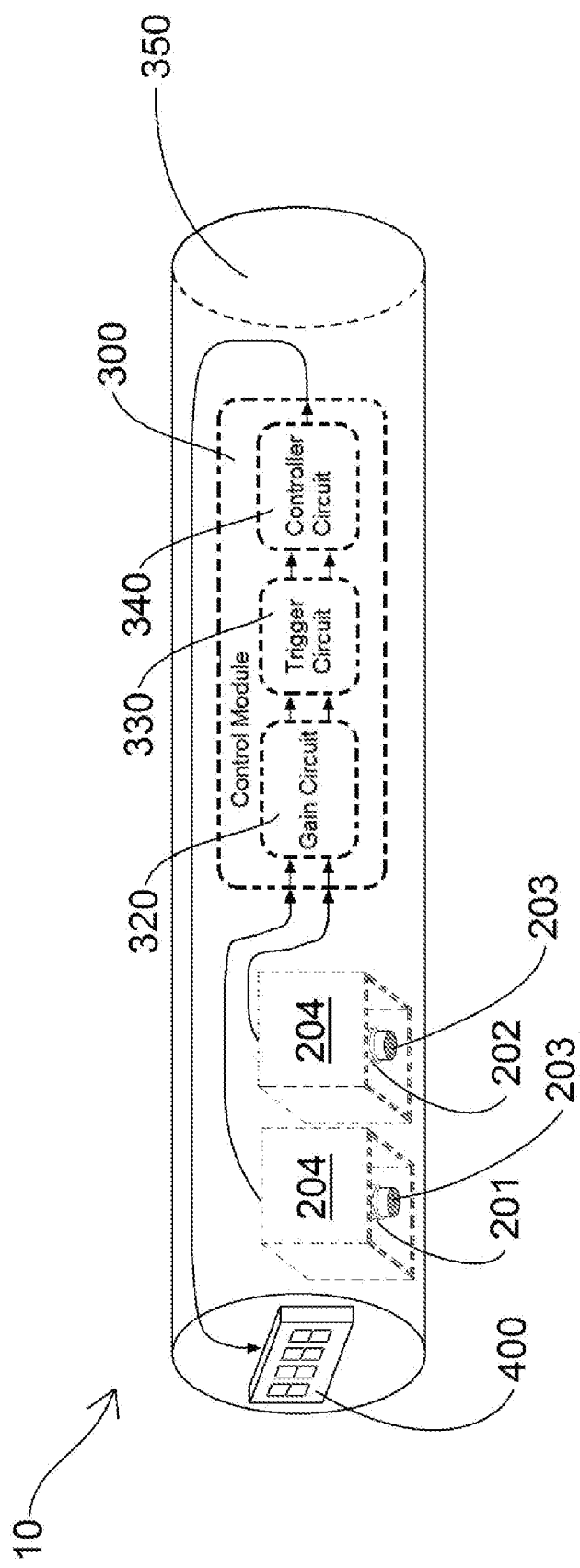
FIG. 25 shows a perspective view of an exemplary embodiment of housing 350 and magnetic field sensors 201 and 202 of system 10, as configured for a hockey net application.

FIG. 25 shows an alternate embodiment of system 10 for a hockey application that is designed to attach to a hockey net 500, as shown in FIG. 26-A. In this embodiment, magnetic field sensors 201 and 202 are coils wound around ferromagnetic core 203 and positioned inside magnetic shield boxes 204 inside housing 350. In this embodiment, control module 300 is configured as shown in FIG. 5-A, and is further configured to measure the speed of magnetized puck 100 by executing method 1000 shown in FIG. 9.

FIG. 27 shows an alternate embodiment of magnetic field sensors 201 and 202, in which magnetic field sensors 201 and 202 are coils wound around L-shaped ferromagnetic core 203, set behind magnetic shielding 204, and positioned within PVC housing 350. In this embodiment, housing 350 attaches to hockey net 500 as shown in FIGS. 26-B, 26-C, and 26-D. FIG. 26-B shows housing 350 attached at the top of hockey net 500, which allows it be outside of the trajectory of incoming shots. FIG. 26-B shows housing 350 containing sensors 201 and 202 (as shown in FIG. 27) attached at the top of hockey net 500, along with lower magnetic field sensors 201-B and 202-B, which are configured as shown in FIGS. 4-A and 4-B. This four-sensor configuration allows for better coverage of entire hockey net 500.

FIG. 26-D shows multiple sensor arrays 200 of magnetic field sensors, 201 and 202 placed around hockey net 500, to improve coverage of entire net. In the configuration shown, control module 300 further comprises multiplexer circuit 360 to select the optimal sensor signal to send to controller circuit 340 for a given throw. As mentioned in the above discussion of measuring accuracy relative to a target, the multiple sensor array shown is also used to more precisely determine the accuracy of a shot, by providing multidimensional information regarding the position of magnetized puck 100 to each individual sensor places in known locations.

FIG. 26-E shows an embodiment in which magnetic field sensors 201 and 202 are coils wound around ferromagnetic core 203 and positioned within posts of hockey net 500. In this embodiment of system 10, magnetic field sensors 201 and 202 are protected from incoming pucks by the posts of hockey net 500. This embodiment also provides the shooter with a more authentic shooting experience.

Alternate Embodiment: Hockey Shooting Surface

Figure 28:
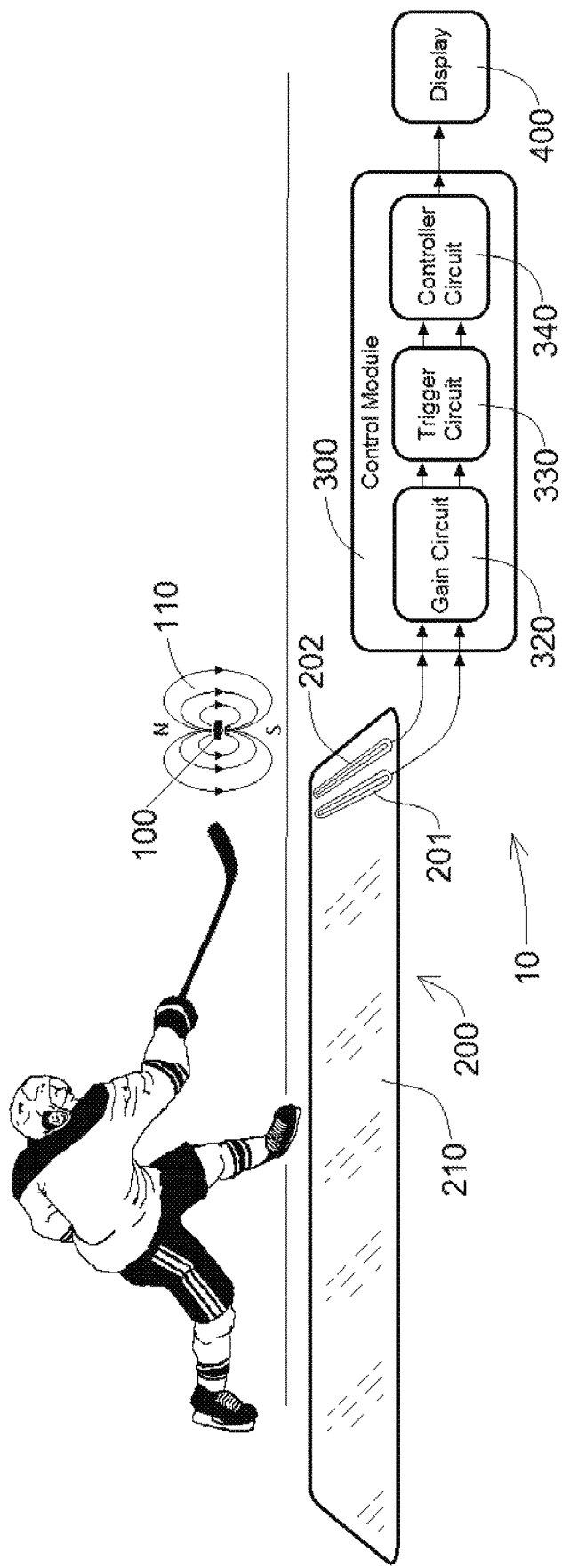
FIG. 28 presents an alternate embodiment of system 10, sensor array 200, and lay-flat surface 210, as configured for a hockey application in which lay-flat surface 210 is configured as an off-ice slippery shooting surface.
Figure 29:
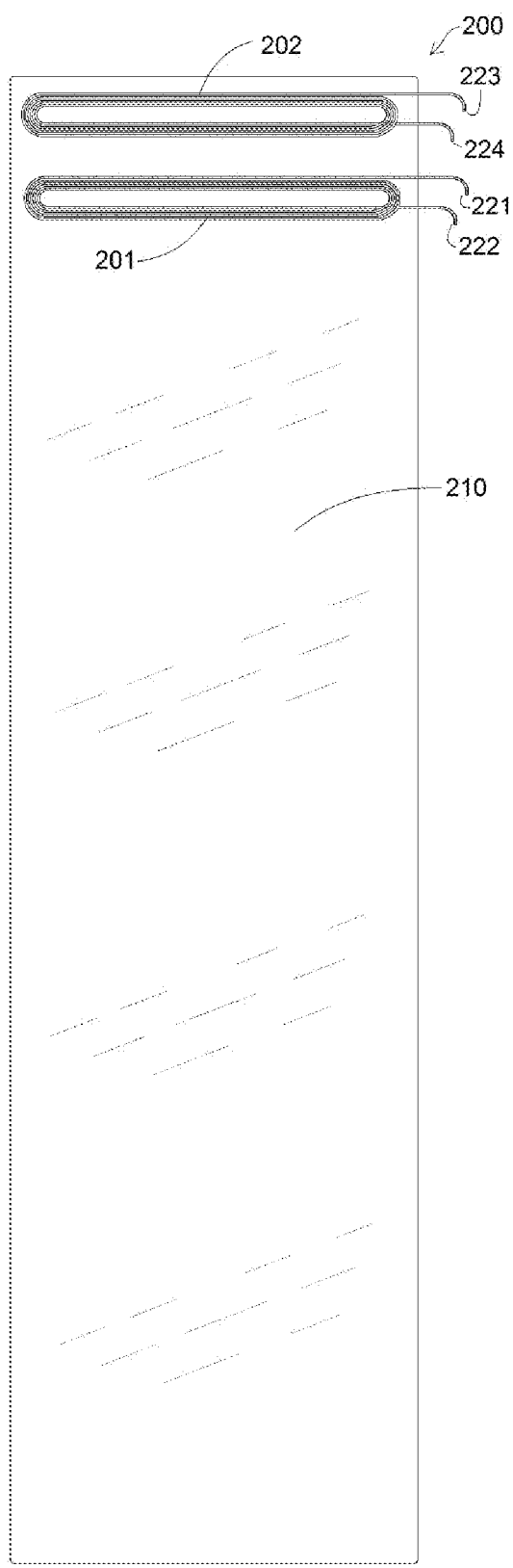
FIG. 29 presents top view of an alternate embodiment of sensor array 200 and lay-flat surface 210, as configured for a hockey application in which lay-flat surface 210 is configured as an off-ice slippery shooting surface.

An alternate embodiment of sensor array 200 is shown in FIGS. 28 and 29. In this embodiment, lay-flat surface 210 of sensor array 200 is configured to be a durable, smooth, slippery surface for shooting magnetized puck 100 on otherwise unsuitable ground surfaces, such as pavement.

Alternate Embodiment: Simplified Control Module 300

Simplified alternate embodiments of control module 300 of system 10 are shown in FIGS. 30-A, 30-B, 30-C, and 30-D.

FIG. 30-A shows a simplified embodiment of control module 300 in which gain circuit 320 is in communication with controller circuit 340.

FIG. 30-B shows a simplified embodiment of control module 300 in which trigger circuit 330 comprises comparator 332 in communication with controller circuit 340.

FIG. 30-C shows a simplified embodiment of control module 300 in which trigger circuit 330 comprises comparator 332 and flip-flop 334 in communication with controller circuit 340.

FIG. 30-D shows a simplified embodiment of control module 300 in which gain circuit 320 comprises an instrumentation amplifier, and trigger circuit 330 comprises comparator 332 and flip-flop 334 in communication with controller circuit 340.

What is claimed is:

1. A system for measuring the speed of a magnetized sporting device traveling along a trajectory, comprising:
    a first magnetic field sensor being capable of providing a first output signal in response to changes in the magnetic field proximate to said first magnetic field sensor, whereby said first magnetic field sensor provides said first output signal in response to a change in the magnetic field proximate to said first magnetic field sensor created by said magnetized sporting device traveling along a trajectory proximate to said first magnetic field sensor;
    a second magnetic field sensor positioned a known distance away from said first magnetic field sensor, wherein said second magnetic field sensor is capable of providing a second output signal in response to changes in the magnetic field proximate to said second magnetic field sensor, whereby said second magnetic field sensor provides said second output signal in response to a change in the magnetic field proximate to said seed magnetic field sensor created by said magnetized sporting device traveling along a trajectory proximate to said second magnetic field sensor; and,
    a control module in communication with said first magnetic field sensor and said second magnetic field sensor, wherein said control module is responsive to said first output signal provided by said first magnetic field sensor, wherein said control module is responsive to said second output signal provided by said second magnetic field sensor, wherein said control module comprises:
    a trigger circuit in communication with said first magnetic field sensor and said second magnetic field sensor, wherein said trigger circuit is responsive to said first output signal provided by said first magnetic field sensor in response to changes in the magnetic field proximate to said first magnetic field sensor, wherein said trigger circuit is configured to provide a first rising-edge signal or a first falling-edge signal in response to changes in said first output signal provided by said first magnetic field sensor in response to changes in the polarity of the magnetic field proximate to said first magnetic field sensor, whereby a change in the polarity of the magnetic field proximate to said first magnetic field sensor will result in said trigger circuit providing a first rising-edge signal or a first falling-edge signal, wherein said trigger circuit is responsive to said second output signal provided by said second magnetic field sensor in response to changes in the magnetic field proximate to said second magnetic field sensor, wherein said trigger circuit is configured to provide a second rising-edge signal or a second falling-edge signal in response to changes in said second output signal provided by said second magnetic field sensor in response to changes in the polarity of the magnetic field proximate to said second magnetic field sensor, whereby a change in the polarity of the magnetic field proximate to said second magnetic field sensor will result in said trigger circuit providing a second rising-edge signal or a second falling-edge signal; and,
    a controller circuit in communication with said trigger circuit, wherein said controller circuit is configured to accept input signals, wherein said controller circuit is further configured to detect rising-edge signals or falling-edge signals provided by said trigger circuit, wherein said controller circuit comprises a timer; wherein said controller circuit is configured to record time readings from said timer, and is further configured to determine the interval between subsequent time readings, whereby said controller circuit is configured to perform calculations to determine motion properties of said magnetized sporting device traveling along a trajectory based upon said rising-edge signals or falling-edge signals and based upon said time readings from said timer, wherein said controller circuit is further configured
    to monitor said trigger circuit, and to detect said first rising-edge signal or said first falling-edge signal provided by said trigger circuit in response to changes in the polarity of the magnetic field proximate to said first magnetic field sensor;
    to record the time at which said first rising-edge signal or said first falling-edge signal provided by said trigger circuit is detected;
    to monitor said trigger circuit, and to detect said second rising-edge signal or said second falling-edge signal provided by said trigger circuit in response to changes in the polarity of the magnetic field proximate to said second magnetic field sensor;
    to record the time at which said second rising-edge signal or said second falling-edge signal provided by said trigger circuit is detected;
    to determine the time interval between the recorded time at which said first rising-edge signal or said first falling-edge signal provided by said trigger circuit was detected and the recorded time at which said second rising-edge signal or said second falling-edge signal provided by said trigger circuit was detected; and,
    to determine the speed of the magnetized sporting device traveling along a trajectory by dividing the known distance between said first magnetic field sensor and said second magnetic field sensor by the time interval between the recorded time at which said first rising-edge signal or said first falling-edge signal provided by said trigger circuit was detected and the recorded time at which said second rising-edge signal or said second falling-edge signal provided by said trigger circuit was detected.

2. The system for measuring the speed of a magnetized sporting device traveling along a trajectory as recited in claim 1, further comprising an output display in communication with said control module, such that said output display may communicate at least one motion characteristic of said magnetized sporting device to a user.

3. The system for measuring the speed of a magnetized sporting device traveling along a trajectory as recited in claim 1, wherein said first magnetic field sensor and said second magnetic field sensor each comprise a conductive material forming a coil comprising two ends, whereby a change in the magnetic field proximate to said first magnetic field sensor or said second magnetic field sensor, as created by said magnetized sporting device traveling along a trajectory proximate to said first magnetic field sensor or said second magnetic field sensor, may result in a change in voltage across the two ends of said coil.

4. The system for measuring the speed of a magnetized sporting device traveling along a trajectory as recited in claim 1, wherein said trigger circuit comprises:
   a first comparator circuit being responsive to said first output signal provided by said first magnetic field sensor in response to changes in the magnetic field proximate to said first magnetic field sensor, wherein said first comparator circuit is configured to provide a rising-edge signal or a falling-edge signal in response to a first change in polarity of the magnetic field surrounding said first magnetic field sensor; and,
   a second comparator circuit being responsive to said second output signal provided by said second magnetic field sensor in response to changes in the magnetic field proximate to said second magnetic field sensor, wherein said second comparator circuit is configured to provide a rising-edge signal or a falling-edge signal in response to a first change in polarity of the magnetic field surrounding said second magnetic field sensor.

5. The system for measuring the speed of a magnetized sporting device traveling along a trajectory as recited in claim 4, wherein said trigger circuit further comprises:
   a third comparator circuit being responsive to said first output signal provided by said first magnetic field sensor in response to changes in the magnetic field proximate to said first magnetic field sensor, wherein said third comparator circuit is configured to provide a rising-edge signal or a falling-edge signal in response to a second change in polarity of the magnetic field surrounding said first magnetic field sensor, wherein said second change in polarity is of the opposite direction of said first change in polarity;
   a fourth comparator circuit being responsive to said second output signal provided by said second magnetic field sensor in response to changes in the magnetic field proximate to said second magnetic field sensor, wherein said fourth comparator circuit is configured to provide a rising-edge signal or a falling-edge signal in response to a second change in polarity of the magnetic field surrounding said second magnetic field sensor, wherein said second change in polarity is of the opposite direction of said first change in polarity;
   a first flip-flop circuit being responsive to said rising-edge or falling-edge signal provided by said first comparator circuit in response-to said first change in polarity, wherein said first flip-flop circuit is configured to provide a rising-edge or a falling-edge signal in response to detecting said rising-edge or falling-edge signal provided by said first comparator circuit in response to said first change in polarity;
   a second flip-flop circuit being responsive to said rising-edge or falling-edge signal provided by said second comparator circuit in response to said first change in polarity, wherein said second flip-flop circuit is configured to provide a rising-edge or a falling-edge signal in response to detecting said rising-edge or falling-edge signal provided by said second comparator circuit in response to said first change in polarity;
   a third flip-flop circuit in communication with said controller circuit being responsive to said rising-edge or falling-edge signal provided by said third comparator circuit in response to said second change in polarity, said third flip-flop circuit also being responsive to said rising-edge or falling-edge signal provided by said first flip-flop in response to detecting said rising-edge or falling-edge signal provided by said first comparator circuit in response to said first change in polarity, wherein said third flip-flop circuit is configured to provide a rising-edge signal or a falling-edge signal to said controller circuit in response to detecting rising-edge or falling-edge signals provided by both said first comparator circuit and said first flip-flop circuit, thereby signaling to said controller circuit that the polarity of the magnetic-field proximate to said first tie field sensor has changed a first time in one direction and has then changed a second time in the opposite direction; and,
   a fourth flip-flop circuit in communication with said controller circuit being responsive to said rising-edge or falling-edge signal provided by said fourth comparator circuit in response to said second change in polarity, said fourth flip-flop circuit also being responsive to said rising-edge or falling-edge signal provided by said second flip-flop in response to detecting said rising-edge, or falling-edge signal provided by said second comparator circuit in response to said first change in polarity, wherein said fourth flip-flop circuit is configured to provide a rising-edge signal or a falling-edge signal to said controller circuit in response to detecting rising-edge or falling-edge signals provided by both said second comparator circuit and second first flip-flop circuit, thereby signaling to said controller circuit that the polarity of the magnetic field proximate to said second magnetic field sensor has changed a first time in one direction and has then changed a second time in the opposite direction.

6. The system for measuring the speed of a magnetized sporting device traveling along a trajectory as recited in claim 4, wherein said control module further comprises a gain circuit in communication with said first magnetic field sensor and said first comparator, wherein said gain circuit is configured to amplify said first output signal provided by said first magnetic field sensor n response to changes in the magnetic field proximate to said first magnetic field sensor, whereby said gain circuit provides an amplified version of said first output signal to said first comparator circuit, wherein said gain circuit is in communication with said second magnetic field sensor and said second comparator, wherein said gain circuit is further configured to amplify said second output signal provided by said second magnetic field sensor in response to changes in the magnetic field proximate to said second magnetic field sensor, whereby said gain circuit provides an amplified version of said second output signal to said second comparator circuit.

7. The system for measuring the speed of a magnetized sporting device traveling along a trajectory as recited in claim 1, wherein said control module further comprises a gain circuit in communication with said first magnetic field sensor, said second magnetic field sensor, and said trigger circuit, wherein said gain circuit is configured to amplify said first output signal provided by said first magnetic field sensor in response to changes in the magnetic field proximate to said first magnetic field sensor, whereby said gain circuit provides an amplified version of said first output signal to said trigger circuit, wherein said gain circuit is further configured to amplify said second output signal provided by said second magnetic field sensor in response to changes in the magnetic field proximate to said second magnetic field sensor, whereby said gain circuit provides an amplified version of said second output signal to said trigger circuit.

8. The system for measuring the speed of a magnetized sporting device traveling along a trajectory as recited in claim 1, further comprising a lay-flat surface being capable of assuming a substantially planar shape, wherein said first magnetic field sensor and said second magnetic field sensor are secured to or embedded within said lay-flat surface with a known distance separating said first magnetic field sensor from said second magnetic field sensor.

9. The system for measuring the speed of a magnetized sporting device traveling along a trajectory as recited in claim 1, further comprising a magnetized sporting device, wherein said magnetized sporting device comprises:
   a body forming a sporting device; and,
   a magnetized unit being capable of producing a magnetic field, such that said magnetized unit has a north pole and a south pole, wherein said magnetized unit is secured to or embedded within said body forming a sporting device.

10. A method for measuring the speed of a magnetized sporting device traveling along a trajectory comprising the steps of:
   positioning a first magnetic field sensor, capable of producing a first output signal in response to a change in the magnetic field proximate to said first magnetic field sensor, in a known location;
   positioning a second magnetic field sensor, capable of producing a second output signal in response to a change in the magnetic field proximate to said second magnetic field sensor, at a known distance away from said first magnetic field sensor;
   providing a trigger circuit communication with said first magnetic field sensor and said second magnetic field sensor, wherein said trigger circuit is configured to produce a first trigger signal in response to changes in said first output signal provided by said first magnetic field sensor in response to changes in the polarity of the magnetic field proximate to said first magnetic field sensor, wherein said trigger circuit is further configured to produce a second trigger signal in response to changes in said second output signal provided by said second magnetic field sensor in response to changes in the polarity of the magnetic field proximate to said second magnetic field sensor;
   monitoring said trigger circuit, and detecting said first trigger signal produced in response to a change in the polarity of the field proximate to said first magnetic field sensor as a result of said magnetized sporting device traveling on a trajectory proximate to said first magnetic field sensor;
   recording the time at which said fits trigger signal produced by said trigger circuit was detected;
   monitoring said trigger circuit, and detecting said second trigger signal produced in response to a change in the polarity of the magnetic field proximate to said second magnetic field sensor as a result of said magnetized-sporting device traveling on a trajectory proximate to said second magnetic field sensor;
   recording the time at which said second trigger signal produced by said trigger circuit was detected;
   calculating the time interval between the recorded time at which said first trigger signal produced by said trigger circuit was detected and the time at which said second trigger signal produced by said trigger circuit was detected; and,
   calculating the speed of said magnetized sporting device traveling along a trajectory, by dividing the known distance between said first magnetic field sensor and said second magnetic field sensor by the time interval between the recorded time at which said first trigger signal produced by said trigger circuit was detected and the time at which said second trigger signal produced by said trigger circuit was detected.

11. The method for measuring the speed of a magnetized sporting device as recited in claim 10, wherein said first trigger signal comprises a rising-edge or a falling edge signal, wherein said second trigger signal comprises a rising-edge or a falling edge signal.

12. A system for measuring the speed of a magnetized sporting device traveling along a trajectory, comprising:
   a first magnetic field sensor being capable of providing a first output signal in response to changes in the magnetic field proximate to said first magnetic field sensor, whereby said first magnetic field sensor provides said first output signal in response to a change in the magnetic field proximate to said first magnetic field sensor created by said magnetized sporting device traveling along trajectory proximate to said first magnetic field sensor;
   a second magnetic field sensor positioned a known distance away from said first magnetic field sensor, wherein said second magnetic field sensor is capable of providing a second output signal in response to changes in the magnetic field proximate to said second magnetic field sensor, whereby said second magnetic field sensor provides said second output signal in response to a change in the magnetic field proximate to said second magnetic field sensor created by said magnetized sporting device traveling along a trajectory proximate to said second magnetic field sensor;
   a trigger circuit in communication with said first magnetic field sensor and said second magnetic field sensor, wherein said trigger circuit is responsive to said first output signal provided by said first magnetic field sensor in response to changes in the magnetic field proximate to said first magnetic field sensor, wherein said trigger circuit is configured to provide a first trigger signal in response to changes in said first output signal provided by said first magnetic field sensor in response to changes in the polarity of the magnetic field proximate to said first magnetic field sensor, whereby a change in the polarity of the magnetic field proximate to said first magnetic field sensor will result in said trigger circuit providing a first trigger signal, wherein said trigger circuit is responsive to said second output signal provided by said second magnetic field sensor in response to changes in the magnetic field proximate to said second magnetic field sensor, wherein said trigger circuit is configured to provide a second trigger signal in response to changes in said second output signal provided by said second magnetic field sensor in response to changes in the polarity of the magnetic field proximate to said second magnetic field sensor, whereby a change in the polarity of the magnetic field proximate to said second magnetic field sensor will result in said trigger circuit providing a second trigger signal; and,
   a controller circuit in communication with said trigger circuit, wherein said controller circuit is configured to accept input signals, wherein said controller circuit is further configured to detect said first trigger signal and said second trigger signal provided by said trigger circuit, wherein said controller circuit comprises a timer, wherein said controller circuit is configured to record time readings from said timer, and is further configured to determine the interval between subsequent time readings, whereby said controller circuit is configured to perform calculations to determine motion properties of said magnetized sporting device traveling a trajectory based upon said first trigger signal, said second trigger signal, and said time readings from said timer, wherein said controller circuit is further configured

- to monitor said trigger circuit, and to detect said first trigger signal provided by said trigger circuit in response to changes in the polarity of the magnetic field proximate to said first magnetic field sensor;
- to record the time at which said first trigger signal provided by said trigger circuit is detected;
- to monitor said trigger circuit, and to detect said second trigger signal provided by said trigger circuit in response to changes in the polarity of the magnetic field proximate to said second magnetic field sensor;
- to record the time at which said second trigger signal provided by said trigger circuit is detected;
- to determine the time interval between the recorded time at which said first trigger signal provided by said trigger circuit was detected and the recorded time at which said second trigger signal provided by said trigger circuit was detected; and,
- to determine the speed of the magnetized sporting device traveling along a trajectory by dividing the known distance between said first magnetic field sensor and said second magnetic field sensor by the time interval between the recorded time at which said first trigger signal provided by said trigger circuit was detected and the recorded time at which said second trigger signal provided by said trigger circuit was detected.

13. The system for measuring the speed of a magnetized sporting device traveling along a trajectory as recited in claim 12, further comprising an output display in communication with said controller circuit, such that said output display may communicate at least one motion characteristic of said magnetized sporting device to a user.

14. The system for measuring the speed of a magnetized sporting device traveling along a trajectory as recited in claim 12, wherein said first magnetic field sensor and said second magnetic field sensor each comprise a conductive material forming a coil comprising two ends, whereby a change in the magnetic field proximate to said first magnetic field sensor or said second magnetic field sensor, as created by said magnetized sporting device traveling along a trajectory proximate to said first magnetic field sensor or said second magnetic field sensor, may result in a change in voltage across the two ends of said coil.

15. The system for measuring the speed of a magnetized sporting device traveling along a trajectory as recited in claim 12, further comprising a gain circuit in communication with said first magnetic field sensor, said second magnetic field sensor, and said trigger circuit, wherein said gain circuit is configured to amplify said first output signal provided by said first magnetic field sensor in response to changes in the magnetic field proximate to said first magnetic field sensor, whereby said gain circuit provides an amplified version of said first output signal to said trigger circuit, wherein said gain circuit is further configured to amplify said second output signal provided by said second magnetic field sensor in response to changes in the magnetic field proximate to said second magnetic field sensor, whereby said gain circuit provides an amplified version of said second output signal to said trigger circuit.

16. The system for measuring the speed of a magnetized sporting device traveling along a trajectory as recited in claim 12, further comprising a lay-flat surface being capable of assuming a substantially planar shape, wherein said first magnetic field sensor and said second magnetic field sensor are secured to or embedded within said lay-flat surface with a known distance separating said first magnetic field sensor from said second magnetic field sensor.

17. The system for measuring the speed of a magnetized sporting device traveling along a trajectory as recited in claim 12, further comprising a magnetized sporting device, wherein said magnetized sporting device comprises:
- a body forming a sporting device; and,
- a magnetized unit being capable of producing a magnetic field, such that said magnetized unit has a north pole and a south pole, wherein said magnetized unit is secured to or embedded within said body forming a sporting device.

\* \* \* \* \*